(12) United States Patent
Close et al.

(10) Patent No.: US 11,797,043 B2
(45) Date of Patent: Oct. 24, 2023

(54) MAGNETIC SENSOR DEVICES, SYSTEMS AND METHODS, AND A FORCE SENSOR

(71) Applicant: Melexis Technologies SA, Bevaix (CH)

(72) Inventors: Gael Close, Bevaix (CH); Nicolas Dupre, Bevaix (CH); Théo Le Signor, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 17/940,479

(22) Filed: Sep. 8, 2022

(65) Prior Publication Data
US 2023/0070938 A1 Mar. 9, 2023

(30) Foreign Application Priority Data

Sep. 9, 2021 (EP) .................................... 21195827
Nov. 12, 2021 (EP) .................................... 21208061

(51) Int. Cl.
*G05G 9/047* (2006.01)
*G06F 3/0338* (2013.01)

(52) U.S. Cl.
CPC ........... *G05G 9/047* (2013.01); *G06F 3/0338* (2013.01); *G05G 2009/04755* (2013.01)

(58) Field of Classification Search
CPC .......... G05G 9/047; G05G 2009/04755; G06F 3/0338
USPC ....................................................... 345/161
See application file for complete search history.

(56) References Cited

U.S. PATENT DOCUMENTS

| 2012/0176070 | A1 | 7/2012 | Wallrafen |
| 2018/0014738 | A1* | 1/2018 | Tanaka ................. A61B 5/0265 |
| 2019/0377035 | A1* | 12/2019 | Nakamura ............ G01R 33/09 |
| 2020/0096363 | A1* | 3/2020 | Kollmitzer ............ G01D 3/022 |

(Continued)

FOREIGN PATENT DOCUMENTS

| DE | 102006042725 A1 | 3/2008 |
| DE | 102015203686 A1 | 9/2016 |

(Continued)

OTHER PUBLICATIONS

Extended European Search Report from corresponding European Patent Application No. EP 21208061.8, dated May 9, 2022.

*Primary Examiner* — Mark Edwards
(74) *Attorney, Agent, or Firm* — WORKMAN NYDEGGER

(57) ABSTRACT

A magnetic sensor system includes an integrated circuit comprising a semiconductor substrate. The semiconductor substrate has a plurality of magnetic sensors configured for measuring at least two first magnetic field components oriented in a first direction, and for measuring at least two second magnetic field components oriented in a second direction; a permanent magnet movable relative to the integrated circuit and configured for generating a magnetic field. A processing circuit is configured for determining at least two physical quantities related to a position of the magnet, using a predefined algorithm based on the measured first and second magnetic field components or values derived therefrom, as inputs, and that uses a plurality of at least eight constants which are determined using machine learning. A force sensor system, a joystick or thumbstick system, and a method may use the magnetic sensor system.

28 Claims, 38 Drawing Sheets

(56) References Cited

U.S. PATENT DOCUMENTS

2021/0110239 A1* 4/2021 Heinz .................... G06F 3/0362
2021/0396821 A1* 12/2021 Ellis, Jr. ............... G01R 33/072

FOREIGN PATENT DOCUMENTS

| EP | 3783316 A1 | 2/2021 |
| EP | 3885778 A1 | 9/2021 |
| EP | 3885779 A1 | 9/2021 |

* cited by examiner

700

800

1200

1300

1500

1750

MAGNETIC SENSOR DEVICES, SYSTEMS AND METHODS, AND A FORCE SENSOR

FIELD OF THE INVENTION

The present invention relates in general to the field of magnetic sensor devices, systems and methods, and more in particular to magnetic sensor devices, systems and methods in which a position of a magnet relative to a semiconductor substrate is indicative for at least two physical quantities, such as e.g. force components, or tilting angles of a joystick, or a lateral position of a thumbstick, etc.

BACKGROUND OF THE INVENTION

Magnetic sensors, e.g. current sensors, proximity sensors, position sensors, etc. are known in the art. They are based on measuring a magnetic field characteristic at one or multiple sensor locations. Depending on the application, the measured field characteristic(s) may be used to deduct another quantity, such as e.g. a current strength, proximity of a so called target, relative position of a sensor device to a magnet, etc.

Many variants of magnetic sensor devices, systems and methods exist, addressing one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against positioning errors, being highly robust against an external disturbance field, providing redundancy, being able to detect an error, being able to detect and correct an error, having a good signal-to-noise ratio (SNR), etc. Often two or more of these requirements conflict with each other, hence a trade-off needs to be made.

The present invention is related to a class of magnetic sensor systems comprising a permanent magnet which is flexibly or resiliently mounted with respect to a semiconductor substrate, and wherein the position of the magnet is indicative of a 2D or 3D physical quantity, such as a force vector, or a displacement vector, caused by a force exerted upon a surface, or caused by movement of a joystick or a thumbstick or the like.

There is always room for improvements or alternatives.

SUMMARY OF THE INVENTION

It is an object of embodiments of the present invention to provide a magnetic sensor system and a method for determining at least two physical quantities related to a position of a permanent magnet, which is movable relative to a semiconductor circuit.

It is an object of embodiments of the present invention to provide such a system and method which is less sensitive to external disturbance field, and/or which is less sensitive to temperature variations, and/or which is less sensitive to demagnetisation of the magnet, and preferably two of these, or all of these.

It is an object of embodiments of the present invention to provide such a system and method using an algorithm which does not require explicit analytical or mathematical formulas or expressions.

It is an object of embodiments of the present invention wherein the magnet is embedded in an elastomer above or on top of a semiconductor circuit.

It is an object of embodiments of the present invention to provide such a magnetic sensor system using only 2D magnetic sensors, or only 3D magnetic sensors, or using a combination of 2D and 3 magnetic sensors.

It is an object of embodiments of the present invention to provide such a magnetic sensor system and method wherein the magnetic field is measured in at least four sensor locations or in at least five sensor locations.

It is an object of embodiments of the present invention to provide such a magnetic sensor system and method wherein the magnet is an axially magnetised two-pole magnet.

It is an object of the embodiment of the present invention to provide such a magnetic sensor system and method wherein the physical quantities are calculated by the integrated circuit.

It is an object of embodiments of the present invention to provide such a magnetic sensor system and method wherein time required for determining said at least two physical quantities is at most 50 ms, or at most 40 ms, or at most 30 ms, or at most 20 ms, or at most 10 ms.

It is also an object of embodiments of the present invention to provide a semiconductor device (i.e. a single chip) comprising at least the plurality of sensors for measuring the magnetic field, and optionally also comprising processing circuitry for determining said at least two physical quantities.

It is also an object of embodiments of the present invention to provide a force sensor system.

It is an object of particular embodiments of the present invention to provide a force sensor system capable of measuring two or three force components (i.e. a 2D or 3D force vector) using such a magnetic sensor system.

It is also an object of embodiment of the present invention to provide a robot finger comprising at least one force sensor system, and robot arm comprising at least one robot finger.

It is also an object of embodiments of the present invention to provide a joystick system having two degrees of freedom (e.g. two tilting movements), or having 3 degrees of freedom (two tilting movements and a downward movement).

It is also an object of embodiments of the present invention to provide a thumbstick system having two degrees of freedom (e.g. two lateral movements), or having 3 degrees of freedom (two lateral movements and a downward movement).

These and other objectives are accomplished by embodiments of the present invention.

According to a first aspect, the present invention provides a magnetic sensor system comprising: an integrated circuit comprising a semiconductor substrate, the semiconductor substrate comprises a plurality of magnetic sensors configured for measuring at least two (or at least three, or at least four) first magnetic field components (Bx1, Bx2) oriented in a first direction (X), and for measuring at least two (or at least three, or at least four) second magnetic field components (Bz1, Bz2) oriented in a second direction (Y; Z), e.g. perpendicular to the first direction (X); a permanent magnet which is movable relative to the integrated circuit, and configured for generating a magnetic field; a processing circuit (inside the integrated circuit, or outside the integrated circuit) configured for determining at least two physical quantities (e.g. a 2D or 3D force vector, a 2D or 3D displacement vector, a 2D or 3D position of a joystick, a 2D or 3D position of a thumbstick) related to a position of the magnet using a predefined algorithm based on the measured first and second magnetic field components (Bx1, Bx2; Bz1, Bz2), or values derived therefrom, as inputs, and that uses a plurality of at least eight (or at least twelve, or at least eighteen) constants (or coefficients or parameters) which are determined using machine learning.

The "magnetic sensor system" may for example be a force sensor system, or a joystick, or a thumbstick.

The inventors discovered that it is not required to find explicit analytical expressions or a mathematical model with a minimum number of variables to express the relations between the physical quantities and the movements of the magnet, even if the magnet moves in a highly nonlinear manner, e.g. due to a particular mechanical mounting arrangement, e.g. using an elastomer with non-linear stress-strain curves.

It was discovered that it is possible to determine the physical quantities with very good accuracy by performing a predetermined algorithm that uses a number of constants (or parameters) which are determined by machine learning (ML). It was found that this approach allows to determine or approximate the desired physical quantities in a manageable way.

The skilled person, having the benefit of the present disclosure, can easily find a suitable algorithm that meets his needs, by merely applying the teachings of the present invention.

Such a magnetic sensor system may be particular suitable in applications where a small error of the absolute accuracy is not detrimental for the application in which it is used.

In an embodiment, the processing circuit is configured for determining said at least two physical quantities using a predefined algorithm that uses at least three or at least four magnetic field differences derived from said at least two first and said at least two second magnetic field components, as inputs, and that uses said plurality of at least eight (or at least twelve, or at least eighteen) constants.

As will be explained further, the magnetic field differences may be calculated as magnetic field gradients or may be calculated by subtracting a mean or an average magnetic field component oriented in the same direction as the original magnetic field component.

In an embodiment, the integrated circuit comprises a first programmable processor as part of said processing circuit, configured for performing at least a portion of said algorithms.

The processing circuit may be implemented on the same semiconductor die as the one one comprising the magnetic sensors or may be implemented on a second semiconductor die connected to the first semiconductor die, and also embedded in the same package.

This integrated circuit may comprise an analog processing circuit or may comprise a digital processing circuit using a programmable DSP (digital signal processor) core with a MAC (multiply-accumulate) instruction.

In this embodiment, the integrated circuit preferably comprises an output configured for providing the at least two or the three physical values, e.g. force values, angular values, etc.

In an embodiment, the magnetic sensor system further comprises a second programmable processor as part of said processing circuit, communicatively connected to the integrated circuit but located outside thereof; and the integrated circuit is configured for providing said at least three first and second magnetic field components (e.g. Bx1, Bx2, Bx3; Bz1, Bz2, Bz3), or values derived therefrom, to said second programmable processor.

In an embodiment the integrated circuit comprises a plastic moulded package, and the elastomer is arranged on top of, and in direct contact with the moulded package. In some embodiments the elastomer does not laterally extend beyond the package (i.e. is only supported by the package). In other embodiments, the elastomer may laterally extend beyond the package, and may for example come into contact with a printed circuit board on which the packaged device is mounted and/or soldered.

In an embodiment, the number of constants (also referred to as "coefficients") is a value in the range from 12 to 100, or in the range from 12 to 80, or in the range from 18 to 64, or in the range from 25 to 45.

As a rule of thumb, the larger the number of coefficients, the higher the accuracy for a given measurement range, but the larger the circuitry (if implemented in hardware) or the larger the number of calculations (if implemented in software). The inventors discovered, however, that not only the number of constants has an impact on the computational effort and the accuracy, but also the kind of functions used in the algorithm.

In an embodiment, the semiconductor substrate further comprises a temperature sensor for measuring a temperature of the semiconductor substrate, and the semiconductor substrate is configured for correcting the measured first and second magnetic field components based on the measured temperature.

In an embodiment, the semiconductor substrate further comprises a temperature sensor for measuring a temperature of the semiconductor substrate, and the predefined algorithm takes the measured temperature into account as an additional input.

In an embodiment, the semiconductor substrate further comprises a temperature sensor for measuring a temperature of the semiconductor substrate, and the measured temperature is used in a post-processing step.

For example, in some embodiments, the measured temperature is used to correct the sensitivity of the sensor elements. In some embodiments, the temperature is taken into account as an additional input (for example of a Neural Network). In some embodiments, for example where an elastomer is used, the measured temperature can be used in a post-processing step, e.g. to compensate for temperature dependent material characteristics (e.g. lower or higher stiffness).

In an embodiment, the plurality of sensors are configured for measuring magnetic field components, (e.g. the above mentioned first and second magnetic field components) in only two orthogonal directions. (e.g. said first direction and said second direction).

In an embodiment each of the first direction (e.g. X) and the second direction (e.g. Y) is parallel to the semiconductor substrate.

In this embodiment the sensors are configured for measuring (or measuring only) so called "in-plane" magnetic field components (e.g. Bx and By). This may be implemented using vertical Hall elements, MR elements, horizontal Hall elements+IMC, or combinations of these.

In an embodiment, the first direction (e.g. X) is parallel to the semiconductor substrate, and the second direction (e.g. Z) is perpendicular to the semiconductor substrate.

In this embodiment the sensors are configured for measuring (or measuring only) so called "in-plane" magnetic field components (e.g. Bx or By) and so called "out-of-plane" magnetic field components (e.g. Bz). This may be implemented using a combination of horizontal and vertical Hall elements or using a combination of MR elements and horizontal Hall elements or using horizontal Hall elements and Integrated Magnetic Flux Concentrators (IMC).

In an embodiment, the plurality of magnetic sensors is further configured for measuring at least three third magnetic field components oriented in a third direction perpendicular to the first direction and perpendicular to the second direction.

In this embodiment the sensors may be configured for measuring two "in-plane" magnetic field components (e.g. Bx and By) and one "out-of-plane" magnetic field component (e.g. Bz). This may be implemented using a combination of horizontal and vertical Hall elements or using a combination of MR elements and horizontal Hall elements or using horizontal Hall elements and IMC.

In an embodiment, the plurality of sensors comprises at least one sensor (preferably at least two, or at least three, or at least four sensors) comprising an integrated magnetic concentrator disk, and three pairs of horizontal Hall elements arranged near a periphery of the disk, the Hall elements being angularly spaced by multiples of 120°.

In an embodiment, the plurality of sensors comprises at least one sensor (preferably at least two, or at least three, or at least four sensors) comprising an integrated magnetic concentrator disk, and four pairs of horizontal Hall elements arranged near a periphery of the disk, angularly spaced by multiples of 45°. An example of such sensors is illustrated in FIG. 20 and FIG. 21.

In an embodiment, the semiconductor substrate comprises a plurality of magnetic sensors located at the crossings of a 2×2 grid, (i.e. at the corners of an imaginary square), or at the crossings of a 3×3 grid, or at the crossings of a 4×4 grid. Preferably the columns and rows of the grid are equidistantly spaced.

In an embodiment, the semiconductor substrate comprises a plurality of magnetic sensors which are arranged in a irregular pattern, e.g. at pseudo-random locations.

In an embodiment, the at least three of the magnetic sensors are located on a virtual circle.

The virtual circle may have a diameter in the range from 1.0 mm to 3.0 mm, or in the range from 1.5 mm to 2.5 mm, or in the range from 1.7 to 2.3 mm, e.g. equal to about 1.8 mm, or equal to about 2.0 mm, or equal to about 2.2 mm.

In an embodiment, the semiconductor substrate comprises three magnetic sensors located on said virtual circle, and angularly spaced apart by multiples of 120°.

In an embodiment, the semiconductor substrate comprises four magnetic sensors located on said virtual circle, and angularly spaced apart by multiples of 90°.

In an embodiment, the semiconductor substrate comprises five magnetic sensors located on said virtual circle, and angularly spaced apart by multiples of 72°.

In an embodiment, the semiconductor substrate comprises six magnetic sensors located on said virtual circle, and angularly spaced apart by multiples of 60°.

In an embodiment, the semiconductor substrate further comprises one magnetic sensor located in the centre of said virtual circle.

In an embodiment, the magnet is a two-pole magnet, e.g. a two-pole bar magnet, or a diametrically magnetized ring or disk magnet. The magnetization direction of the magnet may be oriented substantially perpendicular to the semiconductor substrate, or substantially parallel to the semiconductor substrate.

In an embodiment, the magnet is an axially magnetised magnet, e.g. an axially magnetized ring or disk magnet. The magnetization direction of the magnet may be oriented substantially perpendicular to the semiconductor substrate, or substantially parallel to the semiconductor substrate.

In an embodiment, the sensor system comprises only one magnet.

In an embodiment, the sensor system comprises three magnets, arranged on a virtual circle above the semiconductor substrate, and angularly spaced 120° apart.

In an embodiment, the sensor system comprises four magnets, arranged on a virtual circle above the semiconductor substrate, and angularly spaced 90° apart.

In an embodiment, the sensor system comprises six magnets, arranged on a virtual circle above the semiconductor substrate, and angularly spaced 60° apart.

In an embodiment, the magnet is, or the magnets are (a) two-pole disk magnet(s), each having an outer diameter or a largest diagonal smaller than a diameter of the above-mentioned virtual circle on which at least three of the magnetic sensors are located.

In an embodiment, the magnet is, or the magnets are (a) two-pole disk magnet(s) having an outer diameter or a largest diagonal substantially equal to (within ±20%) a diameter of the above-mentioned virtual circle on which at least three of the magnetic sensors are located.

In an embodiment, the magnet is, or the magnets are (a) two-pole disk magnet(s) having an outer diameter or a largest diagonal larger than a diameter of the above-mentioned virtual circle on which at least three of the magnetic sensors are located.

In an embodiment, the magnet has a central axis which intersects the semiconductor substrate at a central position of the magnetic sensors ("on-axis arrangement").

In an embodiment, the magnet has a central axis which intersects the semiconductor substrate at a position which is offset from a central position of the magnetic sensors ("off-axis arrangement"). In case the sensors are arranged on an N×N grid, the offset may be half the distance between two adjacent grid lines.

In an embodiment, the magnet is an axially magnetized two-pole ring or disk magnet.

It is an advantage of using such a magnet because the magnetic field generated by such a magnet is rotation-invariant, meaning it is independent of rotation of the magnet about its axis. Hence, this magnetic sensor system is less sensitive to a torque about an axis perpendicular to the semiconductor substrate.

In an embodiment, the predefined algorithm is configured for deriving at least two (or at least three, or at least four) first difference values from said at least two (or at least three, or at least four) first magnetic field components, and for deriving at least two (or at least three, or at least four) second difference values from said at least two (or at least three, or at least four) second magnetic field components; and for calculating said at least two (or three, or four) physical values (e.g. force components, or angles, or displacements) based on said at least two (or at least three, or four) first and said at least two (or at least three, or four) second difference values.

It is explicitly pointed out that this part of the algorithm may be implemented inside the integrated circuit containing the magnetic sensors, or outside the integrated circuit containing the magnetic sensors (e.g. in an Electronic Control Unit connected to the sensor device), or partially inside the sensor device (e.g. for some of the difference values), and partially outside the sensor device (e.g. for some other difference values).

It is a major advantage of using difference values that the result is highly insensitive to an external disturbance field. As far as is known to the inventors, no strayfield-immune force sensor exists in the prior art.

In an embodiment, the predefined algorithm further takes into account at least one first magnetic field component, or at least one second magnetic field component. While this embodiment in theory is not 100% strayfield immune, it may still have a relatively large strayfield rejection.

In an embodiment, each of the at least three first difference values is determined as a pairwise difference between two first magnetic field components, and wherein each of the at least three second difference values is determined as a pairwise difference between two second magnetic field components; or This may be referred to as "magnetic field gradients", and may e.g. be written in mathematical terms as: $dx1=Bx1-Bx2$; $dx2=Bx1-Bx3$, $dx3=Bx2-Bx3$, and $dz1=Bz1-Bz2$; $dz2=Bz1-Bz3$, $dz3=Bz2-Bz3$.

In an embodiment, each of the at least three first difference values is determined as a difference between a first magnetic field component and a first common value, and wherein each of the at least three second difference values is determined as a difference between a second magnetic field component and a second common value.

The first common value may be a first magnetic field component measured at a fourth sensor location (preferably a central sensor location), or may be an average of the at least three first magnetic field components. This may be referred to as "mean removal" and may be written in mathematical terms e.g. as follows (assuming the semiconductor substrate has only three 2D sensors, each measuring Bx and Bz): $Bx\_avg=(Bx1+Bx2+Bx3)$, $Bz\_avg=(Bz1+Bz2+Bz3)$; $dx1=Bx1-Bx\_avg$, $dx2=Bx2-Bx\_avg$, $dx3=Bx3-Bx\_avg$, $dz1=Bz1-Bz\_avg$, $dz2=Bz2-Bz\_avg$, $dz3=Bz3-Bz\_avg$.

In an embodiment, the predefined algorithm is configured for calculating each of the physical values as a sum of at least twelve terms, wherein each of these at least twelve term are a function of one or more of said differences.

In an embodiment, each of the sums comprises a constant value, which is determined by machine learning.

Machine Learning is typically applied on a batch-basis, not on an individual product basis.

In an embodiment, the predefined algorithm is configured for calculating each of the physical values as a sum of at least twelve terms; at least two terms contain a linear expression of only one of said differences; and at least two terms contain a non-linear expression of one or more of said differences.

Thus at least two of the terms are a scaled version of only one of said differences, for example: $(K1*dx1)$ or $(K2*dx1+K3)$, wherein the constants K1, K2, K3 are determined by machine learning.

In an embodiment each of the terms is a constant or an algebraic function of one or more of said differences.

"Algebraic functions" is a class of functions that comprises: "polynomial functions" (e.g. a constant, a linear function, a quadratic function, a third power function), and "rational functions" (i.e. a ratio of two polynomial functions). Algebraic functions also include "piecewise functions", such as absolute value functions, floor functions, ceiling functions, sign function. Algebraic functions do not include so called "transcendental functions", which is a group of functions where the independent variable appears as an exponent, an index of root, logarithmic or trigonometric ratio.

In other words, in this embodiment, none of the terms is or contains an exponential function, or a logarithmic function, or a trigonometric function (e.g. sine, cosine, tangent, cosecant, secant, cotangent), or an inverse trigonometric function (e.g. arctangent).

It is an advantage of using "only" algebraic functions, and excluding transcendent functions, because algebraic functions are less expensive in terms of processing power or processing time and may be implemented in an embedded processor.

In an embodiment, at least two terms or each sum are or contain a quadratic expression or a second order polynomial of only one of said differences.

For example: $K1*sqr(dx1)$, or $K2*sqr(dx1-K3)$, or $K4+(K5*dx1)+K6*(dx1)2$, where K1 to K6 are constants.

In an embodiment, some of the terms are a third order or a fourth order polynomial expression.

In preferred embodiments, none of the terms is a polynomial expression larger than four. It is an advantage of using a polynomial order of at most four, or at most three, or at most two, because this requires less processing time and less processing power.

In an embodiment, each sum contains at least one term being a product of two differences (e.g. $K7*dx1*dz1$).

It was discovered that using products of difference signals can be really helpful to improve the accuracy of the result. While the inventors do not wish to be bound by any theory, it seems that certain products of differences have a good correlation with physical movement of the magnet, even though the correlation is not immediately apparent for human observers.

In an embodiment, each sum contains at least one term being a division of two differences (e.g. $K8*dx1/dz1$).

It is an advantage of using a ratio of two magnetic field values (e.g. differences) because such a ratio is highly robust against temperature variations, and demagnetization effects.

In an embodiment, the predefined algorithm is performed by a trained neural network using the at least three first magnetic field components (e.g. Bx1, Bx2, Bx3) and the at least three second magnetic field components (e.g. Bz1, Bz2, Bz3) as input signals, and providing the at least two (or at least three) physical values as output values.

The predefined algorithm may comprise a neural network having a plurality of layers, wherein each layer comprises a plurality of nodes.

In an embodiment, the neural network contains only one layers, having 12 to 100 nodes.

In an embodiment, the neural network contains only two layers, each having 10 to 100 nodes, or having 20 to 60 nodes.

In an embodiment, the neural network contains only three layers, each having 10 to 100 nodes, or each having 5 to 50 nodes.

In an embodiment, the neural network is a Recurrent Neural Network (RNN).

In an embodiment, the neural network is an Artificial Neural Network (ANN).

In an embodiment, the neural network is a Convolution Neural Network (CNN).

In an embodiment, the predefined algorithm further comprises a post-processing step; and the post-processing step is configured for adjusting the determined physical quantities (e.g. determined with the proprietary algorithm described above, or determined with a Neural Network) by adding or subtracting an offset value which is determined by an individual calibration test.

With "individual calibration test" is meant that this test is performed for each magnetic sensor system individually, as opposed to the Machine Learning, which is not performed on an individual basis, but is typically performed on a per-batch-basis.

This "individual calibration test" is preferably performed as an EOL test (end of line test), or it may be performed by an OEM customer.

In case of a force sensor system or a force sensor device or a joystick or the like, this calibration test may include: (i) performing a force measurement using the predefined algorithm using the plurality of constants or parameters determined by machine learning (which are typically determined on a batch basis), while applying a zero force, resulting in two or three force values or position values which are typically slightly offset from zero; and (ii) storing these values in a non-volatile memory of the system, e.g. a non-volatile memory of the integrated circuit.

During normal use of the sensor device, first the predefined algorithm is used to provide two or more measurement values based on the parameters determined by machine learning, and then a correction is applied by subtracting the values measured during the calibration step explained above.

It is a major advantage of this embodiment that it combines the best of both worlds, namely: a very good approximation of the physical values to be measured using the predefined algorithm with a plurality of constants determined by machine learning on a batch-basis, but subsequently corrected such that a "zero force" or a "neutral position" of a joystick or the like is offset-corrected for each individual product.

In an embodiment, the magnet is flexibly mounted relative to the integrated circuit by means of a flexible material.

The flexible material may be a single layer consisting of an isotropic material, without any voids or hollow regions. This material and the magnet may be shaped and sized such that the magnet can move in three directions X, Y, Z, but will not significantly rotate about its center (e.g. will rotate less than ±10°, or less than ±5° over the measurement range of the force sensor system.

In an embodiment, the flexible material is a polymer.

In an embodiment, the flexible material is an elastomer.

The elastomer may be arranged above or on top of the integrated circuit. In preferred embodiments, the elastomer may directly contact a package of the integrated circuit.

In an embodiment, the elastomer is or comprises silicone, e.g. silicone rubber, e.g. natural rubber.

In an embodiment, the flexible material has a non-linear stress-strain characteristic; and a linear regression coefficient of a portion of the non-linear stress-strain characteristic corresponding to the measurement range of the magnetic sensor system is less than 0.90, or less than 0.85, or less than 0.80, or less than 0.75, or less than 0.70.

In other words, in these embodiments, a curve showing the strain as a function of stress of this material is a highly non-linear function.

In an embodiment, the predefined algorithm further comprises a post-processing step wherein a temperature of the flexible material is measured or estimated, and wherein the determined physical quantities are corrected to reduce temperature dependent material characteristics.

The correction may use a predefined correction function for each of the determined physical quantities individually.

The compensation function may for example be a temperature dependent scaling. The function f(.) may be stored in the form of a look-up table, or as piece-wise-linear approximation, or as an analytical function, e.g. as a polynomial expression.

The temperature sensor may be integrated inside the integrated circuit, and the temperature of this temperature sensor may be used as an estimate of the elastomer.

In an embodiment, the predefined algorithm further comprises a post-processing step, or if already present, the post-processing step further comprises: an offset correction for each of the output values, by subtracting a predefined value which was stored in non-volatile memory during a calibration procedure.

The present invention also provides a force sensor system, comprising a magnetic sensor system according to the first aspect, wherein the at least two or three physical quantities to be determined are two or three force components (Fx, Fy, Fz) of a mechanical force exerted upon a contact surface of said flexible material.

This magnetic sensor system can be referred to as a "force sensor system", and the integrated circuit may be referred to as a "force sensor device".

The force components Fx and Fy are typically referred to as shear forces or lateral forces. The force component Fz is typically referred to as downward pressure.

In an embodiment, the flexible material is located above or on top of the integrated circuit, e.g. as a layer deposited on the packaged, and the magnet is at least partially or completely embedded inside said flexible material.

The plurality of constants (or parameters or coefficients) may be determined by applying a series of tests in which a plurality of known forces is applied having only an Fx-component, followed by another series of tests in which a plurality of known forces are applied having only an Fy-component, followed by another series of tests in which a plurality of known forces are applied having only an Fz-component. In each series of tests, the respective component values assume a value within a respective predefined measurement range.

Alternatively, the plurality of constants (or parameters or coefficients) may be determined by applying a series of tests in which a three-dimensional force is applied, having an Fx, Fy, Fz component in their respective measurement range.

In an embodiment, the plurality of constants are determined by applying a series of known forces, wherein each of the Fx, Fy and Fz values "sweep" through their respective measurement range, for example in 5 steps each, i.e. 5*5*5=125 different combinations; or in 6 steps each, i.e. 6*6*6=216 different combinations; or in 7 steps each, i.e. 343 combinations; or in 8 steps each, i.e. 512 combinations; or in 9 steps each, i.e. 729 combinations; or in 10 steps each, i.e. 1000 different combinations.

In an embodiment, no external disturbance field is applied during these steps. No need to say that is a huge advantage that the influence of an external disturbance field is substantially eliminated by design (by taking into account gradients or mean-corrected values).

In another embodiment, an external disturbance field is applied during these steps. The external disturbance field may assume pseudo-random values for each step.

The present invention also provides a robot finger comprising at least one force sensor system.

The present invention also provides a robot hand comprising at least two robot fingers.

The present invention also provides a joystick system or joystick assembly for determining a 2D or 3D position of a joystick, the joystick system or joystick assembly comprising: a magnetic sensor system according to the first aspect; and a joystick which is movable relative to the integrated circuit with at least two degrees of freedom; wherein the magnet is fixedly connected to the joystick.

The joystick system may determine for example two angular values for indicating the position of the joystick, e.g. as illustrated in FIGS. 25(a) and 25(b). The joystick may be rotatable about a pivot point. The pivot point may be located above the magnet. In other words, the magnet may be located between the pivot point and the semiconductor substrate.

The joystick may be used in consumer electronics applications (e.g. for gaming), or for agricultural vehicles.

An exemplary embodiment of a joystick comprises a bearing, by means of which a control lever is mounted so as to move with at least two degrees of freedom with respect to a housing. The control lever has a portion movable by a user and an inner portion, which are opposite one another on different sides of the bearing in a longitudinal direction. A magnet is arranged on the control lever. The semiconductor substrate with the plurality of magnetic sensors is arranged at a fixed location with respect to the housing.

The present invention also provides a thumbstick system or thumbstick assembly for determining a 2D or 3D position of a thumbstick, the thumbstick system or assembly comprising: a magnetic sensor system according to the first aspect; and a thumbstick which is movable relative to the integrated circuit with two or three degrees of freedom; wherein the magnet is fixedly connected to the thumbstick.

The thumbstick system may determine for example two lateral displacement values, for indicating the position of the joystick, and optionally also give an indication of whether the drumstick is pressed (or pushed down).

According to another aspect, the present invention also provides a method of measuring at least two physical quantities (e.g. a 2D or 3D force vector, a 2D or 3D displacement vector, a 2D or 3D position of a joystick, a 2D or 3D position of a thumbstick) related to a position of a permanent magnet which is movable relative to the integrated circuit, and configured for generating a magnetic field, the method comprising the steps of: a) measuring at least two (or at least three) first magnetic field components (e.g. Bx1, Bx2; Bx1, Bx2, Bx3) oriented in a first direction (e.g. X); b) measuring at least two (or at least three) second magnetic field components (e.g. Bz1, Bz2; Bz1, Bz2, Bz3) oriented in a second direction (e.g. Y or Z) perpendicular to the first direction (e.g. X); c) determining said at least two physical quantities using a predefined algorithm that uses the measured first and second magnetic field components (e.g. Bx1, Bx2, Bx3; Bz1, Bz2, Bz3) as inputs, and that uses a plurality of at least eight (or at least twelve, or at least sixteen) constants (or coefficients or parameters) which are determined using machine learning.

In embodiments, the method has one or more of the features described above.

According to another aspect, the present invention also provides an integrated semiconductor device comprising a plurality of sensors having a topology as illustrated in any of the FIG. 3(a) to FIG. 21, or variations thereof as described in the detailed description, and having the blocks 2222 (sensitivity correction); and one or both of the blocks 2224 (mean removal) and 2232 (gradient calculation) illustrated in FIG. 22(a) and FIG. 22(b), and configured for outputting the values provided by the block 2223 or 2232 via an output interface, e.g. a serial bus using for example I2C or SPI or SENT protocol.

According to another aspect, the present invention also provides a force sensor device or system comprising: an integrated circuit comprising a semiconductor substrate, the semiconductor substrate comprises a plurality of magnetic sensors configured for measuring at least two (or at least three, or at least four) first magnetic field components (e.g. Bx1, Bx2) oriented in a first direction (e.g. X), and for measuring at least two (or at least three, or at least four) second magnetic field components (e.g. Bz1, Bz2) oriented in a second direction (e.g. Y or Z), e.g. perpendicular to the first direction (e.g. X); a permanent magnet which is movable relative to the integrated circuit, and configured for generating a magnetic field; a processing circuit (inside the integrated circuit, or outside the integrated circuit) configured for determining at least two magnetic field gradients (e.g. dBx/dx, dBz/dx) derived from said magnetic field components, and for determining one or two or three force components (e.g. Fx, Fy, Fz) based on said at least two magnetic field gradients.

According to another aspect, the present invention also provides a force sensor device, comprising: an integrated circuit comprising a semiconductor substrate, the semiconductor substrate comprises a plurality of magnetic sensors configured for measuring at least three or at least four magnetic field components oriented in a first direction, or configured for measuring at least a first and a second magnetic field component oriented in a first direction and for measuring at least a third and a fourth magnetic field component oriented in a second direction; a permanent magnet which is flexibly mounted to the integrated circuit by means of a flexible material, the permanent magnet generating a magnetic field; a processing circuit configured for determining at least one physical quantity or at least two physical quantities related to a position of the magnet relative to the sensor device, or related to a force or a pressure exerted upon the flexible material, based on at least two or at least three pairwise differences of said magnetic field components.

In an embodiment, the processing circuit is implemented on the same semiconductor substrate as the magnetic sensors. In another embodiment, the processing circuit is implemented on a first semiconductor substrate (e.g. a CMOS substrate), and the magnetic sensors are implemented on one or more sensor substrates (e.g. CMOS, Ga—As, Ga—In or In—Sb) mounted next to, or on top of, or below the first semiconductor substrate.

In an embodiment, the second direction is the same as the first direction. In another embodiment, the second direction is different from the first direction, e.g. orthogonal thereto.

The force sensor device may be configured for determining said physical quantities using one or more predefined function(s). This function or these functions may be stored in a non-volatile memory of the processing circuit, e.g. in the form of a mathematical formula, e.g. as a polynomial expression with a plurality of coefficients, e.g. with 3 to 30 coefficients, e.g. with at least 3 or at least 4 or at least 6 or at least 8 or at least 12 coefficients; or in the form of a sum having 3 to 15 terms, e.g. having at least 3 terms, or at least 4 terms, or at least 6 terms, or at least 8 terms, or at least 10 terms, or at least 12 terms; or in the form of a look-up table. Some terms may be squares of magnetic field differences or may be cross-products of two magnetic field differences obtained from sensor pairs spaced apart in the same direction or may be cross-products of two magnetic field differences obtained from sensor pairs spaced apart in different directions.

The coefficients or parameters may be determined using machine-learning. Alternatively, the coefficients or parameters are determined using classical techniques such as e.g. using curve fitting techniques, linear regression or non-linear regression techniques, or linear or non-linear models.

The force sensor device may have three 1D pixels, or four 1D pixels, or three 2D pixels, or four 2D pixels, or five 2D pixels, or six 2D pixels, or seven 2D pixels, or eight 2D pixels, or nine 2D pixels, or four 2D pixels and one 3D pixel, or four 3D pixels, or five 3D pixels, or nine 3D pixels.

In an embodiment, at least two pairwise differences are determined, or at least three pairwise differences are determined, or at least four pairwise differences, or at least six pairwise differences, or at least eight pairwise differences, and the output value(s) is/are determined based on these pairwise differences.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
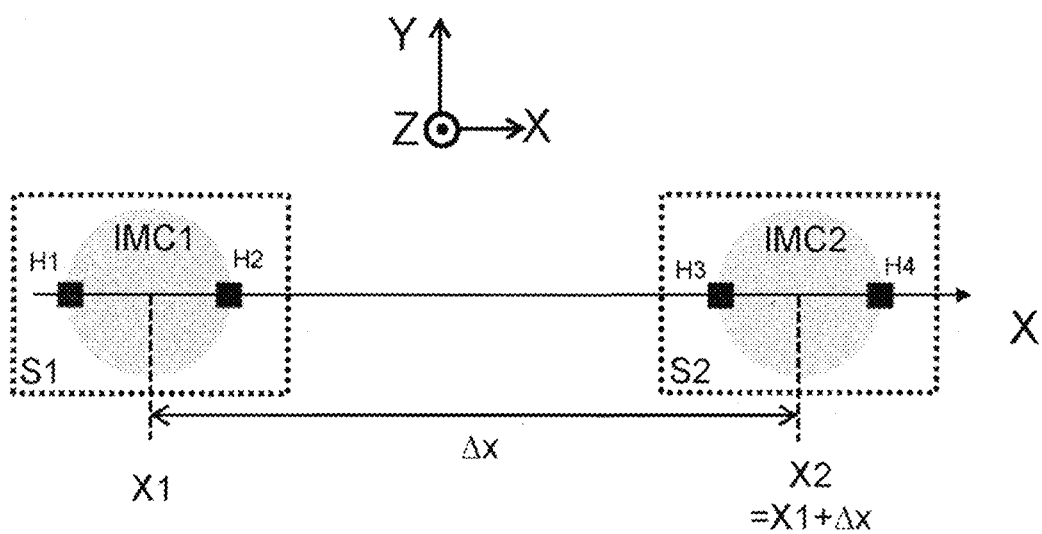
FIG. 1 is a schematic block-diagram of a sensor circuit known in the art.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures, and techniques have not been shown in detail in order not to obscure an understanding of this description.

In this document, unless explicitly mentioned otherwise, the term "magnetic sensor device" or "sensor device" refers to a device comprising at least two magnetic sensor elements, preferably integrated in a semiconductor substrate. The sensor device may be comprised in a package, also called "chip", although that is not absolutely required.

In this document, the term "sensor element" or "magnetic sensor element" refers to a single vertical Hall element or a single horizontal Hall element or a single magneto-resistive element (e.g. a GMR element or an XMR element).

In this document, the term "magnetic sensor" or "magnetic sensor structure" can refer to a group of components or a sub-circuit or a structure capable of measuring a magnetic quantity, such as for example a group of at least two magnetic sensor elements, or a Wheatstone-bridge containing four MR elements.

In certain embodiments of the present invention, the term "magnetic sensor" or "magnetic sensor structure" may refer to an arrangement comprising one or more integrated magnetic concentrators (IMC), also known as integrated flux concentrators, and two or four or eight horizontal Hall elements arranged near the periphery of the IMC.

In this document, the expression "in-plane component of a magnetic field vector" and "orthogonal projection of the magnetic field vector in the sensor plane" mean the same. If the sensor device is or comprises a semiconductor substrate, this also means "magnetic field components parallel to the semiconductor substrate".

In this document, the expression "out-of-plane component of a vector" and "Z component of the vector" and "orthogonal projection of the vector on an axis perpendicular to the sensor plane" mean the same.

Embodiments of the present invention are typically described using an orthogonal coordinate system which is fixed to the sensor device, and having three axes X, Y, Z, where the X and Y axis are parallel to the substrate, and the Z-axis is perpendicular to the substrate.

In this document, the expression "spatial derivative" or "derivative" or "spatial gradient" or "gradient" are used as synonyms. In the context of the present invention, a gradient is typically determined as a difference between two values measured at two different locations which may be spaced apart by a distance in the range from 1.0 mm to 3.0 mm. In theory the gradient is calculated as the difference between two values divided by the distance "dx" between the sensor locations, but in practice the division by "dx" is often omitted, because the measured signals need to be scaled anyway.

In this document, horizontal Hall plates are typically referred to by H1, H2, etc., signals from these horizontal Hall plates are typically referred to by h1, h2, etc.; vertical Hall plates are typically referred to by V1, V2, etc.; and signals from these vertical Hall plates are typically referred to by v1, v2, etc.

In this document, the terms "plurality of coefficients", or "plurality of parameters", or "plurality of constants", when referring to machine learning or deep learning, mean the same, irrespective of whether these values are used as coefficients in a matrix, or as offset values or as scaling factors.

The present invention relates in general to the field of magnetic sensor devices, systems and methods, and more in particular to magnetic sensor devices, systems and methods in which a position of a magnet relative to a semiconductor substrate is indicative for at least two physical quantities, such as e.g. force components, or tilting angles of a joystick, or a lateral position of a thumbstick, etc.

Referring to the Figures.

FIG. 1 is a schematic block-diagram of a sensor circuit known in the art. The sensor circuit comprises a first sensor (or sensor structure) at a first sensor location X1, and a second sensor (or sensor structure) at a second sensor location X2 along an X-axis; each sensor structure comprises an integrated magnetic concentrator (IMC) and two horizontal Hall elements arranged on opposite sides of the IMC, also referred to herein as a "2D magnetic pixel". Each of these 2D magnetic pixels is capable of measuring a Bx and a Bz magnetic field component at the centre of the IMC disk. The sensor circuit of FIG. 1 having two 2D pixels can be used to determine two magnetic field gradients dBx/dx and dBz/dx along the X-axis.

Figure 2:
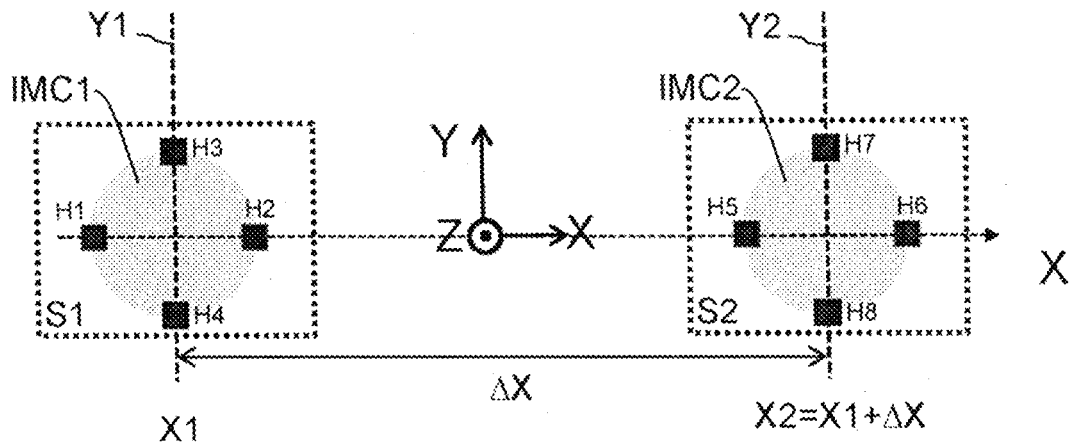
FIG. 2 is a schematic block-diagram of a sensor circuit known in the art.

FIG. 2 is a schematic block-diagram of a sensor circuit known in the art, which is a variant of FIG. 1. This sensor circuit comprises a first sensor structure at a first sensor location X1, and a second sensor structure at a second sensor location X2 along an X-axis; each sensor structure comprises an integrated magnetic concentrator (IMC) and four horizontal Hall elements arranged at a periphery of the IMC, also referred to herein as a "3D magnetic pixel". Two of the four horizontal Hall elements are located on the X-axis, and two other of the four horizontal elements are located on the Y axis perpendicular to the X-axis. The sensor circuit of FIG. 2 having two 3D pixels can be used to determine three magnetic field gradients dBx/dx, dBy/dx and dBz/dx along the X-axis.

FIG. 3($a$) is a schematic representation of an illustrative example of a magnetic sensor system comprising a permanent magnet which is movable relative to a semiconductor substrate. The semiconductor substrate comprises a plurality of magnetic sensors. While not explicitly shown in FIG. 3($a$), the semiconductor substrate may be embedded in a packaged device, and the magnet may be embedded in an elastomer situated above or on top of the packaged device. The magnet may be an axially magnetised two-pole disk magnet.

Figure 3A:
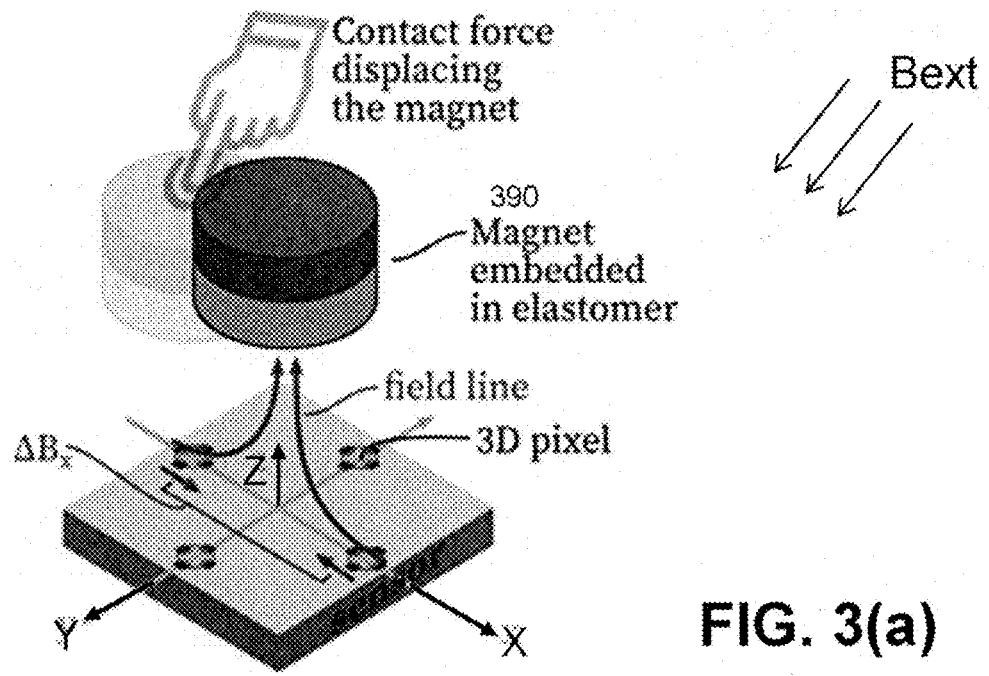
FIG. 3(a) is a schematic representation of an illustrative example of a magnetic sensor system comprising a permanent magnet which is movable relative to a semiconductor substrate.
Figure 3B:
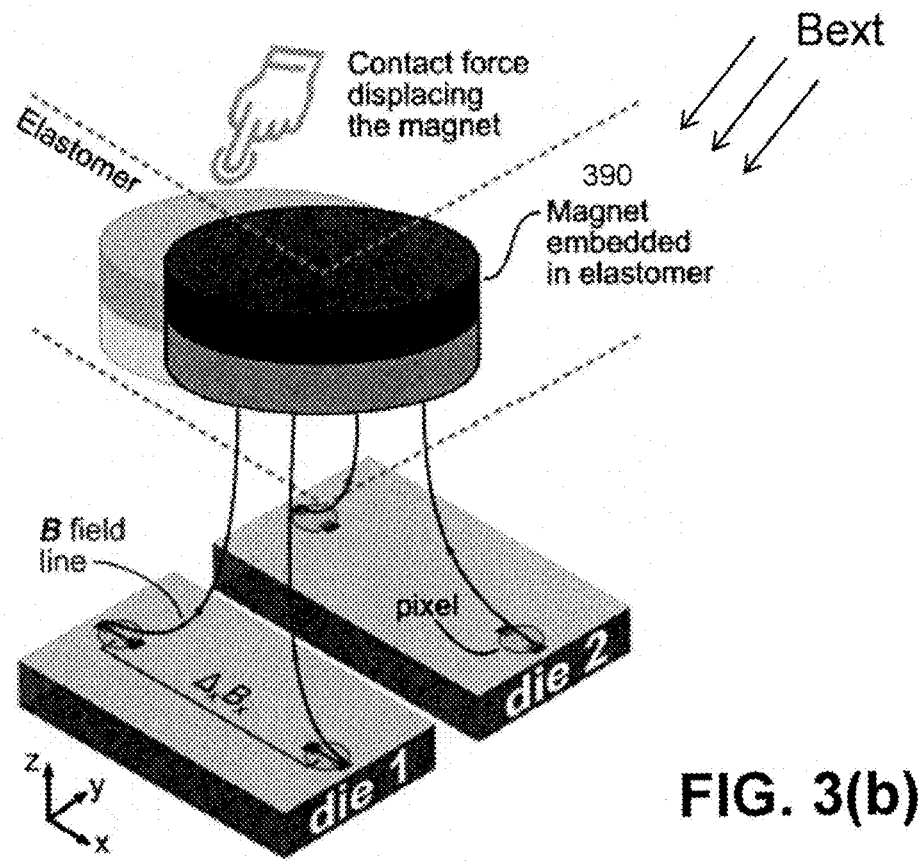
FIG. 3(b) is a schematic representation of another illustrative example of a magnetic sensor system comprising a permanent magnet which is movable relative to two semiconductor substrates, arranged side-by-side.

FIG. 3($b$) is a schematic representation of another illustrative example of a magnetic sensor system comprising a permanent magnet which is movable relative to two semiconductor substrates, arranged side-by-side, each comprising a plurality of magnetic sensors. While not explicitly shown in FIG. 3(b), the semiconductor substrates may be embedded in a single packaged device, and the magnet may be embedded in an elastomer situated above or on top of the packaged device. The magnet may be an axially magnetised two-pole disk magnet.

Figure 4:
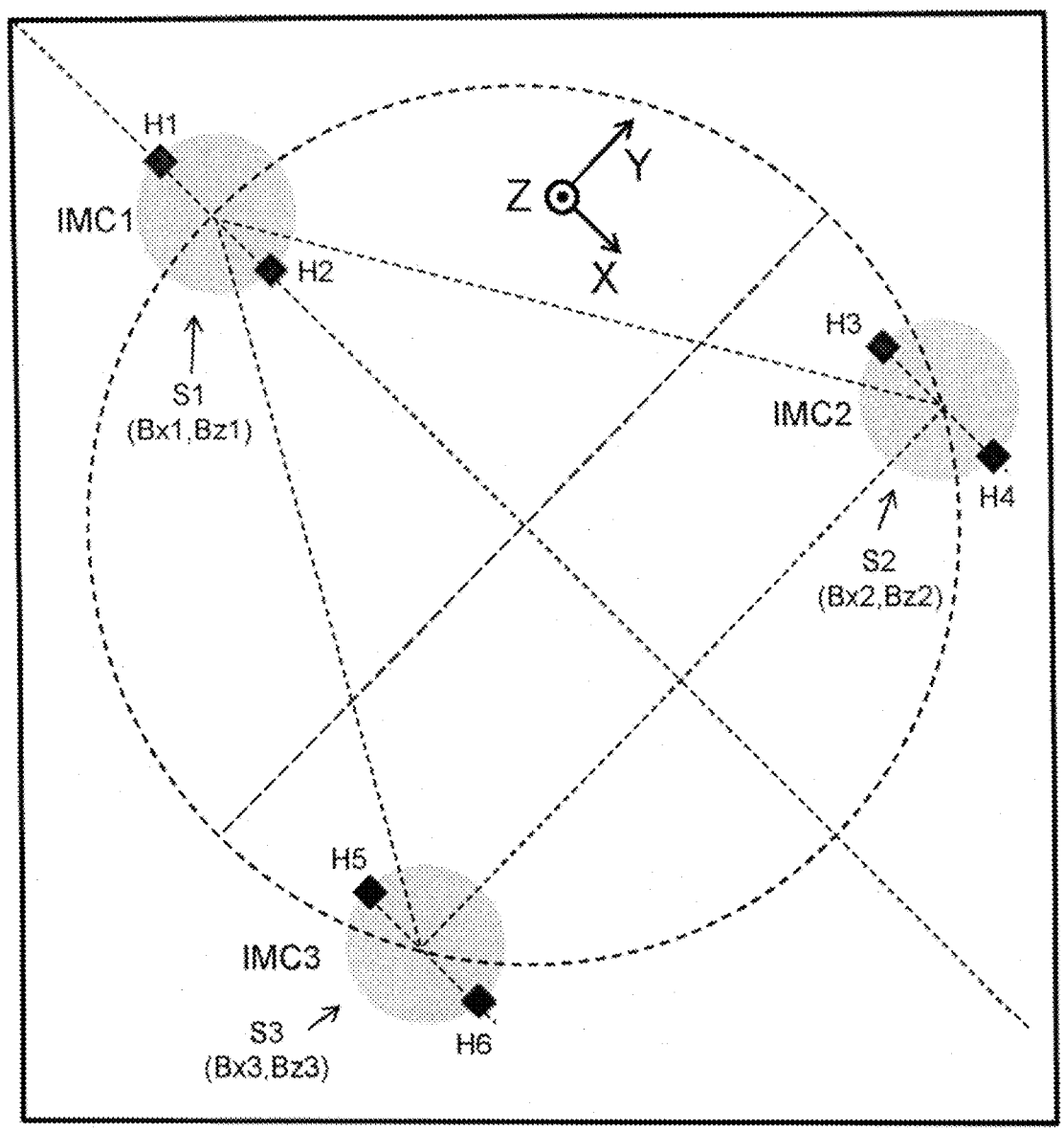
FIG. 4 to FIG. 21 are schematic block diagrams of sensor circuits as can be used in embodiments of the present invention.

FIG. 4 is a schematic block diagram of a sensor circuit as can be used in embodiments of the present invention. The sensor circuit comprises three 2D magnetic pixels located on a virtual circle. In the example shown, the tree sensors are angularly spaced apart by multiples of 120° apart. Each sensor is capable of measuring a Bx magnetic field component parallel to the semiconductor surface (also referred to as "in-plane magnetic field component"), and a Bz magnetic field component perpendicular to the semiconductor surface (also referred to as "out-of-plane magnetic field component"). This sensor circuit can measure six magnetic field components of the magnetic field generated by the magnet, which may be referred to herein as (Bx1, Bz1) at the first sensor location, (Bx2, Bz2) at the second sensor location, and (Bx3, Bz3) at the third sensor location. When this sensor circuit is used in the magnetic sensor system of FIG. 3(a) or FIG. 3(b) or a variant thereof, the magnet is preferably substantially located above the centre of the virtual circle.

Figure 5:
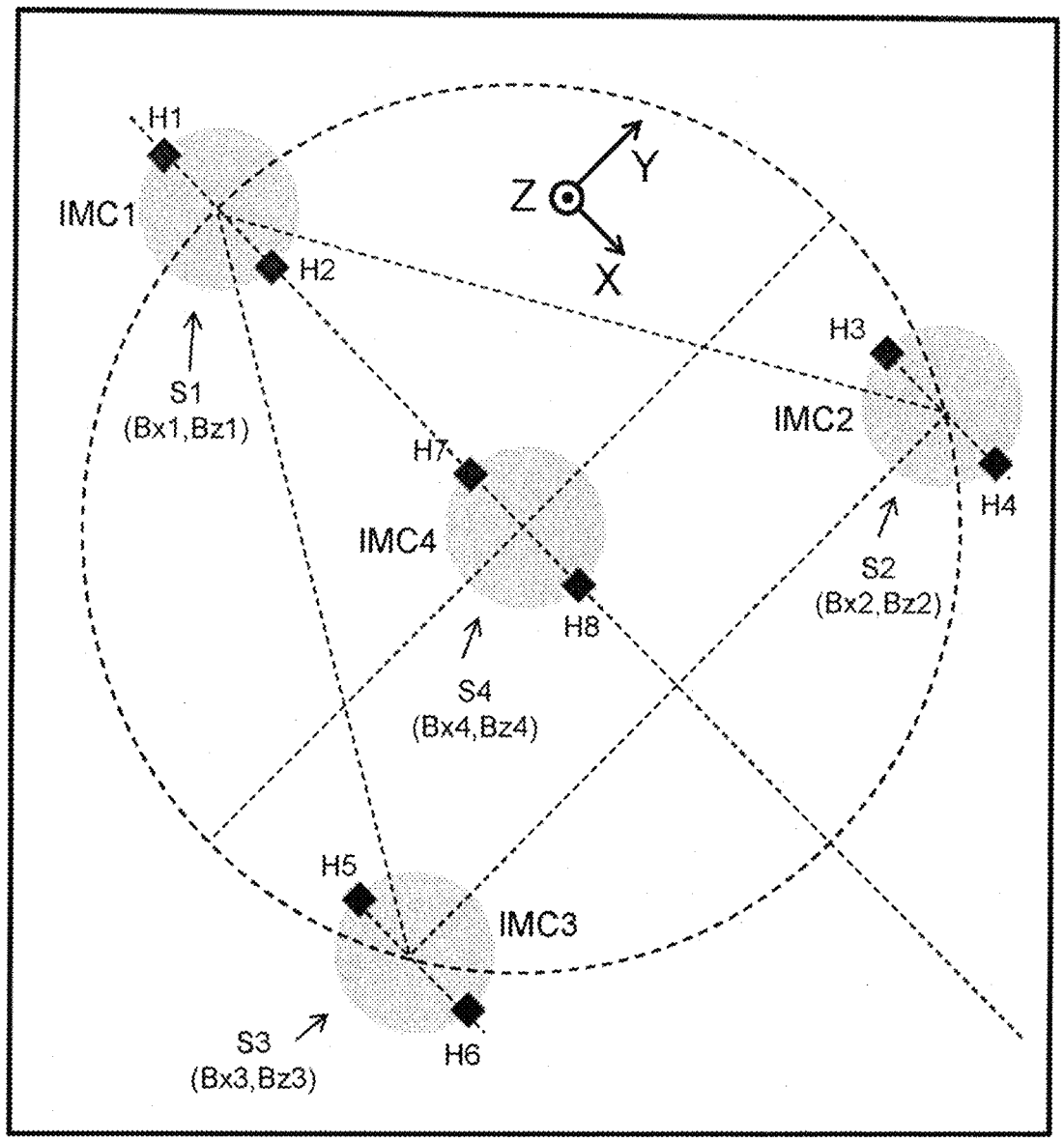

FIG. 5 is a schematic block diagram of a sensor circuit as can be used in embodiments of the present invention. This sensor circuit comprises four 2D magnetic pixels, three of which are located on a virtual circle, one of which is located in the centre of the virtual circle. The sensor circuit of FIG. 5 can be regarded as a variant of the sensor circuit of FIG. 4 with an additional 2D magnetic pixel locator at the centre. This sensor circuit can measure eight magnetic field components of the magnetic field generated by the magnet, which may be referred to herein as (Bx1, Bz1) at the first sensor location, (Bx2, Bz2) at the second sensor location, (Bx3, Bz3) at the third sensor location, and (Bx4, Bz4) at the fourth sensor location. When this sensor circuit is used in the magnetic sensor system of FIG. 3(a) or FIG. 3(b) or a variant thereof, the magnet is preferably substantially located above the centre of the virtual circle.

Figure 13:
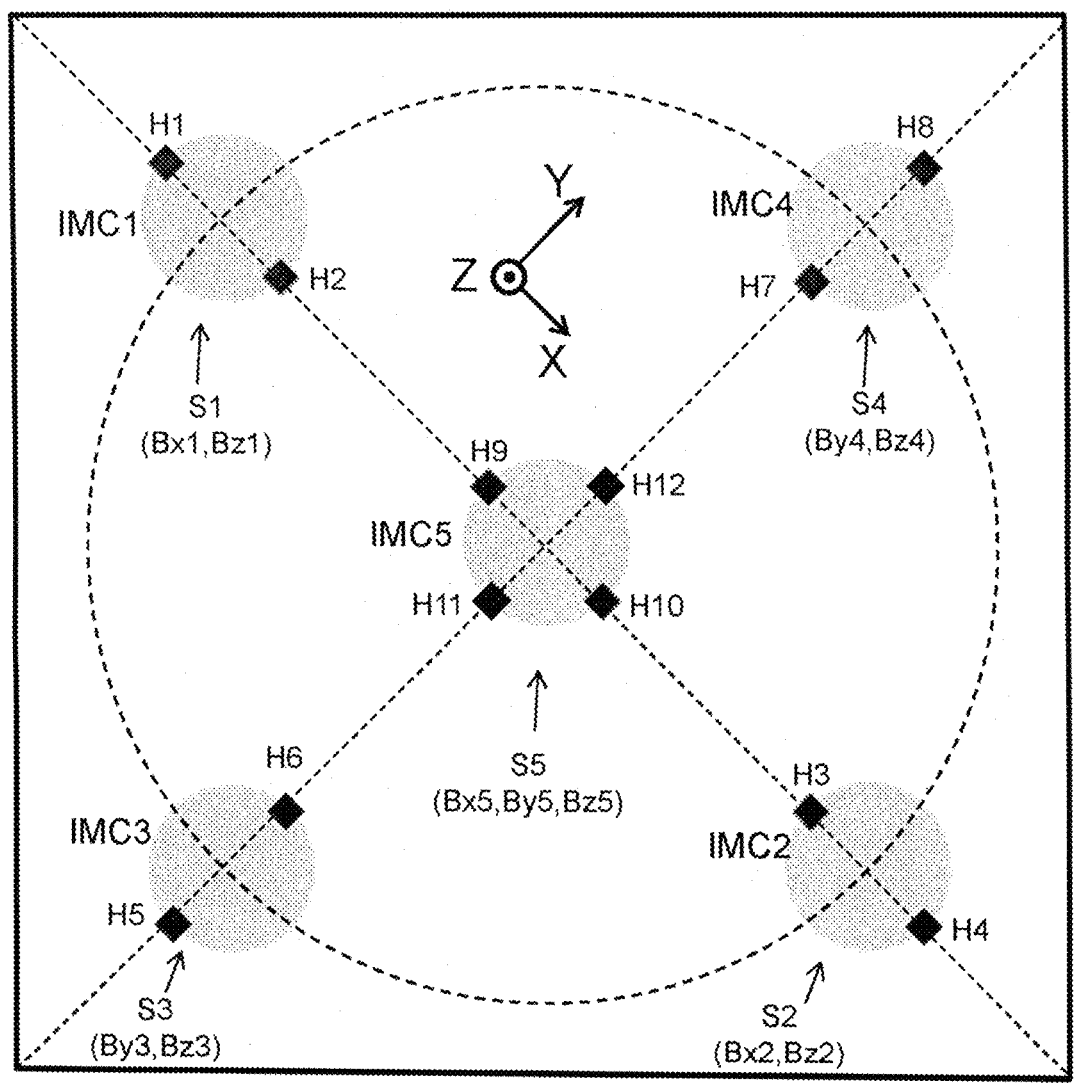
Figure 15A:
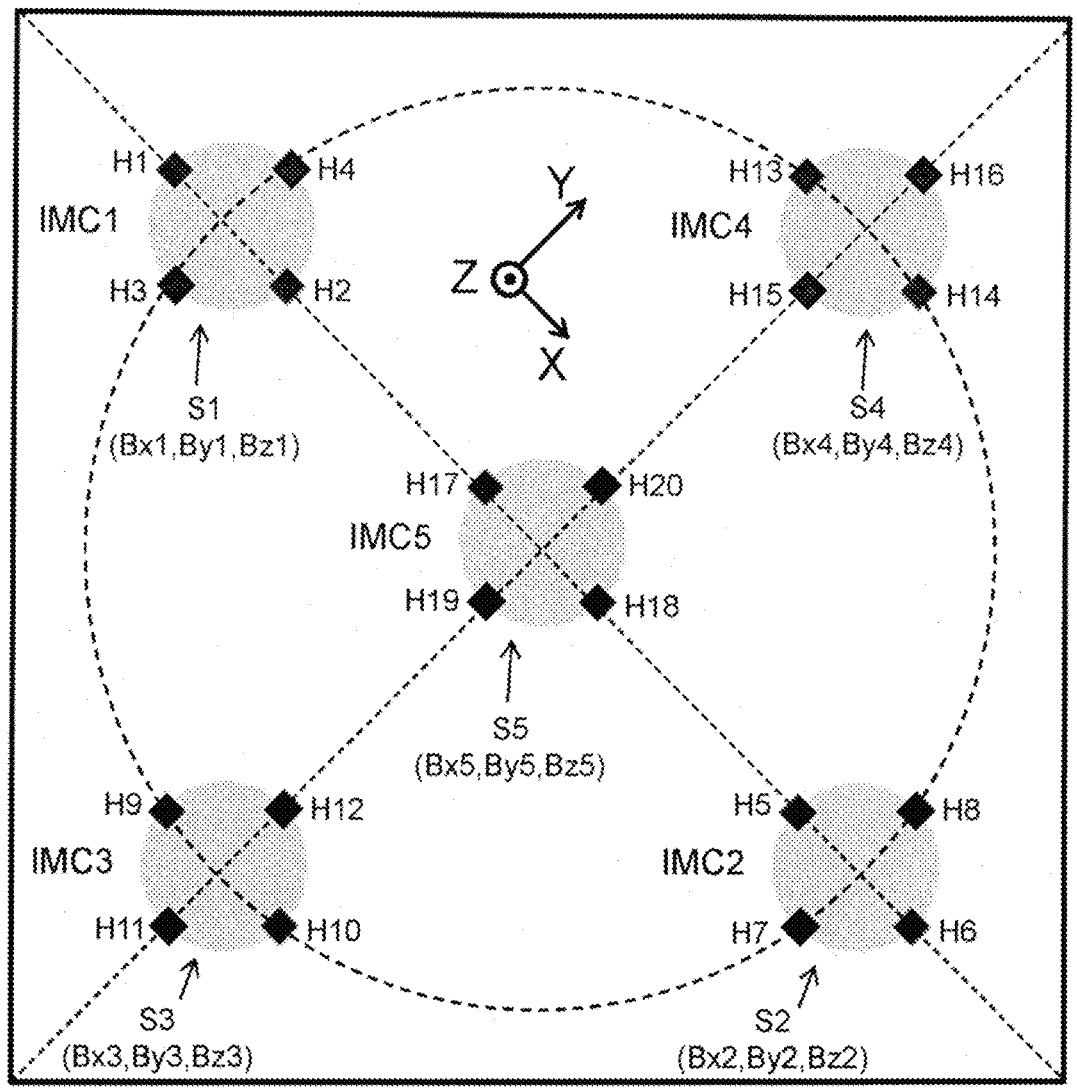
Figure 15B:
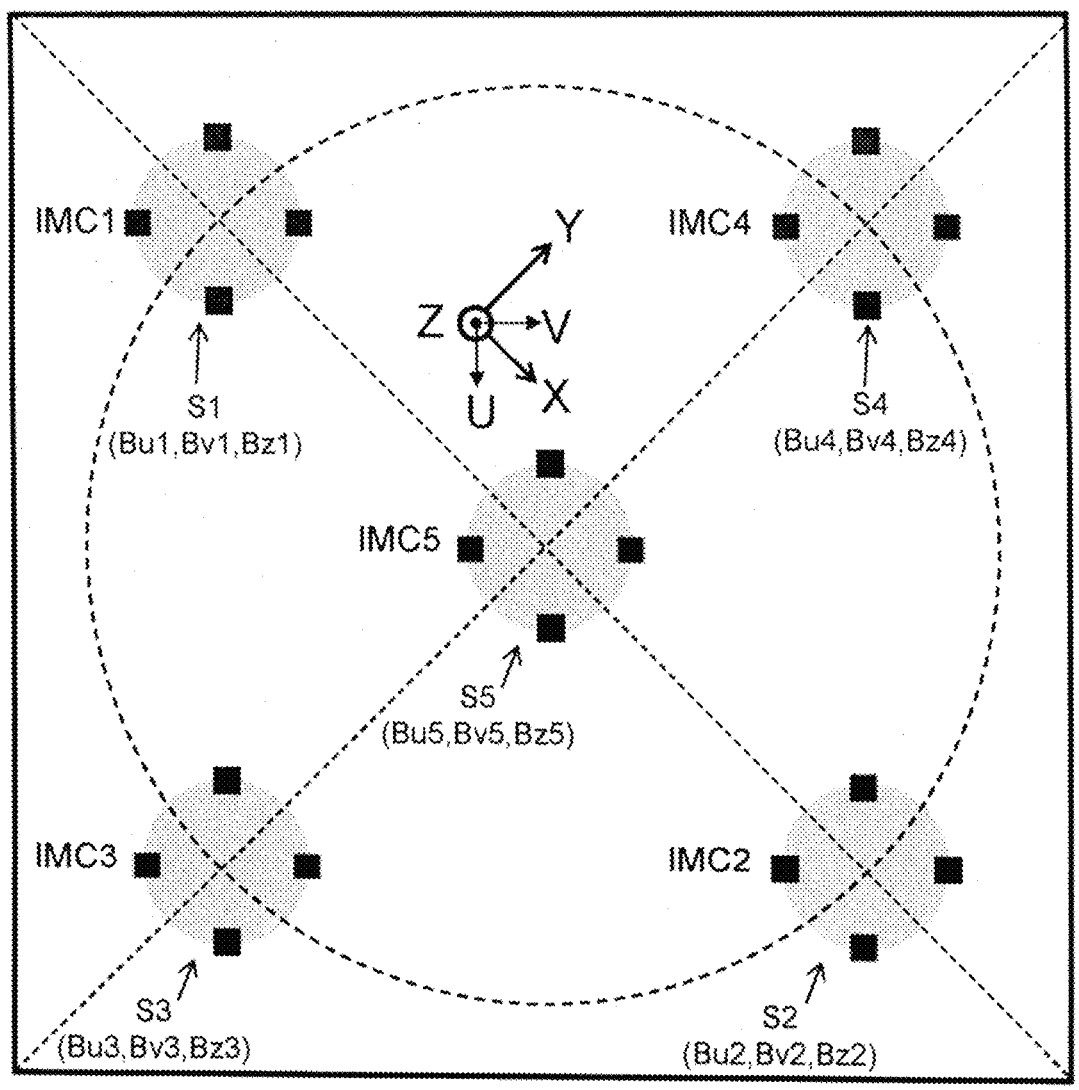

In a variant (not shown) of FIG. 5, the sensor located at the centre is a 3D magnetic pixel instead of a 2D magnetic pixel, (e.g. as in FIG. 13 and FIGS. 15(a) and 15(b)) and is configured for measuring three orthogonal magnetic field components Bx4, By4, Bz4 at the fourth sensor location.

Figure 6:
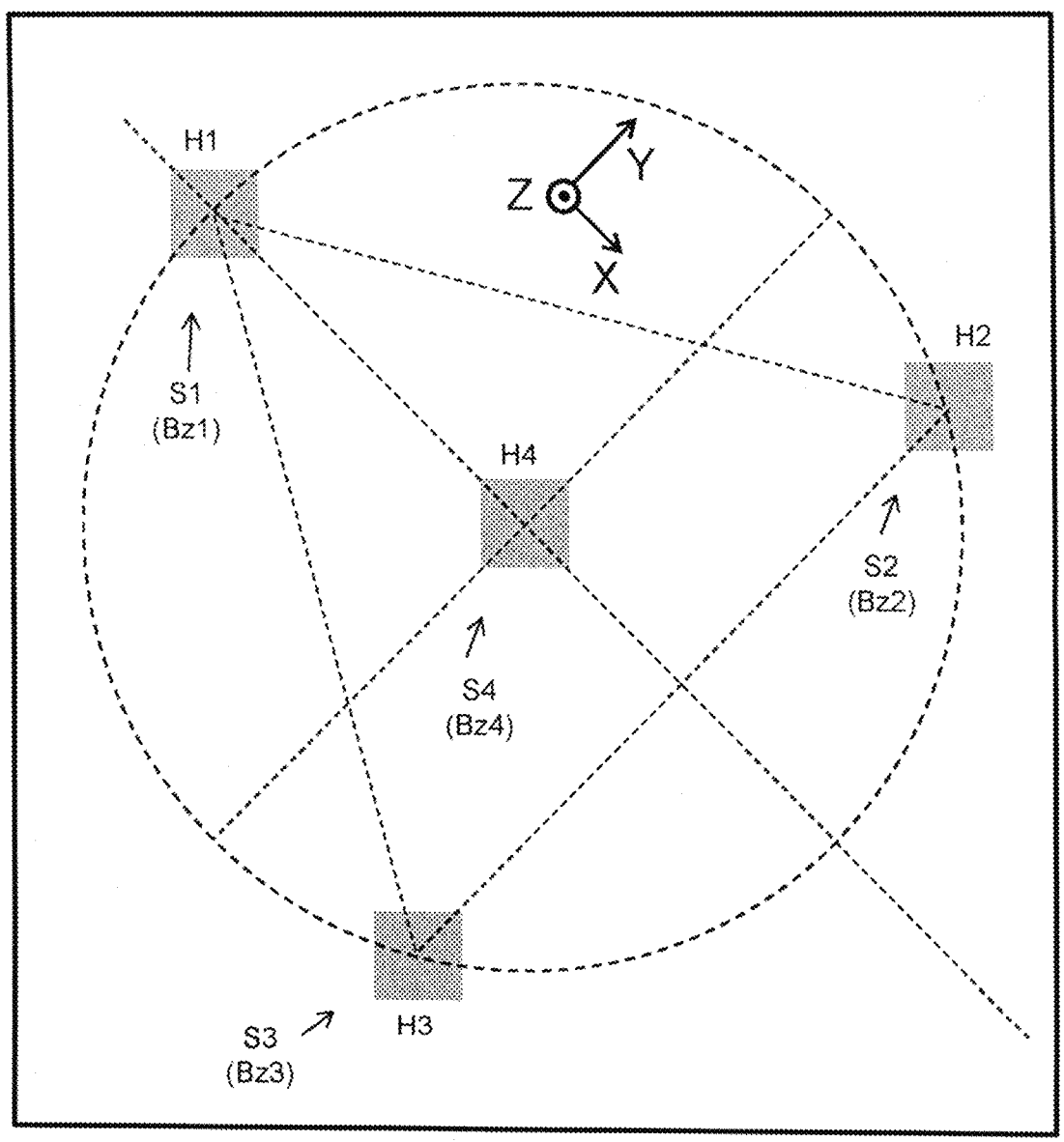

FIG. 6 is a schematic block diagram of a sensor circuit as can be used in embodiments of the present invention. This sensor circuit comprises four 1D magnetic pixels, three of which are located on a virtual circle, one of which is located in the centre of the virtual circle. In the example shown, each sensor is a horizontal Hall element. This sensor circuit can measure four magnetic field components of the magnetic field generated by the magnet, which may be referred to herein as (Bz1) at the first sensor location, (Bz2) at the second sensor location, (Bz3) at the third sensor location, and (Bz4) at the fourth sensor location. When this sensor circuit is used in the magnetic sensor system of FIG. 3(a) or FIG. 3(b) or a variant thereof, the magnet is preferably substantially located above the centre of the virtual circle.

The inventors came to the surprising insight that, at least in theory, these four sensor signals should be sufficient to uniquely determine a 3D position of the magnet relative to the semiconductor substrate, or physical quantities related to said position, even in the presence of magnetic disturbance field, since only Bz_ext is unknown (Bx_ext and By_ext are irrelevant in this case).

In a variant (not shown) of FIG. 6, the sensor circuit contains five horizontal Hall elements, four of which are located on the virtual circle, angularly spaced by multiples of 90°, and one of which is located in the centre of the virtual circle. This sensor circuit is capable of measuring Bz1 to Bz5.

In a variant (not shown) of FIG. 6, the sensor circuit contains four vertical Hall elements, each having an axis of maximum sensitivity oriented in a single direction parallel to the semiconductor substrate, for example the X-direction. This sensor circuit is capable of measuring Bx1 to Bx4. In a further variant, the sensor circuit contains a fifth vertical Hall element situated in the centre of the virtual circle.

In a variant (not shown) of FIG. 6, the sensor circuit contains four magneto-resistive (MR) elements, each having an axis of maximum sensitivity oriented in a single direction parallel to the semiconductor substrate, for example the X-direction. This sensor circuit is capable of measuring Bx1 to Bx4. In a further variant, the sensor circuit contains a fifth MR element situated in the centre of the virtual circle.

In a variant (not shown) of FIG. 6, the sensor circuit contains an array of horizontal Hall elements (without IMC), each configured for measuring Bz in a direction perpendicular to the semiconductor substrate, e.g. located on an N×M grid, where N and M are integer values in the range from 2 to 5, e.g. a 2×4 grid, a 3×3 grid, a 3×4 grid, a 3×5 grid, a 4×4 grid, etc. The grid lines may be perpendicular, but that is not absolutely required. The distance between parallel grid lines may be constant, but also that is not absolutely required. Not all locations of the array need to be occupied by a Hall element.

Figure 7A:
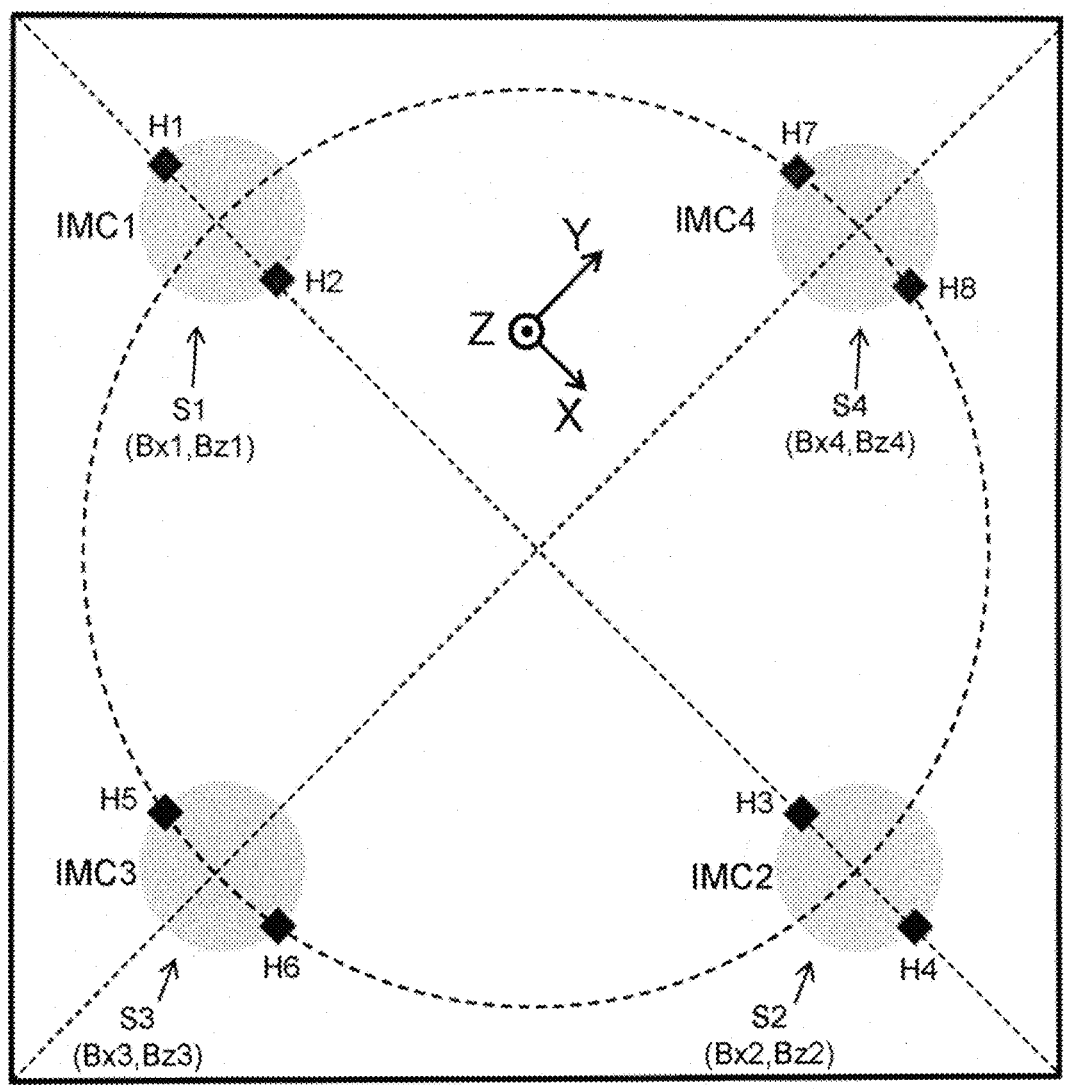

In another variant (not shown) of FIG. 6, the sensor circuit contains a plurality of at least four magnetic sensors, only horizontal Hall elements (without IMC), located at random or pseudo-random locations, e.g. not located on a circle or a square or a grid, and/or not equidistantly spaced from one another, each configured for measuring Bz in a direction perpendicular to the semiconductor substrate FIG. 7(a) is a schematic block diagram of a sensor circuit as can be used in embodiments of the present invention. This sensor circuit comprises four 2D magnetic pixels, located on a virtual circle, angularly spaced by multiples of 90°. This sensor circuit can measure eight magnetic field components of the magnetic field generated by the magnet, which may be referred to herein as (Bx1, Bz1) at the first sensor location, (Bx2, Bz2) at the second sensor location, (Bx3, Bz3) at the third sensor location, and (Bx4, Bz4) at the fourth sensor location. When this sensor circuit is used in the magnetic sensor system of FIG. 3(a) or FIG. 3(b) or a variant thereof, the magnet is preferably substantially located above the centre of the virtual circle.

Figure 7B:
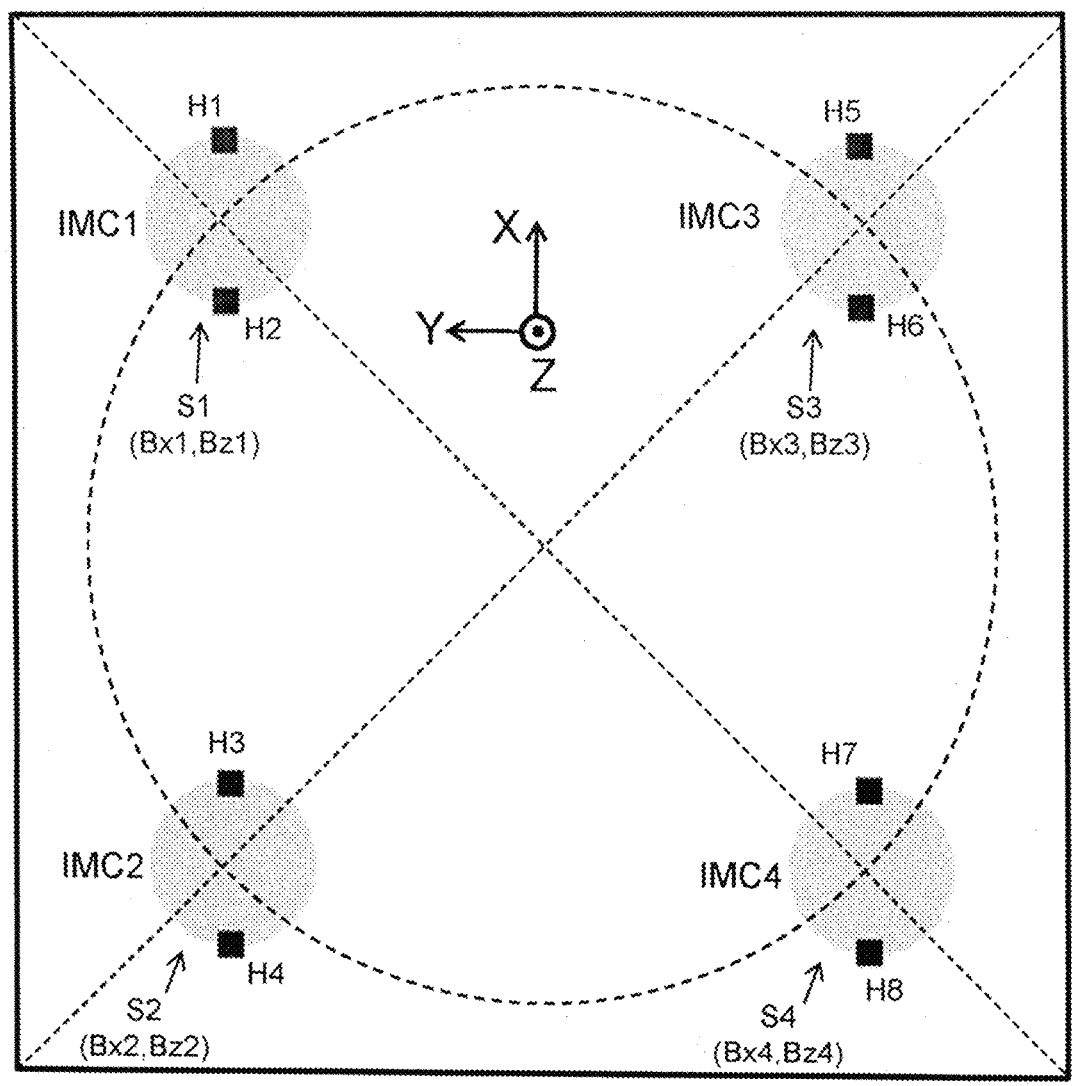

FIG. 7(b) shows a variant of FIG. 7(a) where all the 2D pixels are rotated by 45°.

Figure 8:
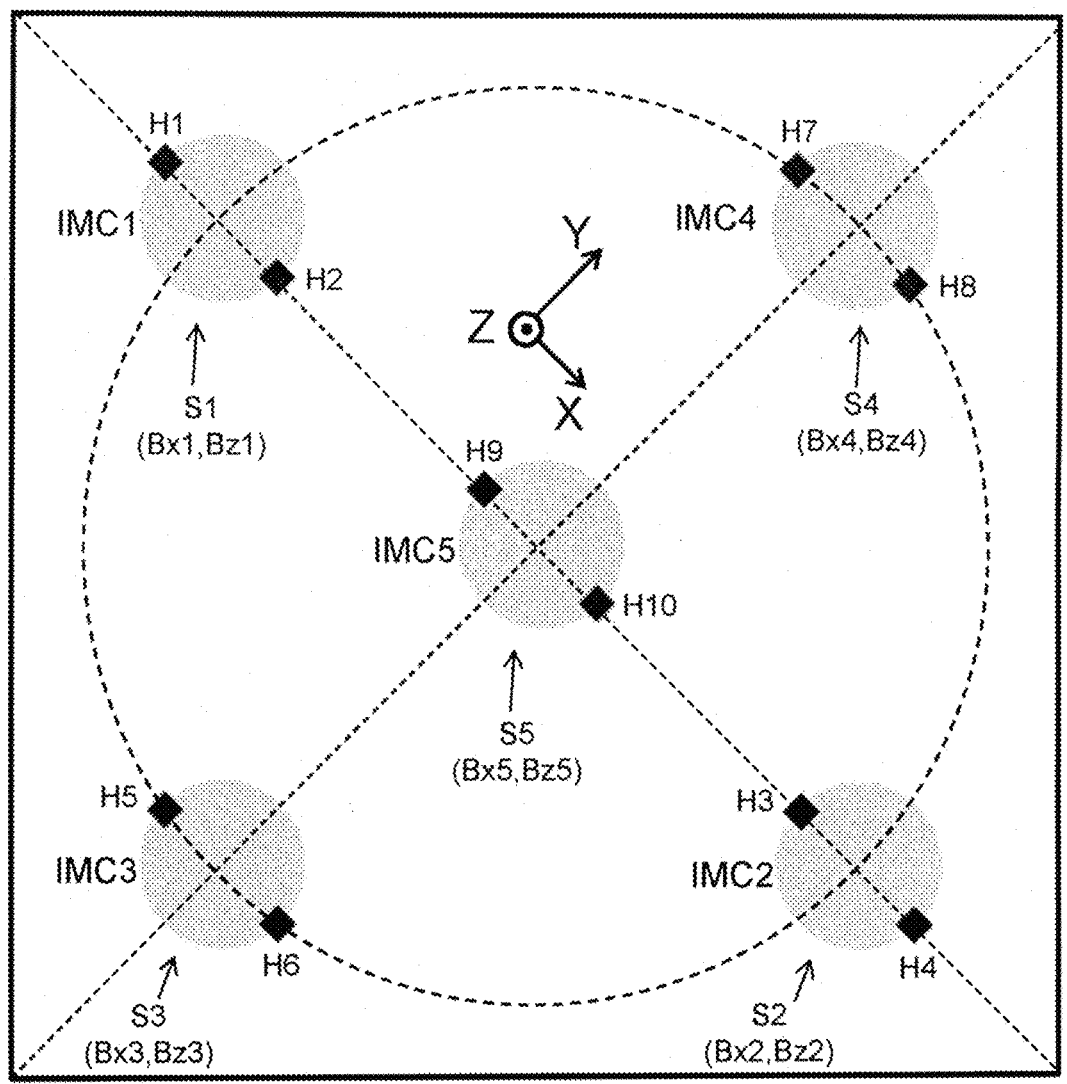

FIG. 8 is a schematic block diagram of a sensor circuit as can be used in embodiments of the present invention. This sensor circuit comprises five 2D magnetic pixels, four of which are located on a virtual circle, angularly spaced by multiples of 90°, one of which is located in the centre of the virtual circle. The sensor circuit of FIG. 8 can be regarded as a variant of the sensor circuit of FIGS. 7(a) and 7(b) with an additional 2D magnetic pixel locator at the centre. This sensor circuit can measure ten magnetic field components of the magnetic field generated by the magnet, which may be referred to herein as (Bx1, Bz1) at the first sensor location, (Bx2, Bz2) at the second sensor location, (Bx3, Bz3) at the third sensor location, (Bx4, Bz4) at the fourth sensor location, and (Bx5, Bz5) at the fifth sensor location. When this sensor circuit is used in the magnetic sensor system of FIG.

3(a) or FIG. 3(b) or a variant thereof, the magnet is preferably substantially located above the centre of the virtual circle.

In a variant (not shown) of FIG. 8, the sensor S5 located at the centre is a 3D magnetic pixel instead of a 2D magnetic pixel, (e.g. as in FIG. 13 and FIGS. 15(a) and 15 (b)) and is configured for measuring three orthogonal magnetic field components Bx5, By5, Bz5 at the fifth sensor location.

Figure 9:
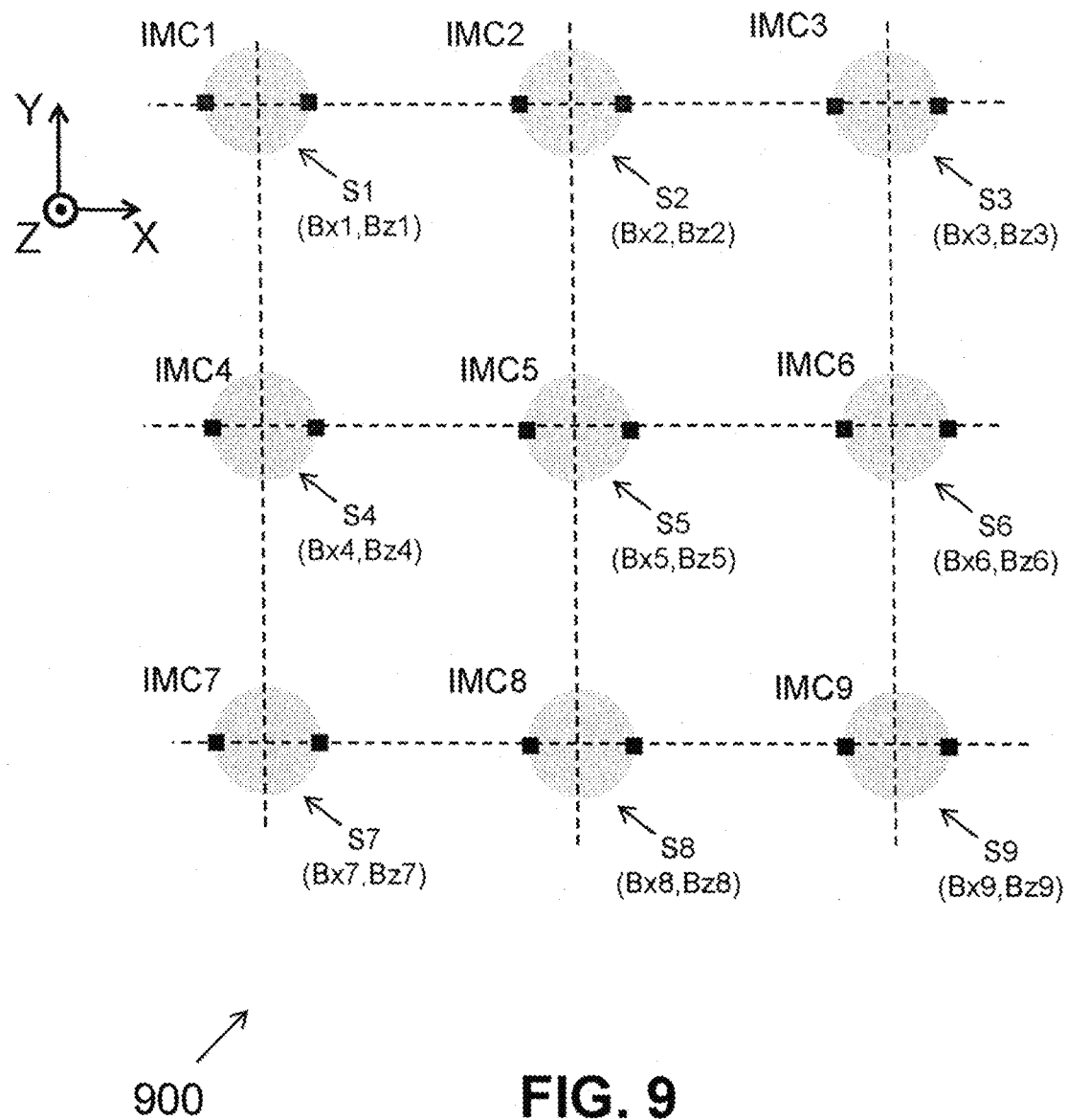

FIG. 9 is a schematic block diagram of a sensor circuit as can be used in embodiments of the present invention. This sensor circuit comprises an array of 3×3=9 (nine) 2D magnetic pixels, located on a grid having three rows and three columns. This sensor circuit can measure nine sets of two magnetic field components (Bx, Bz) each, thus 2×9=18 (eighteen) magnetic field components in total. The X-direction is parallel to the direction of the rows, and orthogonal to the direction of the columns. When this sensor circuit is used in the magnetic sensor system of FIG. 3(a) or FIG. 3(b) or a variant thereof, the magnet is preferably substantially located above the central sensor location (in its default position).

Figure 10:
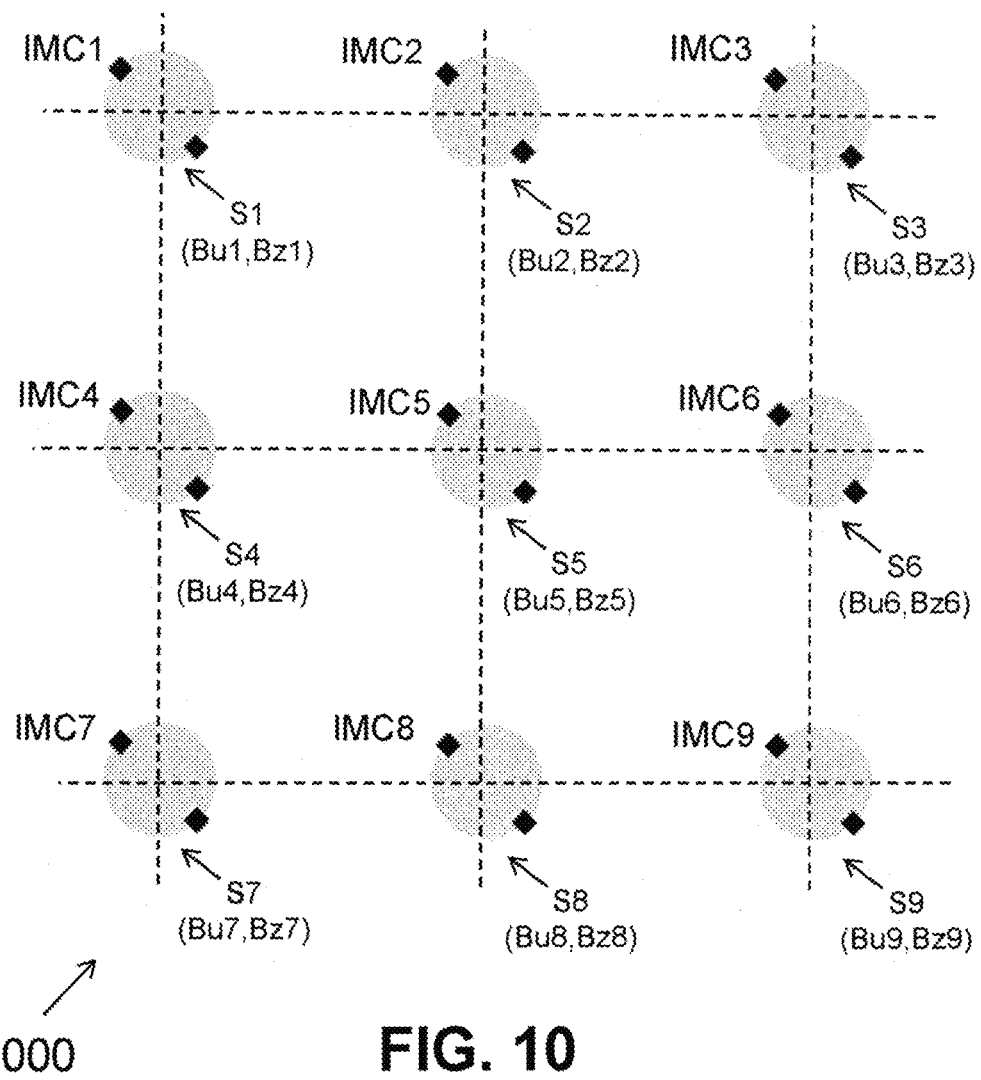

FIG. 10 is a schematic block diagram of a sensor circuit as can be used in embodiments of the present invention. This sensor circuit comprises an array of 3×3=9 (nine) 2D magnetic pixels, located on a grid having three rows and three columns. This sensor circuit can measure nine sets of two magnetic field components (Bu, Bz) each, thus 2×9=18 (eighteen) magnetic field components in total. If the X direction is chosen parallel to the direction of the rows, and the Y-direction is chosen parallel to the direction of the columns, the U-direction form an angle of 45° with the X-direction. The sensor circuit of FIG. 10 can be regarded as a variant of the sensor circuit of FIG. 9 where each of the sensors is rotated by 45° about the Z-axis. When this sensor circuit is used in the magnetic sensor system of FIG. 3(a) or FIG. 3(b) or a variant thereof, the magnet (when in its default position) is preferably substantially located above the central sensor location.

FIGS. 11(a) to 11(d) are a schematic block diagram of a sensor circuit as can be used in embodiments of the present invention. This sensor circuit comprises eight 2D magnetic pixels, located on a grid having three rows and three columns. This sensor circuit can be considered a variant of the sensor circuit of FIG. 9 where the central sensor is omitted, and where the two Hall elements of each sensor are located on a virtual line passing through the central position.

Figure 11A:
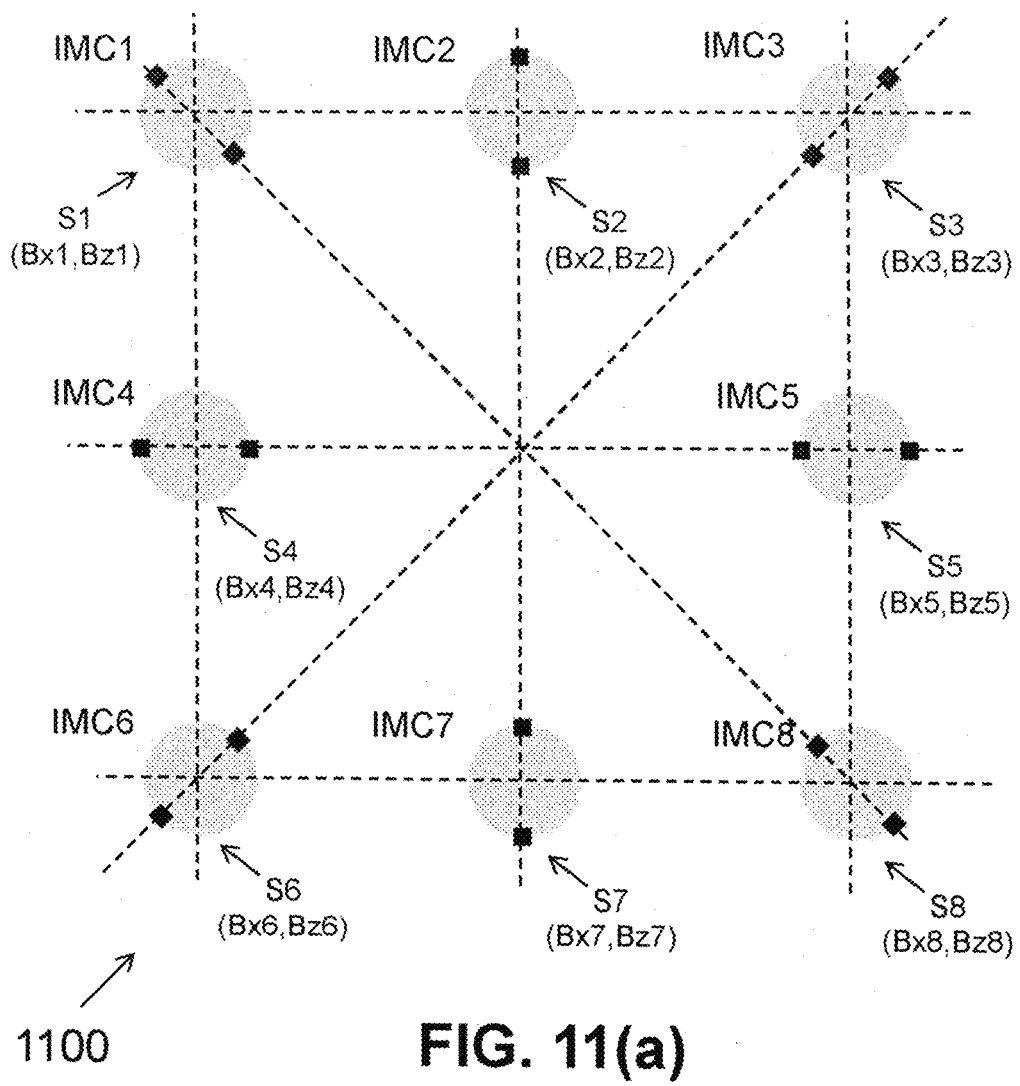
Figure 11B:
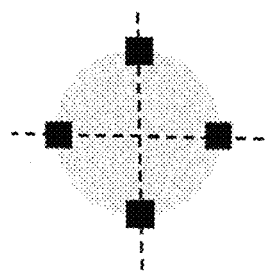

In a variant (not shown) of FIGS. 11(a) to 11(d), the sensor circuit further comprises a 3D magnetic pixel with only four horizontal Hall elements located on virtual lines parallel to the direction of the rows and columns, as depicted in FIG. 11(b).

Figure 11C:
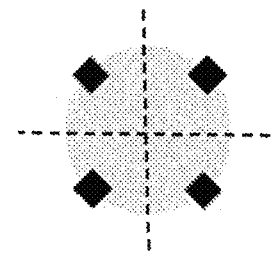

In a variant (not shown) of FIGS. 11(a) to 11(d), the sensor circuit further comprises a 3D magnetic pixel with only four horizontal Hall elements located on virtual lines forming angles of 45° with respect to the direction of the rows and columns, as depicted in FIG. 11(c).

Figure 11D:
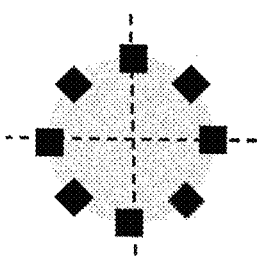

In a variant (not shown) of FIGS. 11(a) to 11(d), the sensor circuit further comprises a 3D magnetic pixel with eight horizontal Hall elements spaced apart by multiples of 45°, two of which are located on a row, and two of which are located on a column, as depicted in FIG. 11(d).

Figure 12:
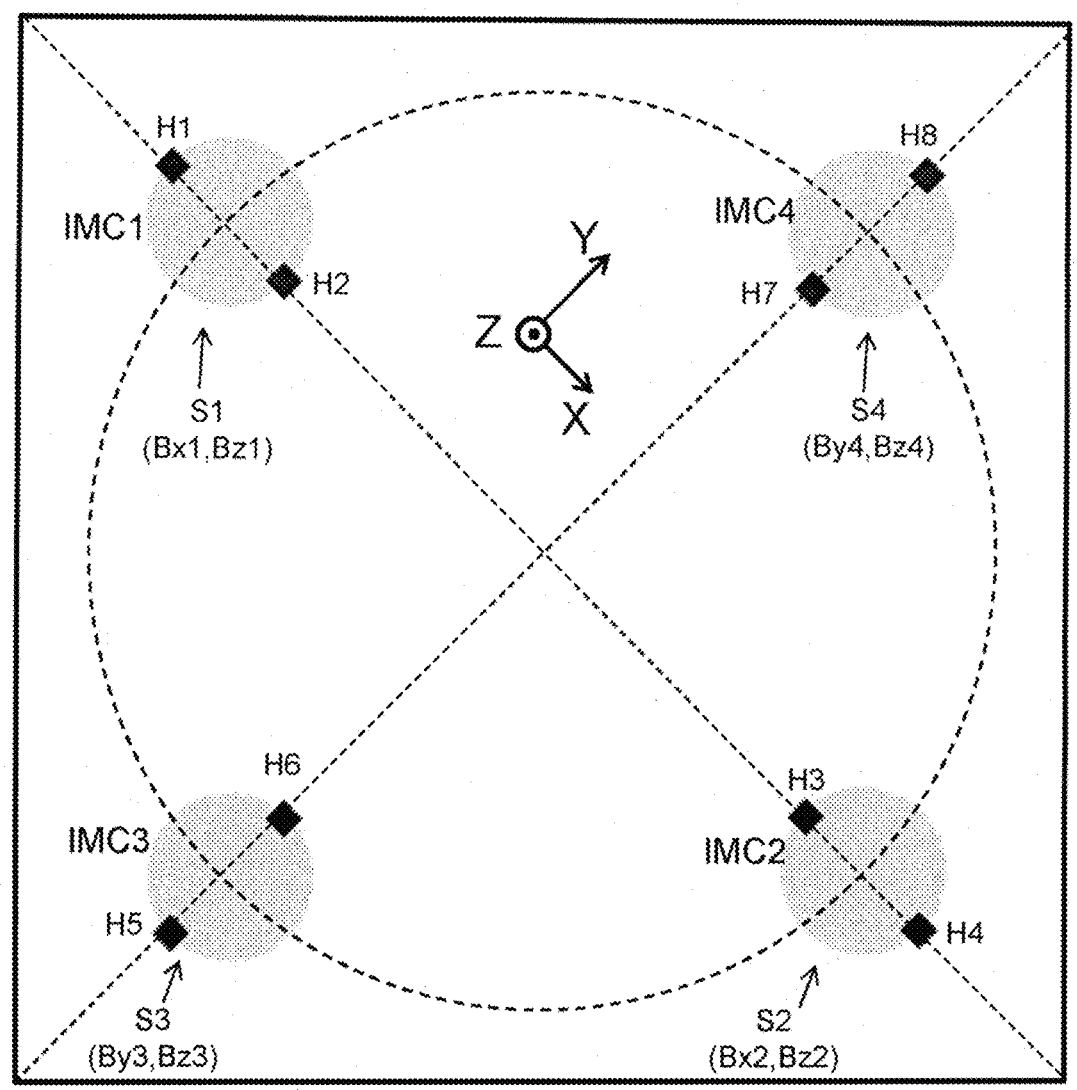

FIG. 12 is a schematic block diagram of a sensor circuit as can be used in embodiments of the present invention. This sensor circuit comprises four 2D magnetic pixels located on a virtual circle. The two Hall elements of each sensor are located on a radially oriented segment. This sensor structure is capable of measuring (Bx1, Bz1) at a first sensor location, measuring (Bx2, Bz2) at a second sensor location, measuring (By3, Bz3) at a third sensor location, and measuring (By4, Bz4) at a fourth sensor location, thus eight magnetic field components in total.

FIG. 13 is a schematic block diagram of a sensor circuit as can be used in embodiments of the present invention. This sensor circuit can be seen as a variant of the sensor circuit of FIG. 12, further comprising 3D magnetic pixel at the centre of the virtual circle. This sensor circuit is capable of measuring (4×2)+(1×3)=8+3=11 magnetic field components.

Figure 14A:
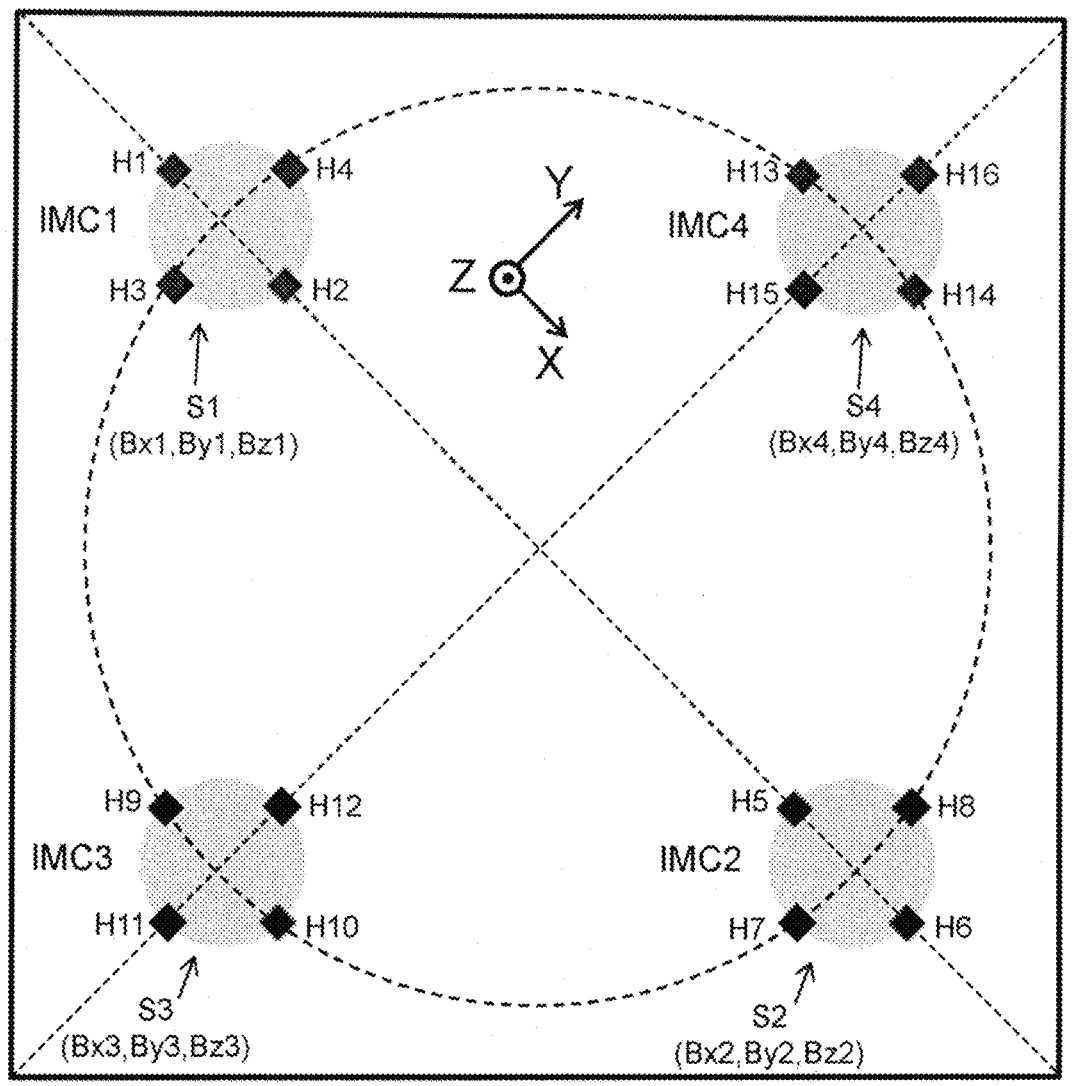

FIG. 14(a) is a schematic block diagram of a sensor circuit as can be used in embodiments of the present invention. This sensor circuit comprises four 3D magnetic pixels located on a virtual circle, spaced apart by multiples of 90°. In this example, each sensor comprises an IMC disk with four horizontal Hall elements, two of which are located on a virtual line parallel to the X direction, and two of which are located on a virtual line parallel to the Y direction. This sensor circuit is capable of measuring two in-plane field components (Bx, By) at the four sensor locations, and of measuring an out of plane field component Bz at the four sensor locations, thus sixteen magnetic field components in total. Or stated in other words, this sensor circuit is capable of measuring four magnetic field components tangential to the virtual circle, and for magnetic field components radially oriented with respect to the virtual circle, and four axially oriented magnetic field components.

Figure 14B:
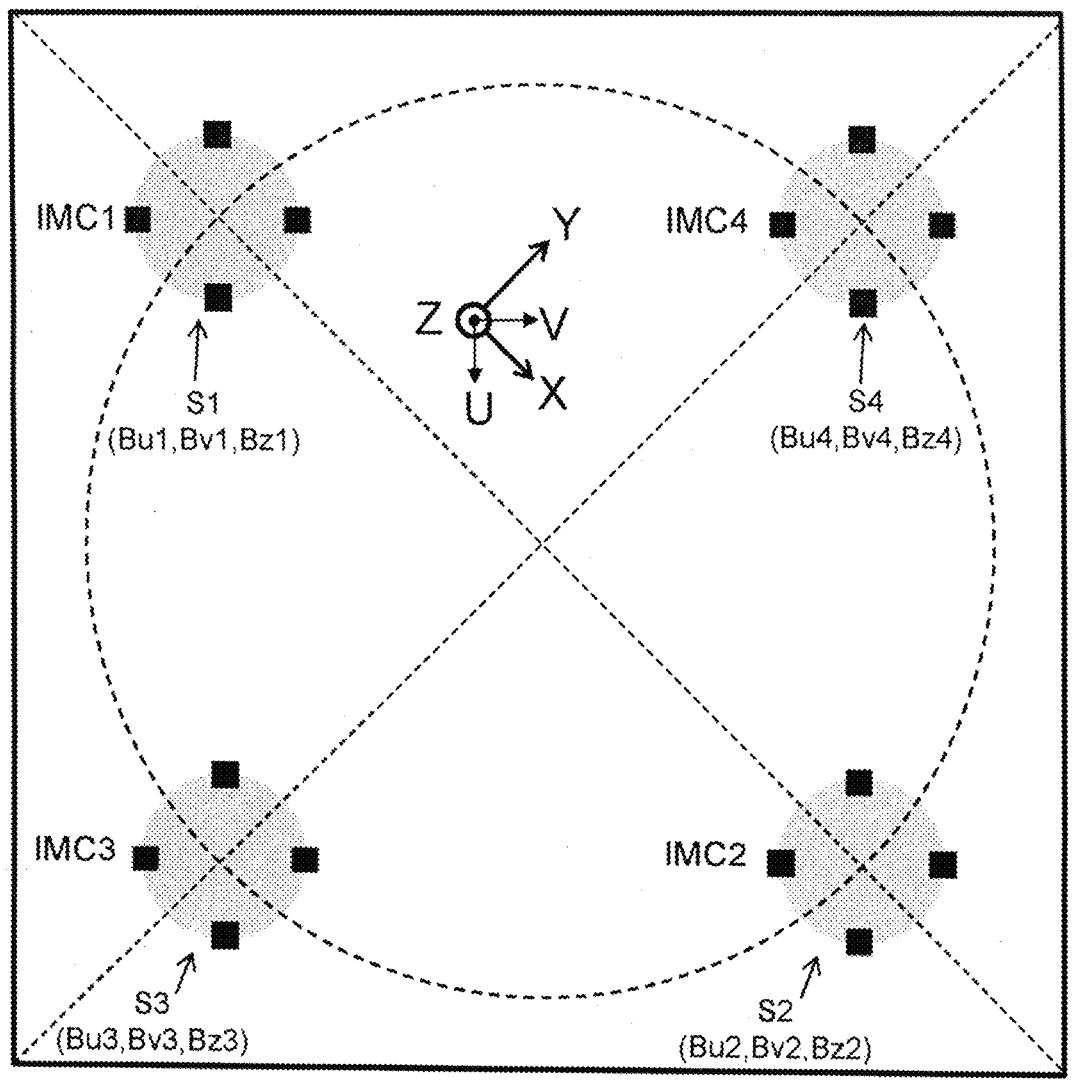

FIG. 14(b) is a schematic block diagram of a sensor circuit as can be used in embodiments of the present invention. This sensor circuit can be seen as a variant of the sensor circuit of FIG. 14(a) wherein each sensor is rotated by 45° with respect to the Z-axis perpendicular to the semiconductor substrate.

FIG. 15(a) is a schematic block diagram of a sensor circuit as can be used in embodiments of the present invention. This sensor circuit can be seen as a variant of the sensor circuit of FIG. 14(a), further comprising 3D magnetic pixel located at the centre of the virtual circle. This sensor circuit is capable of measuring (5×3)=15 magnetic field components.

FIG. 15(b) is a schematic block diagram of a sensor circuit as can be used in embodiments of the present invention. This sensor circuit can be seen as a variant of the sensor circuit of FIG. 15(a) wherein each sensor is rotated by 45° with respect to the Z-axis perpendicular to the semiconductor substrate.

Figure 16:
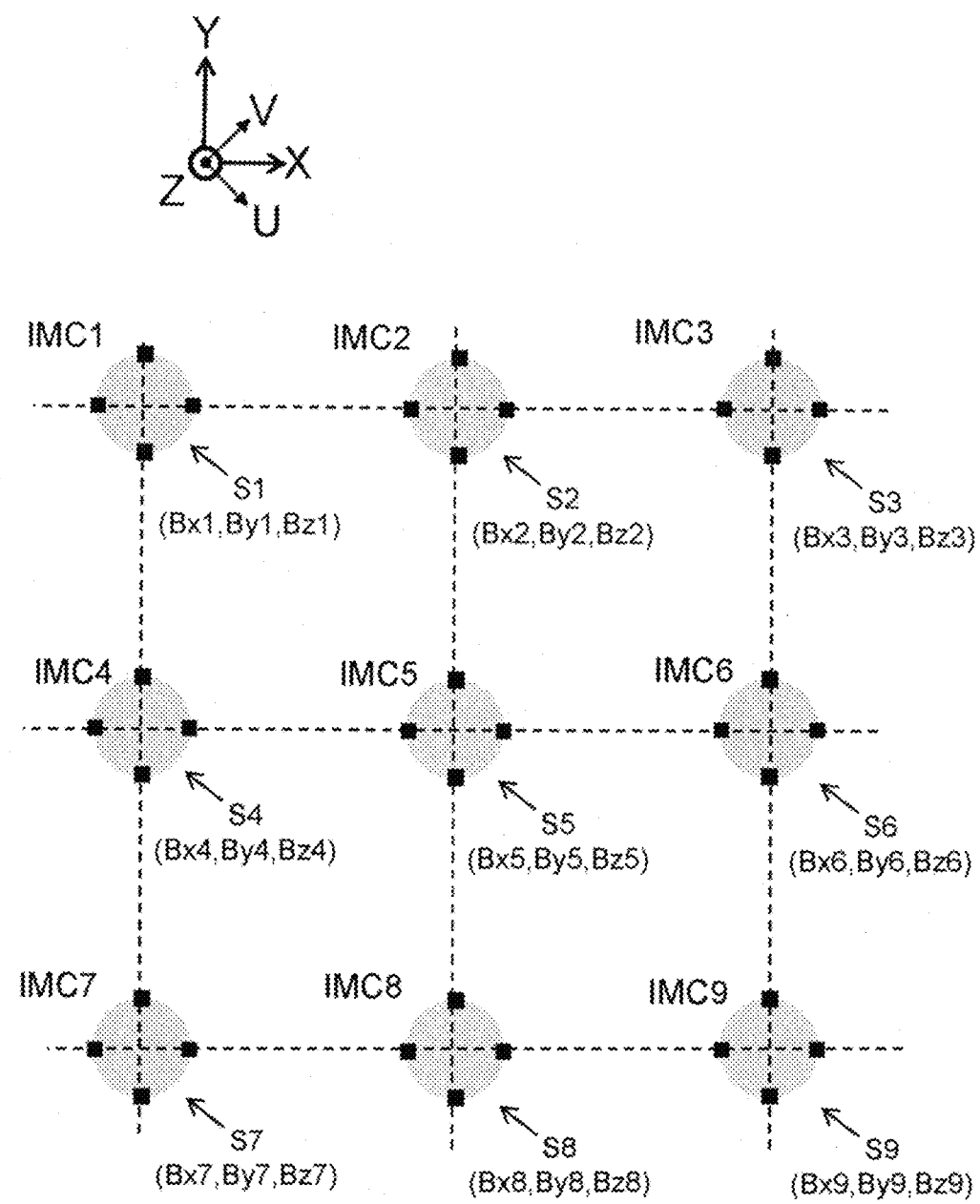

FIG. 16 is a schematic block diagram of a sensor circuit as can be used in embodiments of the present invention. This sensor circuit comprises an array of 3×3=9 (nine) 3D magnetic pixels, located on a grid having three rows and three columns. This sensor circuit can measure nine sets of three orthogonal magnetic field components (Bx, By, Bz) each, thus 3×9=27 magnetic field components in total. This sensor circuit can be seen as a variant of the sensor circuit of FIG. 9, wherein each 2D magnetic pixel is replaced by a 3D magnetic pixel.

In a variant (not shown) of FIG. 16, each sensor is rotated by 45° about the Z-axis perpendicular to the semiconductor substrate. This sensor is capable of measuring nine sets of three orthogonal magnetic field components (Bu, By, Bz), nine components oriented in the U-direction, nine components oriented in the V-direction, and nine components oriented in the Z-direction.

Figure 17A:
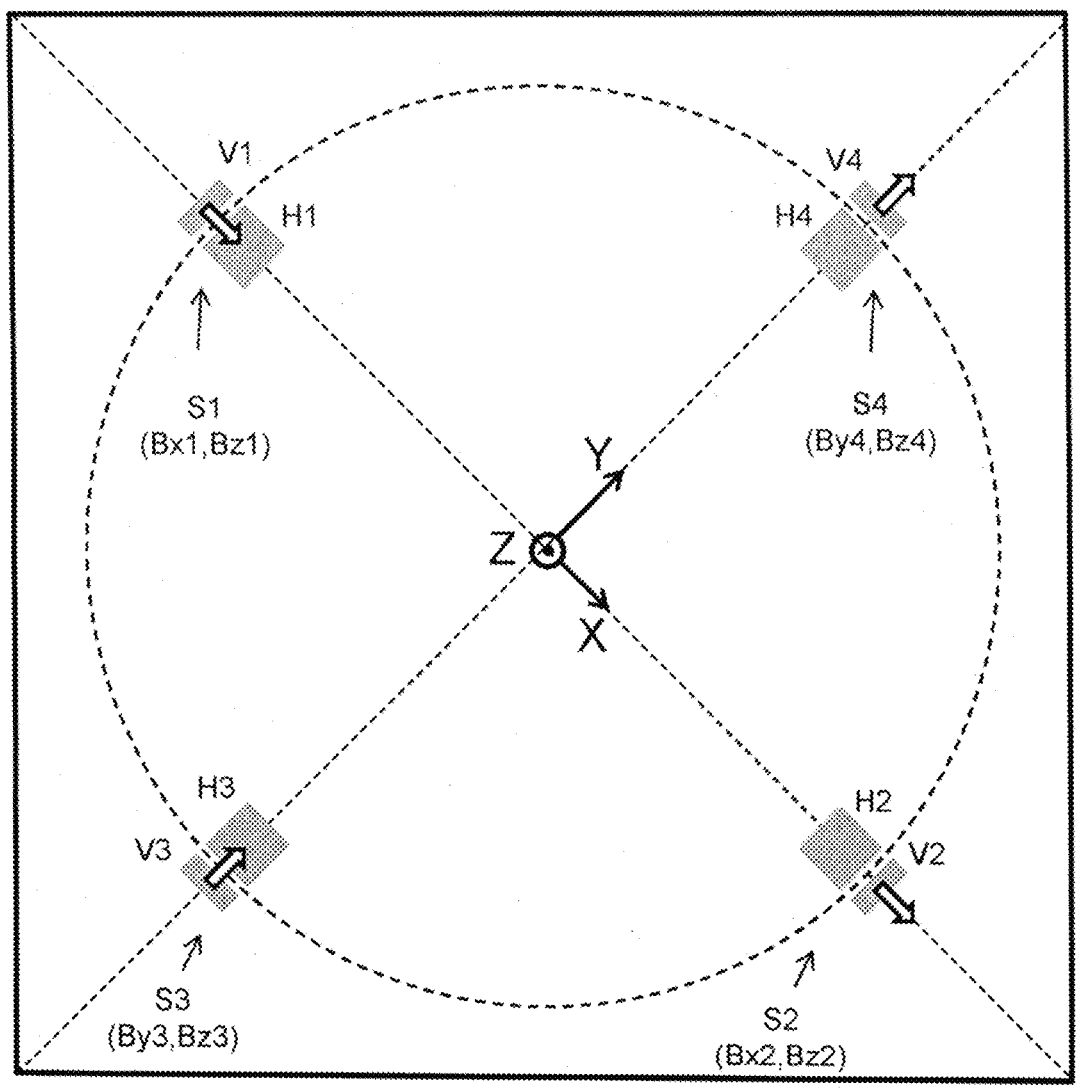

FIG. 17(a) is a schematic block diagram of a sensor circuit as can be used in embodiments of the present invention. This sensor circuit can be seen as a variant of the sensor circuit of FIG. 12 wherein each sensor comprises a horizontal Hall element (without IMC) configured for measuring an out-of-plane magnetic field component Bz and comprises a (or at least one) vertical Hall element having an axis of maximum sensitivity oriented in a radial direction.

Figure 17B:
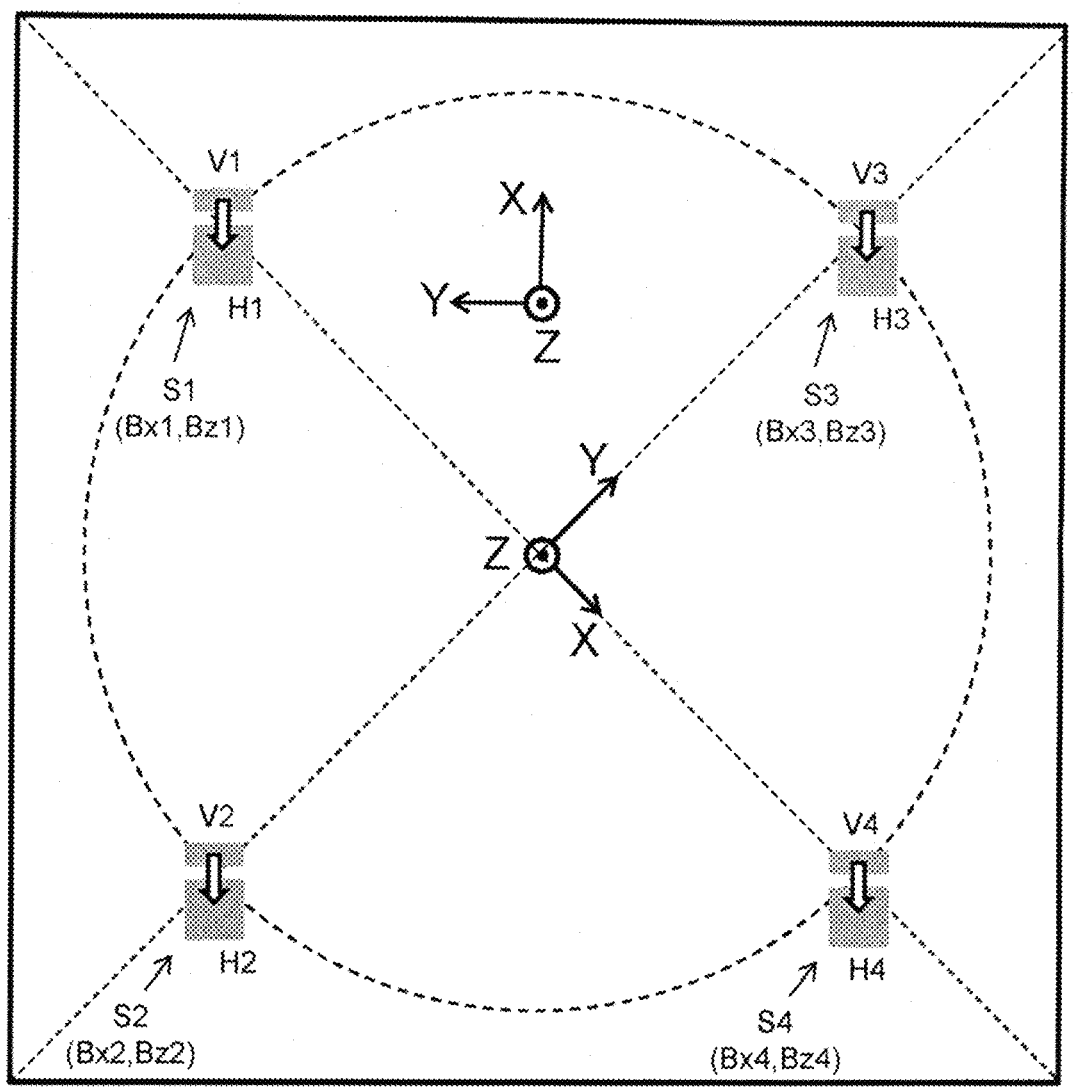

In a variant (not shown) of FIGS. 17(a) and 17(b), each sensor has two vertical Hall elements, oriented in the same direction, but spaced apart radially, for example one vertical Hall on either side of the horizontal Hall element, one at a larger imaginary circle, one at a smaller imaginary circle. The signals from the two corresponding vertical Hall elements may be added or averaged.

FIG. 17(b) shows a variant of FIG. 17(a) where all the 2D pixels are rotated by 45°.

Figure 18:
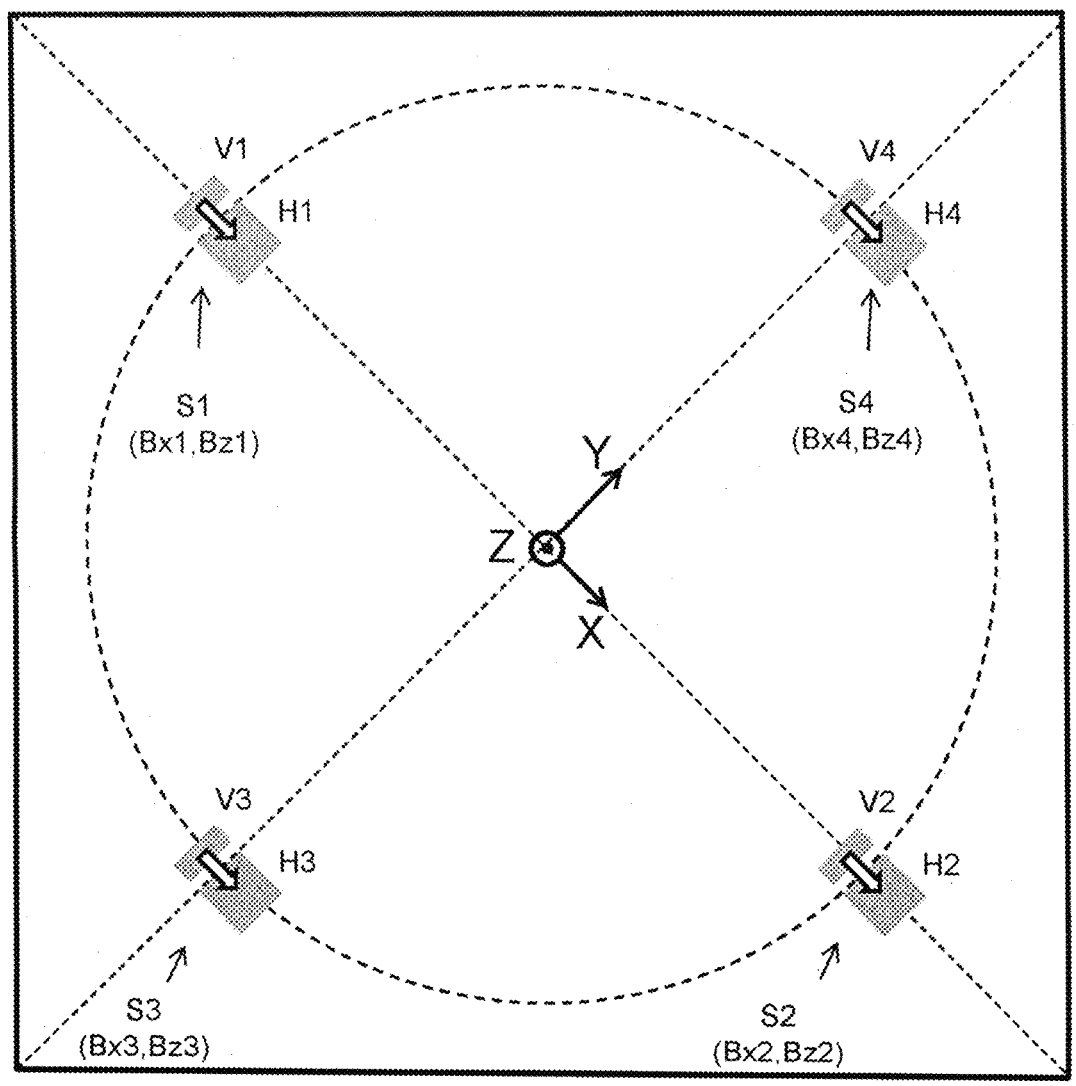

FIG. 18 is a schematic block diagram of a sensor circuit as can be used in embodiments of the present invention. This sensor circuit can be seen as a variant of the sensor circuit of FIGS. 7(a) and 7(b) wherein each sensor comprises a horizontal Hall element (without IMC) configured for measuring an out-of-plane magnetic field component Bz and comprises a (or at least one) vertical Hall element having an axis of maximum sensitivity oriented in the X-direction.

In a variant (not shown) of FIG. 18, the sensor circuit further comprises a fifth sensor located in the center of the virtual circle, also having a horizontal Hall element without IMC for measuring a Bz-component and at least one vertical Hall element for measuring a Bx component at the center of the virtual circle.

Figure 19A:
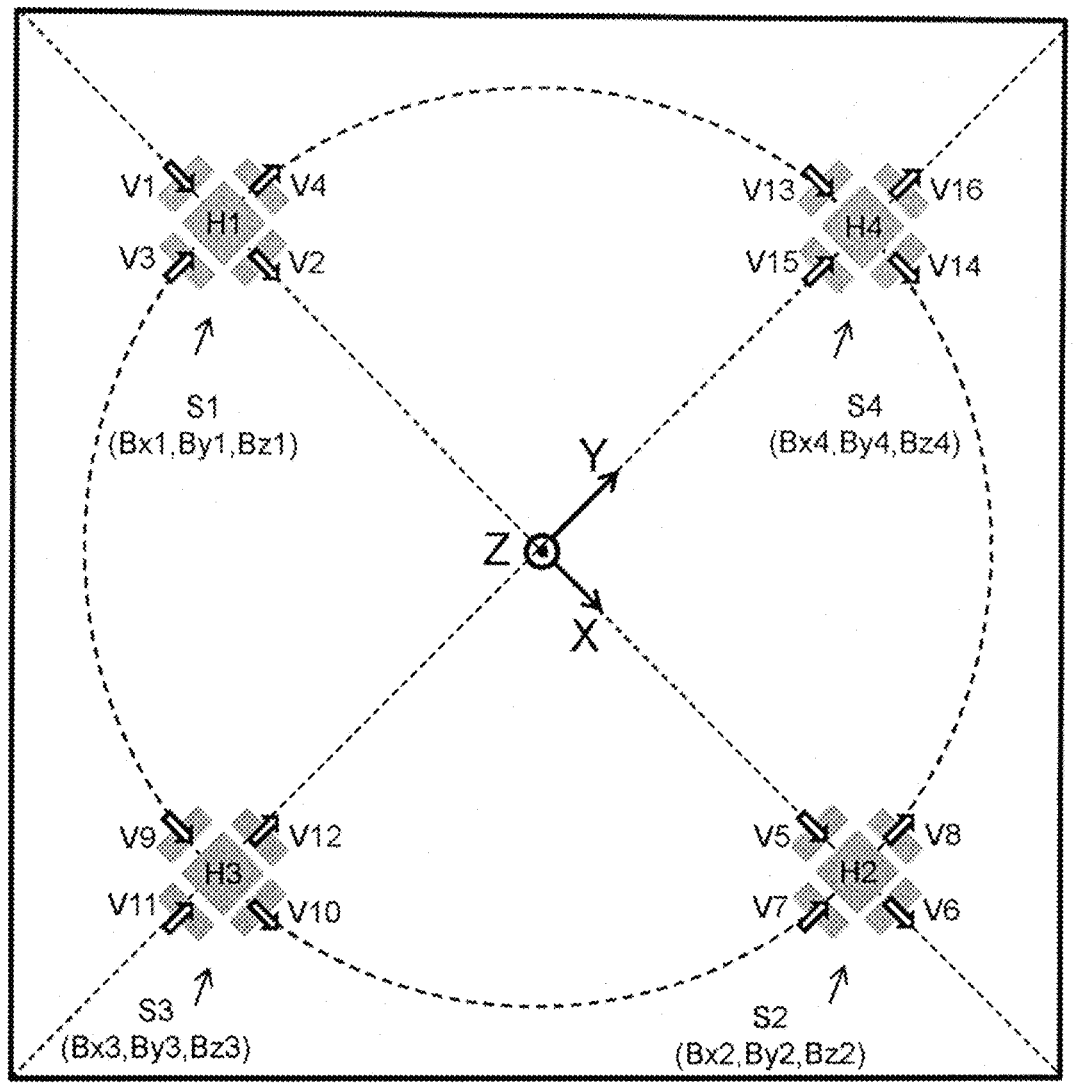

FIG. 19(a) is a schematic block diagram of a sensor circuit as can be used in embodiments of the present invention. This sensor circuit can be seen as a variant of the sensor circuit of FIG. 14(a) wherein each sensor comprises a horizontal Hall element (without IMC) configured for measuring an out-of-plane magnetic field component Bz, and comprises two vertical Hall element having an axis of maximum sensitivity oriented in the X-direction and located on opposite sides of the horizontal Hall element, and comprises two vertical Hall element having an axis of maximum sensitivity oriented in the Y-direction and located on opposite sides of the horizontal Hall element. In other words, the horizontal Hall element is surrounded by four vertical Hall elements located on the sides of a square. Each of these sensors forms a 3D magnetic pixel capable of measuring three orthogonal magnetic field components (Bx, By, Bz).

In a variant (not shown) of FIG. 19(a), the sensor circuit further comprises a fifth 3D magnetic pixel located in the center of the virtual circle. This sensor circuit is capable of measuring five sets of three orthogonal magnetic field components (Bx, By, Bz), hence 5×3=15 magnetic field components in total.

Figure 19B:
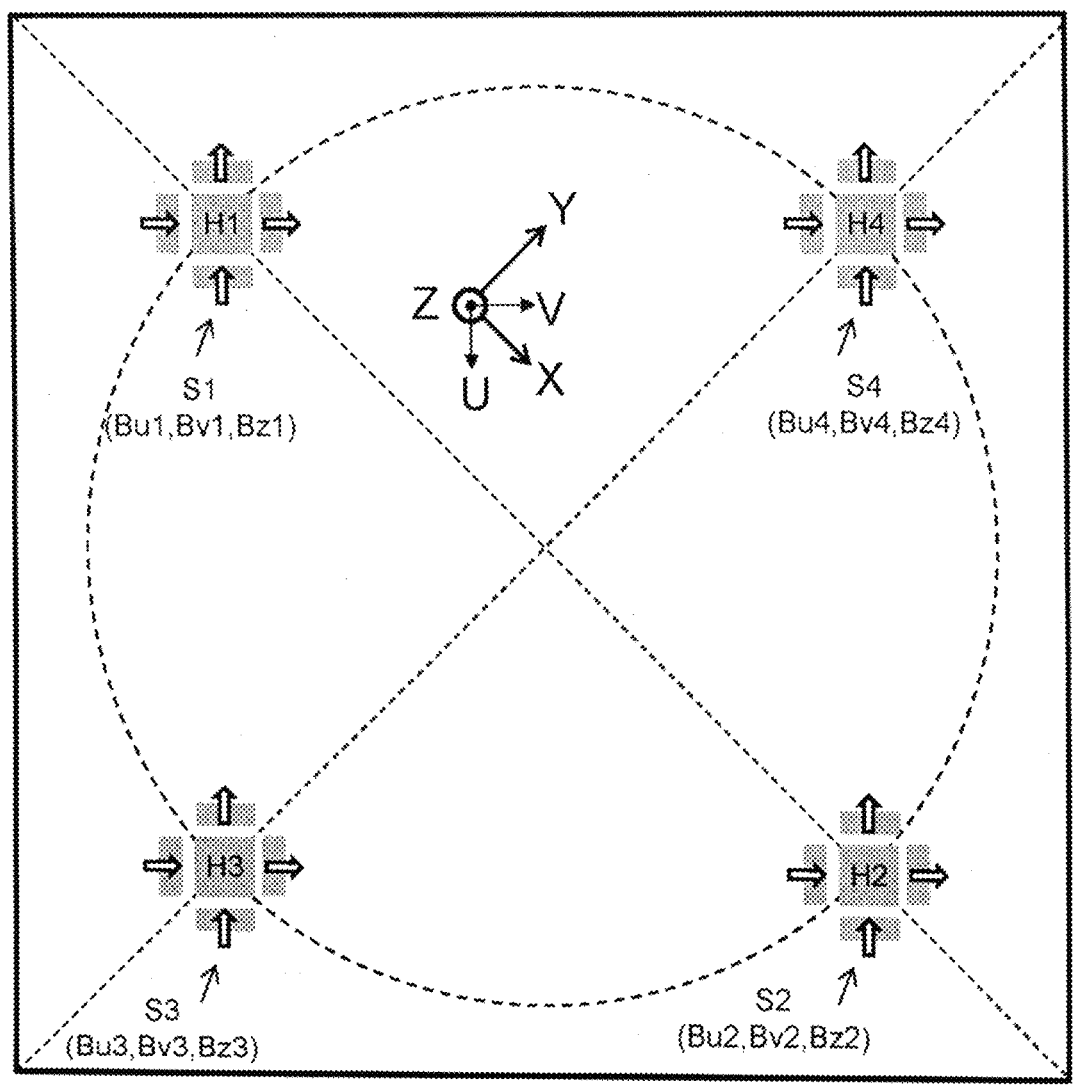

FIG. 19(b) is a schematic block diagram of a sensor circuit as can be used in embodiments of the present invention. This sensor circuit can be seen as a variant of the sensor circuit of FIG. 19(a) wherein each sensor is rotated by 45° about the Z-axis perpendicular to the semiconductor substrate. This sensor circuit comprises four 3D magnetic pixels, each capable of measuring an out-of-plane magnetic field component Bz oriented in the Z-direction perpendicular to the semiconductor substrate, and furthermore each capable of measuring two in-plane magnetic field components (Bu, By) oriented in the U- and V-direction.

In a variant (not shown) of FIG. 19(b), the sensor circuit further comprises a fifth 3D magnetic pixel located in the center of the virtual circle. This sensor circuit is capable of measuring five sets of three orthogonal magnetic field components (Bu, By, Bz), hence 5×3=15 magnetic field components in total.

Figure 20:
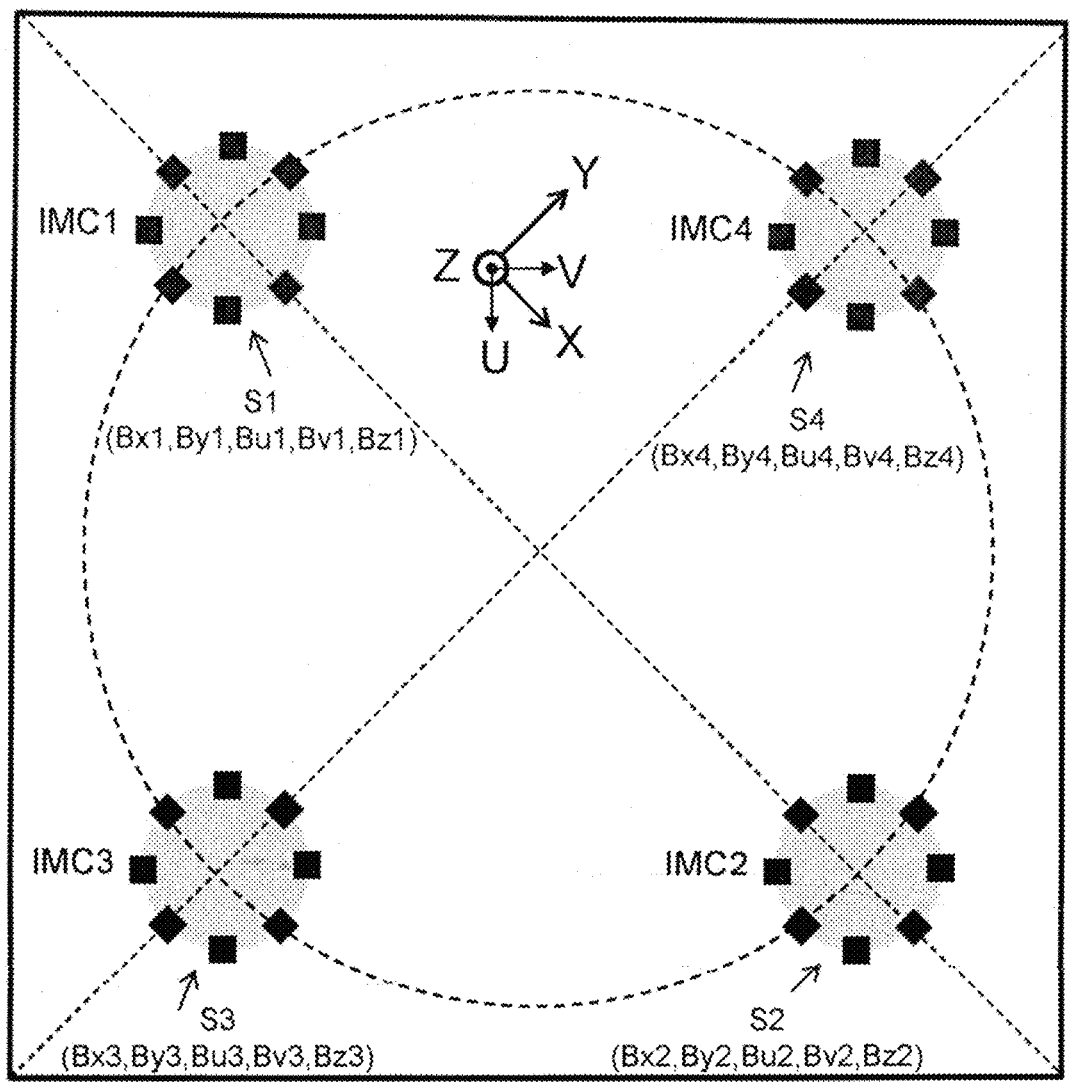

FIG. 20 is a schematic block diagram of a sensor circuit as can be used in embodiments of the present invention. This sensor circuit can be seen as a variant of the sensor circuit of FIG. 14(a) or FIG. 14(b), comprising four sensors, each comprising an integrated magnetic concentrator disk IMC and eight horizontal Hall elements located near the periphery of the IMC disk, and angularly spaced by multiples of 45°. Each of these sensors is capable of measuring four in-plane magnetic field components Bx,By,Bu,Bv and one out-of-plane magnetic field component Bz. This sensor circuit is capable of measuring 4×5=20 magnetic field components.

Figure 21:
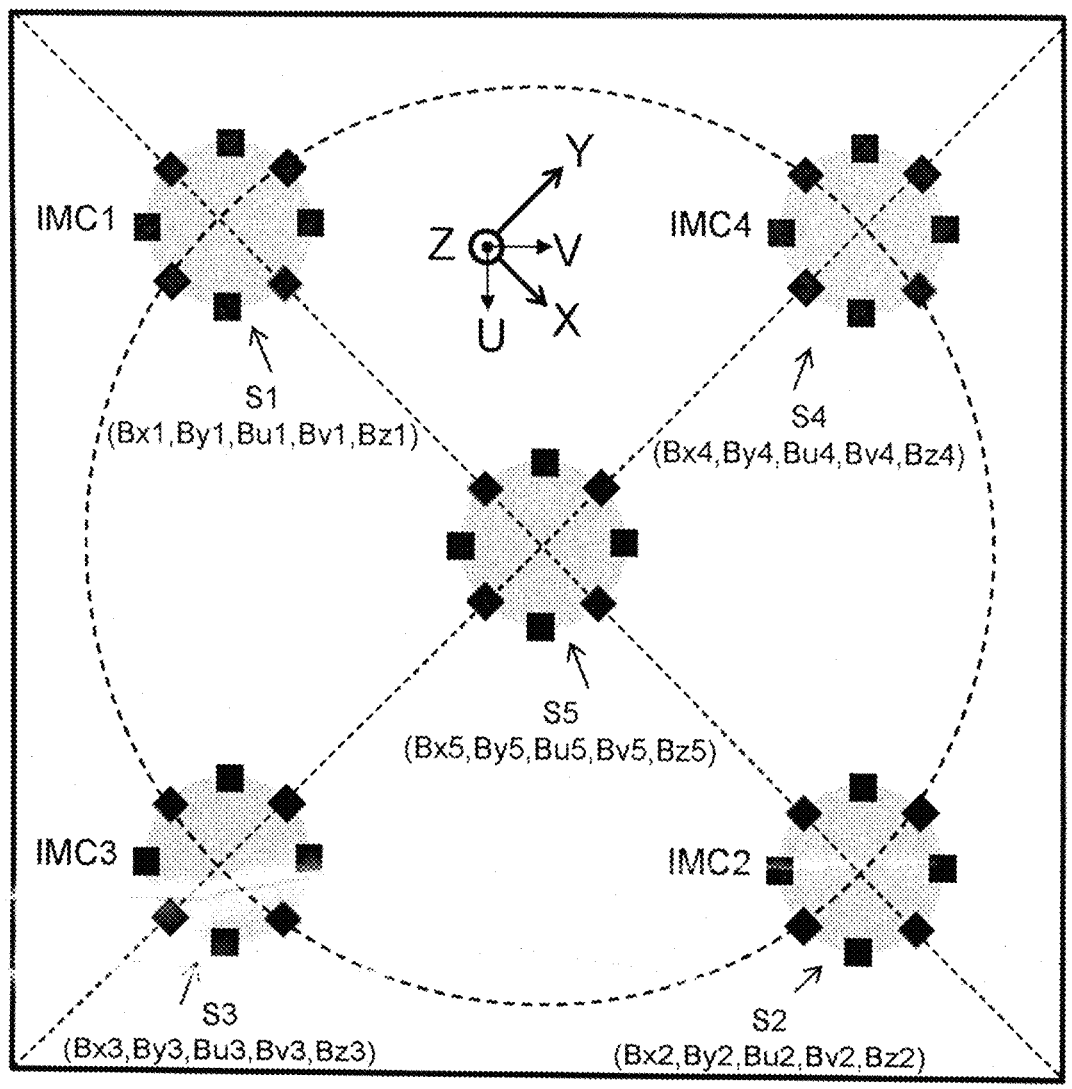

FIG. 21 is a schematic block diagram of a sensor circuit as can be used in embodiments of the present invention. This sensor circuit can be seen as a variant of the sensor circuit of FIG. 20, further comprises a fifth 3D magnetic pixel located in the center of the virtual circle. This sensor circuit is capable of measuring five sets of five magnetic field components (Bx,By,Bu,Bv,Bz), hence 5×5=25 magnetic field components in total.

In all the embodiments described above (FIG. 1 to FIG. 21) in which one or more integrated magnetic concentrator(s), IMC is/are used, the IMC preferably has a disk shape with a height of approximately 17 to 23 µm, and a diameter of approximately 170 to 230 µm.

In all the embodiments described above in which magnetic sensors (also referred to herein as 2D magnetic pixels or 3D magnetic pixels) are located on the virtual circle, the diameter of this virtual circle is preferably 1.7 to 2.3 mm, e.g. equal to about about 1.9 mm, or equal to about 2.0 mm, or equal to about 2.1 mm. In embodiments wherein sensors are located on a 3×3 grid, the distance between the gridlines is preferably in the order of about 0.7 mm to about 1.5 mm, or from about 0.9 mm to about 1.3 mm.

Horizontal Hall plates typically have a square shape with an area from 15 µm×15 µm to 25×25 µm, for example equal to about 20 µm×20 µm.

Figure 22A:
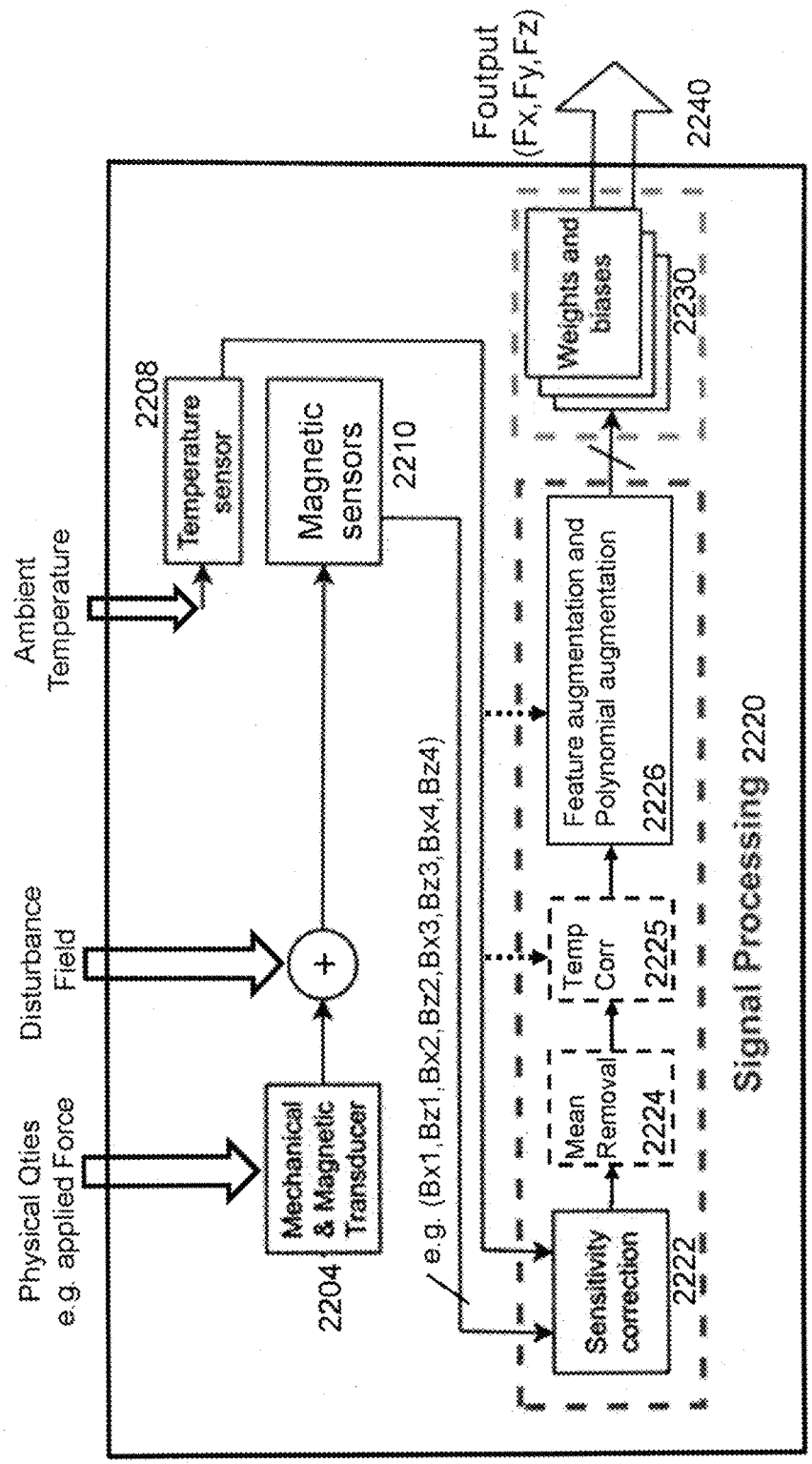
FIG. 22(a) shows a schematic block-diagram of a magnetic sensor system proposed by the present invention.

FIG. 22(a) shows a schematic block-diagram of a magnetic sensor system 2200 proposed by the present invention, that can be used to measure one or two or three physical quantities related to a position of the permanent magnet, such as for example three orthogonal components of a force vector applied to the sensor system. The system may be further subject to an external disturbance field (also called strayfield), and to varying temperatures.

Figure 23A:
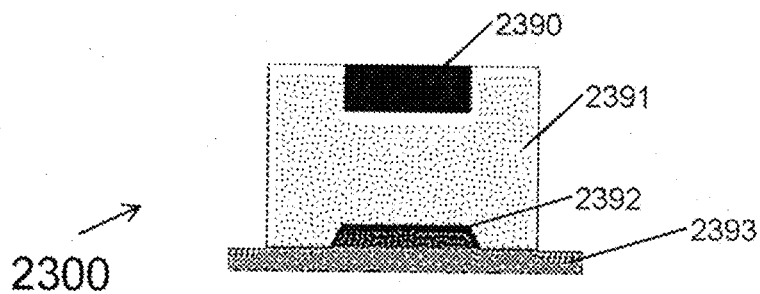
FIG. 23(a) to FIG. 23(e) show examples of mechanical arrangements or sensor assemblies, which may be used in embodiments of the present invention.
Figure 23B:
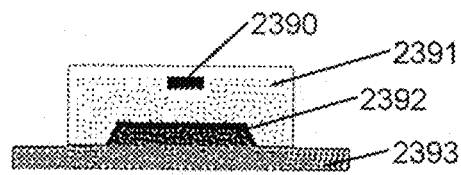
Figure 23C:
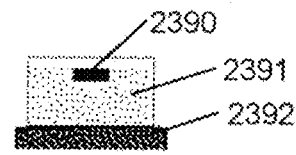
Figure 23D:
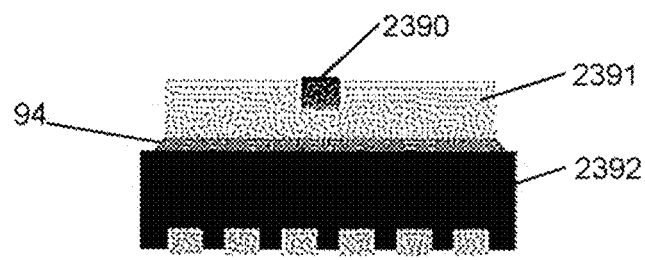
Figure 23E:
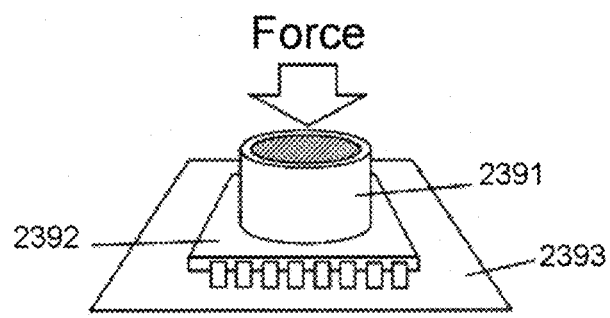

The sensor system 2200 comprises one or more semiconductor substrates comprising a plurality of magnetic sensors 2210. The one or more semiconductor substrate are preferably incorporated in a semiconductor package (also known as sensor chip), see e.g. FIG. 23(d). In preferred embodiments, the plurality of magnetic sensors are incorporated in a single semiconductor substrate smaller than 3.0×3.0 cm, preferably smaller than 2.5×2.5 mm.

The sensor system further comprises a permanent magnet which is flexibly or resiliently mounted with respect to the semiconductor substrate(s), e.g. by means of an elastic material.

The permanent magnet 390, 2390, is preferably a single, axially magnetised ring or disk magnet having an external diameter of about 1.2 mm to about 1.8 mm, e.g. equal to about 1.5 mm; and having a height (in the axial direction) of about 0.3 to about 0.7 mm, or from 0.4 to 0.6 mm, e.g. equal to about 0.5 mm. In preferred embodiments, the permanent magnet has an outer diameter which is smaller than the diameter of the virtual circle on which the sensor elements are located.

Figure 24A:
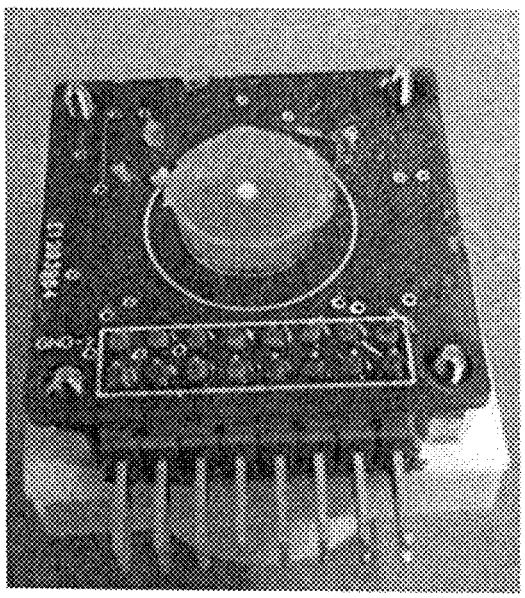
FIG. 24(a) and FIG. 24(b) show pictures of a prototype of a force sensor system.
Figure 24B:
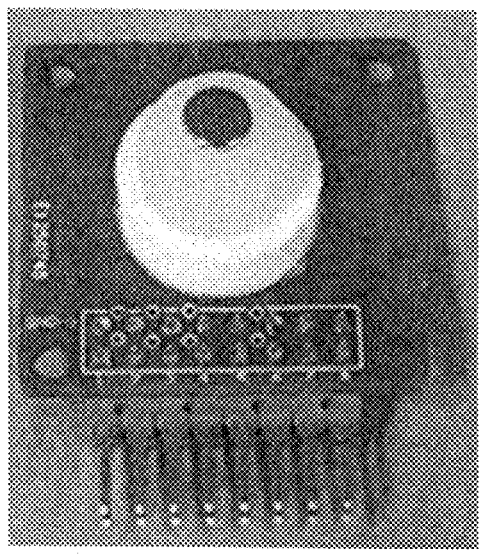
Figures 25A, 25B:
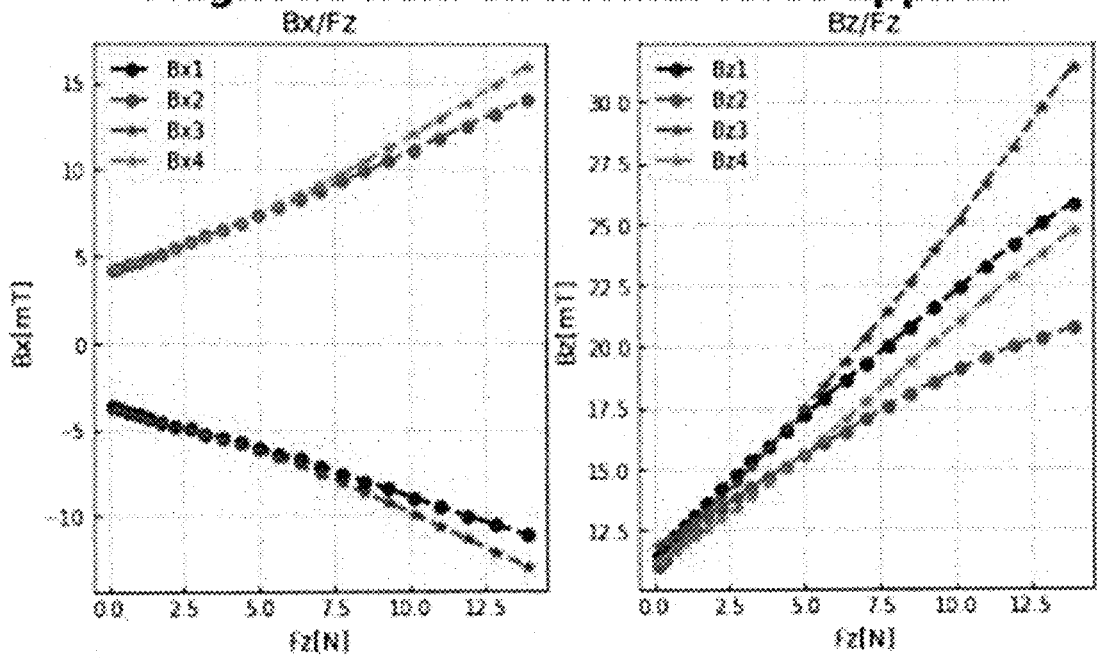
FIG. 25(a) and FIG. 25(b) shows the results of measured values of Bx and Bz when applying a force Fz oriented in a direction perpendicular to the semiconductor substrate.

The permanent magnet may be mounted by means of a lever and a bearing or the like, as is typically the case in a joystick, or may be mounted by means of one or more springs, or may be embedded in a flexible material, e.g. in an elastomer, e.g. as suggested in FIG. 3(a) and FIG. 3(b), or as illustrated in FIG. 23(a) to FIG. 23(e), or as illustrated in the prototypes of FIG. 24(a) and FIG. 24(b), or as illustrated in the simulation model shown in FIGS. 25(a) and 25(b), or as described in co-pending EP application number EP21182116.0, with Title "Force sensor with target on semiconductor package", filed by the same applicant on 28 Jun. 2021, which document is included herein by reference in its entirety, in particular FIG. 1 to FIG. 5 and the corresponding description, illustrating and describing assemblies of force sensors with an elastomer, or in any other suitable way. The elastomer may have the stress versus strain characteristic, which is highly non-linear, hence making it extremely difficult or nearly impossible to find explicit analytical formulas for determining the components of a mechanical force exerted upon the magnet, based on the signals obtained from the magnetic sensors. An additional problem encountered by the inventors is that the mechanical characteristics of the elastic material may also be temperature dependent. For example, in the envisioned temperature range, the elastic material may become stiffer as the temperature decreases. The permanent magnet and the mechanical mounting of the magnet is schematically represented by the block 2204, which generates a magnetic field which is dependent on the applied mechanical force, although one might also say that the magnetic field generated by the permanent magnet is "modulated" by the mechanical force.

The influence from an (unknown) external disturbance field is typically added to the magnetic field generated by the magnet.

In the example of FIG. 22(a), a mechanical force 2202 is exerted upon the magnet, and the physical quantities to be measured are the force components in the X-, Y- and Z-direction, and the present invention will be explained mainly for a force sensor system, keep the description relatively simple, but the present invention is not limited thereto and also works for determining other physical quantities such as for example to determine a position (e.g. two tilt angles) of a joystick, or to determine the position (e.g. two lateral displacements and/or a downward displacement of a thumbstick) or the like.

The mechanical force to be measured may be applied to the magnet directly or indirectly, e.g. to a contact surface of an elastomer encapsulating the permanent magnet. The latter may be preferred, e.g. to avoid slip. The magnetic field generated by the permanent magnet can be measured by a sensor circuit comprising a plurality of magnetic sensors 2210, e.g. using any of the sensor circuits shown in FIG. 3(a) to FIG. 21, the present invention not being limited thereto, since for example a sensor circuit with a plurality of sensor elements located on a 4×4 grid, or located at pseudo-random locations, will also work. In practice, the magnetic sensors are typically biased with a current or voltage source, and the signals provided by the sensor elements are typically amplified and digitized, etc. in a so called "biasing and readout-circuit", not explicitly shown in FIGS. 22(a) and 22(b), because such circuits are very well known in the art, and not the focus of the present invention, and therefore need not be explained in more detail here. Suffice it to say that techniques such as "spinning current", chopping, etc. may also be used.

The processing of the signals will be explained mainly referring to a prototype illustrated in FIG. 3(b) and FIG. 7(b), which was built, and evaluated and simulated. But of course, the present invention is not limited to this example, but also works for other systems that use the same principles.

The sensor circuit of FIG. 7(b) provides eight magnetic field component signals: Bx1, Bz1, Bx2, Bz2, Bx3, Bz3, Bx4, Bz4, thus in the example of the prototype, the block 2210 provides these eight signals.

These eight magnetic field component signals are preferably amplified and offset corrected and sensitivity corrected in known manners, e.g. as a function of temperature, in block 2222. To this end, the sensor circuit preferably further comprises a temperature sensor 2208. For completeness it is noted that this block may not only correct for temperature variations, but may also correct for mechanical stress exerted upon the silicon substrate, in known manners, for example as described in co-pending patent application EP21161150.4 (publication number: EP3885779), and/or as described in co-pending patent application EP21161151.2 (publication number: EP3885778), both of which are incorporated herein by reference in their entirety, or in any other suitable way. The block 2222 may also digitize the signals using one or more analog-to-digital convertors ADC, not explicitly shown.

In the example of FIG. 22(a), the four sensitivity corrected Bx signals are input to block 2224, where a mean or average of these four sensitivity corrected Bx signals is calculated, which mean or average is then subtracted from each of the sensitivity corrected Bx-signals. Likewise, the four sensitivity corrected Bz signals are input to block 2224, where a mean or average of these four sensitivity corrected Bz signals is calculated, which mean or average is then subtracted from each of the sensitivity corrected Bz-signals. If implemented in this way, the block 2224 outputs four "mean-corrected" Bx-related signals, and four "mean-corrected" Bz-related signals, thus eight signals in total. It is also possible to perform the "mean removal" in the analogue domain, and to digitise the mean-corrected Bx values and the mean corrected Bz values.

In the example of FIG. 22(a), the processing circuit further comprises a "feature augmentation and polynomial augmentation" block 2226, configured for receiving the four mean-corrected Bx values and the four mean-corrected Bz-values, and configured for calculating one or more of: a sum of two values, a difference of two values, a product of two values, a ratio of two values, a square of a value, a sign of a value multiplied by the square of the value, a third power of a value, an absolute value of a value, a sum of squares of two (e.g. orthogonal) values (related to the "norm"), a sum of squares of three (e.g. orthogonal) values (related to the "norm"); and for outputting the (original) mean-corrected Bx and Bz values and the additionally generated values as output signals. In preferred embodiments, the total number "Ntot" of values provided by the block 2226 is a value in the range from 12 to 100, or in the range from 12 to 80, or from 16 to 64.

It is noted that the difference between "feature augmentation" and "polynomial augmentation" is a bit arbitrary, and irrelevant for the present invention. What is important is that the block 2226 gets a certain number of input values, and generates a number of output values (e.g. the same number, or preferably a larger number) based derived therefrom. It was surprisingly found that by augmenting the number of values, the accuracy of the final output (e.g. Force components) was largely improved, which is counter-intuitive, because these values do not add "new information". It was found, in particular, that adding additional values in the form of squares of input values, and/or in the form of products of similar input values (e.g. Bx1*Bx2), and/or in the form of dissimilar input values (e.g. Bx1*Bz1) was very advantageous.

In the block 2230, the physical quantities to be determined are calculated as a function of these values, more in particular as a weighted sum of these values, each biased with an offset.

For example, if the block 2226 outputs the values v1, v2, ... v64, the block 2230 may calculate one or more of the components (Fx, Fy, Fy) of the force vector in accordance with the following formulas:

$$Fx=A1*(v1-B1)+A2*(v2-B2)++A64*(v64-B64) \quad [1]$$

$$Fy=C1*(v1-D1)+C2*(v2-D2)++C64*(v64-D64) \quad [2]$$

$$Fz=E1*(v1-F1)+E2*(v2-F2)++E64*(v64-F64) \quad [3]$$

where the values A1 to A64 and B1 to B64 and C1 to C64 and D1 to D64 and E1 to D64 and F1 to F64 are constants, which are determined by machine learning or by deep learning.

It is noted that the "training" or "learning" was done over a relatively broad range of three-dimensional force values, i.e. choosing a sufficient number of various combinations of 3D-force components to represent the 3D space of possibilities. In other words, many combinations of forces (Fx, Fy, Fz) were used to train the coefficients, for example at least 2 times, or at least 5 times, e.g. about 10 times more measurements than the number of parameters to be determined.

There is an optional "temperature correction block" 2225, as will be explained further when discussing FIG. 29. In case the temperature is used as an extra to the block 2226 (representing the feature augmentation and/or polynomial augmentation block, or a neural network), the "training" or "learning" should be performed using various combinations of (T, Fx, Fy, Fz).

FIG. 22(*b*) shows a schematic block-diagram of another magnetic sensor system 2250 proposed by the present invention, that can be used to measure one or two or three physical quantities related to a position of the permanent magnet, such as for example three orthogonal components of a force vector applied to the sensor system. This system can be seen as a variant of the system of FIG. 22(*a*), wherein the mean-removal block 2224 is replaced by gradient calculator block 2232.

If the sensor circuit 2210 contains a plurality of sensors as depicted in FIG. 7(*b*), the gradient calculator block may calculate one or more of the following Bx-related gradient signals:

$$g1=(Bx1-Bx3), g2=(Bx1-Bx4), g3=(Bx1-Bx2),$$

$$g4=(Bx3-Bx4), g5=(Bx3-Bx2), g6=(Bx4-Bx2)$$

and may calculate one or more of the following Bz-related gradient signals:

$$g7=(Bz1-Bz3), g8=(Bz1-Bz4), g9=(Bz1-Bz2)$$

$$g10=(Bz3-Bz4), g11=(Bz3-Bz2), g12=(Bz4-Bz2)$$

Everything else mentioned above for the system of FIG. 22(*a*) is also applicable here.

It is noted that, in contrast to many prior art magnetic sensor systems in which an analytical formula is used, it is not required in the present invention that the signals entering the block 2226 behave like a sine and a cosine function of the physical quantity to be determined.

In an embodiment (not shown), the predefined algorithm is performed by a trained neural network using the at least three first magnetic field components (e.g. Bx1, Bx2, Bx3) and the at least three second magnetic field components (e.g. Bz1, Bz2, Bz3) as input signals, and providing the at least two (or at least three) physical values as output values.

The neural network may replace the blocks 2226 and 2230 of FIG. 22(*a*) and FIG. 22(*b*). Optionally, the block 2224 (mean removal) and the block 2232 (gradient calculator) may be omitted in this case.

The predefined algorithm may comprise a neural network having a plurality of layers, wherein each layer comprises a plurality of nodes. In an embodiment, the neural network contains only one layers, having 12 to 100 nodes. In an embodiment, the neural network contains only two layers, each having 10 to 100 nodes, or having 20 to 60 nodes. In an embodiment, the neural network contains only three layers, each having 10 to 100 nodes, or each having 5 to 50 nodes. In an embodiment, the neural network is a Recurrent Neural Network (RNN). In an embodiment, the neural network is an Artificial Neural Network (ANN). In an embodiment, the neural network is a Convolution Neural Network (CNN).

FIG. 23(*a*) to FIG. 23(*e*) show examples of mechanical arrangements comprising a sensor device or sensor assembly 2300 comprising a sensor device 2392, e.g. a packaged chip comprising a semiconductor substrate encapsulated in a moulding compound; and an elastomer 2391 above or on top of the sensor device 2392, and a magnet 2390 embedded in the elastomer, and located at a distance "d" (typically referred to as "airgap") from the sensor device. The sensor device may be mounted on a printed circuit board (PCB) 2393. The elastomer 2391 may be supported solely by the semiconductor device, e.g. as illustrated in FIG. 23(*c*) to FIG. 23(*e*). Alternatively, a portion of the elastomer may be supported by the printed circuit board, e.g. as illustrated in FIG. 23(*a*) and FIG. 23(*b*). Optionally, there may be an intermediate layer, e.g. a glue layer, between the sensor chip 2392 and the elastomer 2391, e.g. as illustrated in FIG. 23(*d*).

The magnet 2390 is preferably an axially magnetised ring or disk magnet. The outer diameter of the magnet may have dimensions comparable to those of the sensor device, e.g. equal to, or larger than, or smaller than the diameter of a virtual circle on which the magnetic sensors are located. Preferably, however, the outer diameter of the magnet 2390 is smaller than a largest distance between the magnetic sensor elements.

In the example of FIG. 23(*a*) the magnet may have a height (in the vertical direction, perpendicular to semiconductor substrate) of about 8 mm, and a diameter (parallel to the semiconductor substrate) of about 12 mm.

In the sensor assembly illustrated in FIG. 23(*b*) and FIG. 23(*c*), the magnet may have a diameter of in the range from 5 mm to 10 mm, and a height of about 3.5 mm.

In the sensor assembly illustrated in FIG. 23(*d*), the magnet may have a diameter smaller than 2.5 mm, or smaller than 2.0 mm, e.g. equal to about 1.5 mm; and may have a height of about 0.5 mm to about 1.0 mm. The elastomer 2391 may have a thickness in the range from 2.0 mm to 5.0 mm, or in the range from 2.5 mm to 4.0 mm, e.g. equal to about 3.0 mm.

The skilled person having the benefit of the present disclosure can easily find suitable dimensions taking into account the following rules of thumb: the larger the magnet, and/or the closer the magnet to the semiconductor substrate;

and the softer the elastomer material, the larger the signals obtained from the magnetic sensor elements.

Figure 22B:
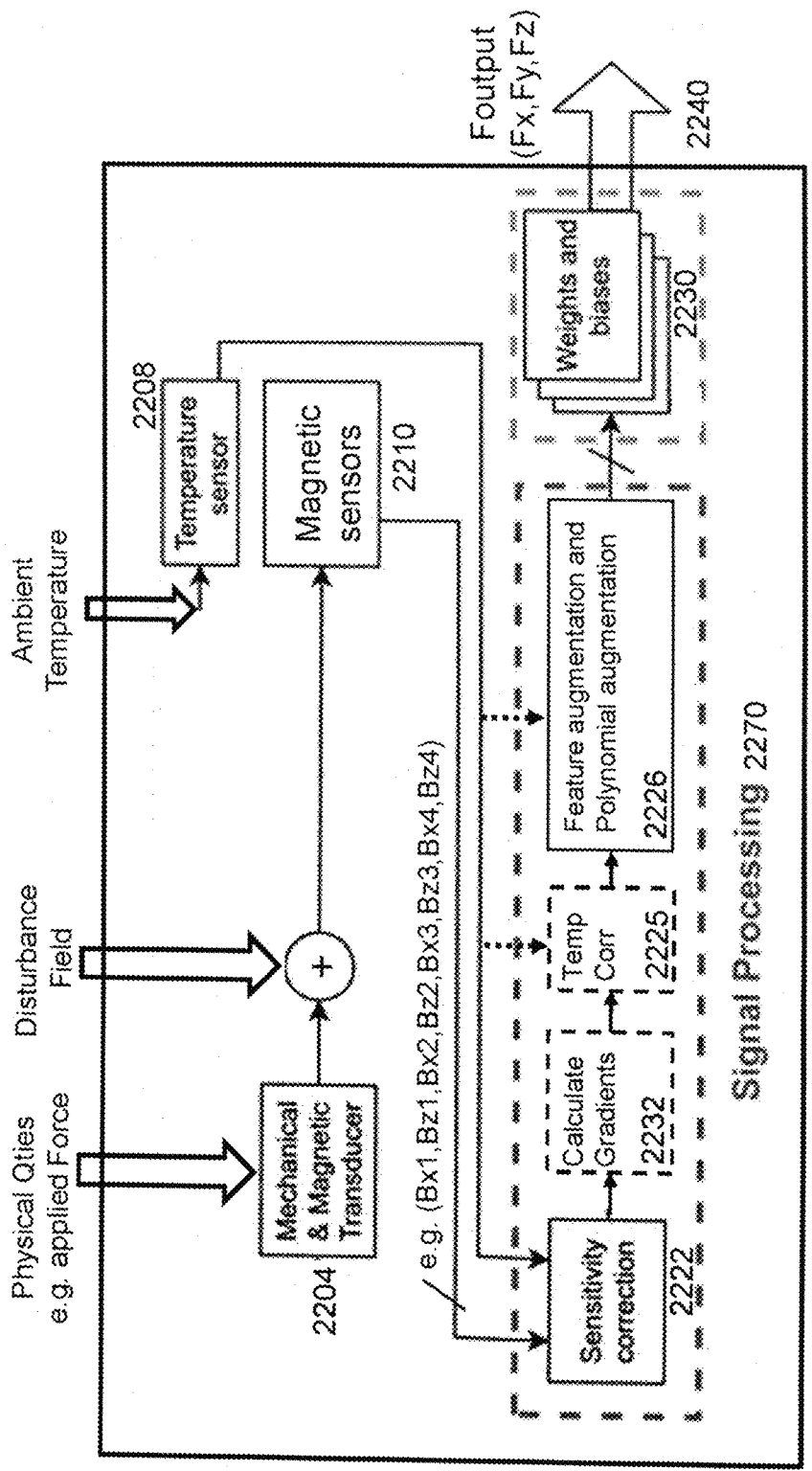
FIG. 22(b) shows a schematic block-diagram of another magnetic sensor system proposed by the present invention.

FIG. 24(a) and FIG. 24(b) show pictures of a prototype of a force sensor system as described herein, and which was used to develop and evaluate the algorithm described in FIG. 22(a) and FIG. 22(b).

Figure 24C:
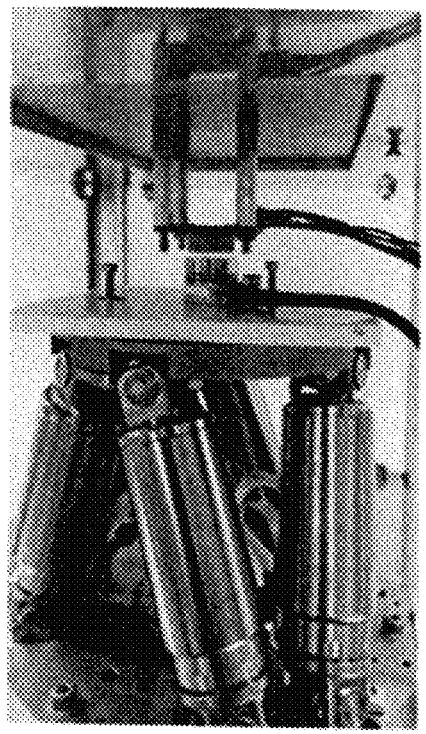
FIG. 24(c) shows a picture of a mechanical setup used to apply a known force.

FIG. 24(c) shows a picture of a mechanical setup that was used to apply a known force (Fx, Fy, Fz) to the force sensor assembly. By applying a series of tests with various force values, and by measuring the corresponding magnetic field components, the parameters (e.g. A1 to F64) were determined using machine learning (ML).

FIG. 25(a) shows the results of measured values of Bx1 to Bx4 and FIG. 25(b) shows the results of measured values of Bz1 to Bz4, when applying a force Fz, oriented in a direction perpendicular to the semiconductor substrate, and having a magnitude in the range from 0.0 Newton to 12.5 Newton. As can be seen, there is some spread between the curves, and the curves are not perfectly linear.

The inventors surprisingly discovered that the values of Bx1 to Bx4 show a very good correlation with the applied force and are thus a very good indication for the force component Fz, despite their relatively small value (in the order of about 5 to 15 mT). The inventor also surprisingly discovered that the values Bz1 to Bz4, despite the fact that their signal is typically about two times larger than the signal of Bx1 to Bx4, the spread between these values is very large. This was not expected. It demonstrates that applying an analytical formula to any of the individual signals Bx1 to Bx4 and Bz1 to Bz4 will probably not lead to a reliable measurement of the applied force component Fz, but as will be demonstrated further, a combination of these signals, more in particular a polynomial combination (e.g. second order polynomial) of these signals and of algebraic combinations of these signals (e.g. products or ratios) with a sufficient number of parameters can yield good results.

Figure 26:
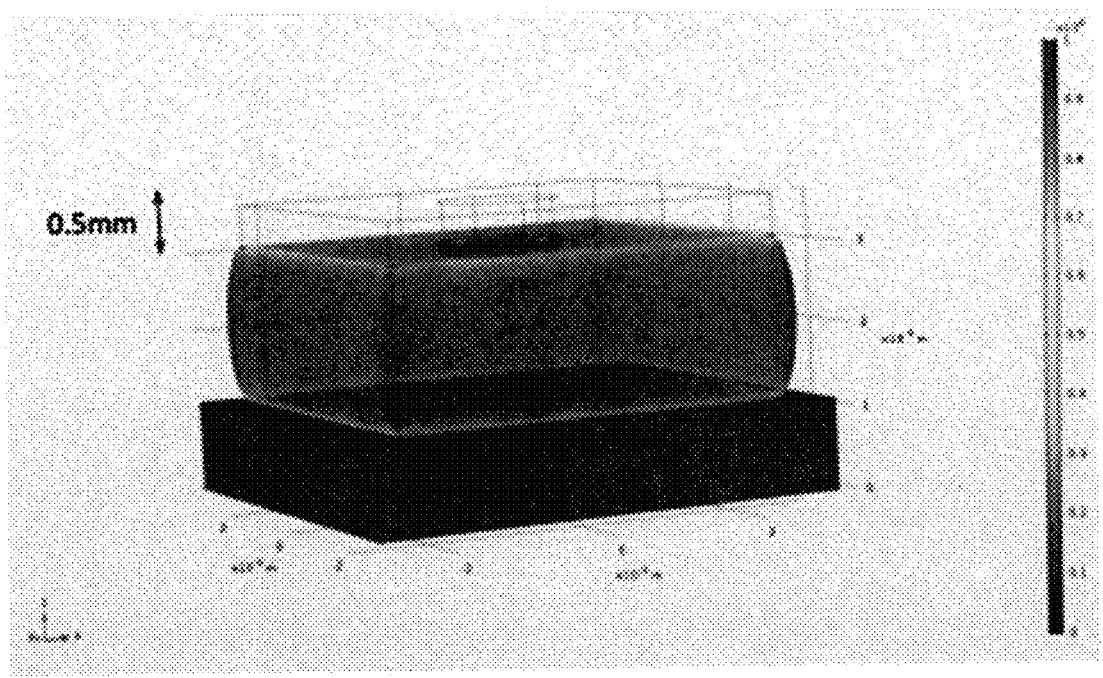
FIG. 26 shows a computer model of a mechanical arrangement that can be used to simulate embodiments of the present invention comprising an elastomer.

FIG. 26 shows a computer model of a mechanical arrangement that can be used to simulate how the elastomer would deform, and how the magnet would move when applying a force with a normal force component Fz, and/or with shear force components Fx, Fy. This computer model can be simulated using for example a commercially available tool known as "Comsol".

For a given set of parameters (e.g. A1 to F64), which were determined by machine learning, using the mechanical setup shown in FIG. 24, the computer model of FIGS. 25(a) and 25(b) may subsequently be used to validate the algorithm of FIG. 22(a) or FIG. 22(b) with these parameters.

Figure 27A:
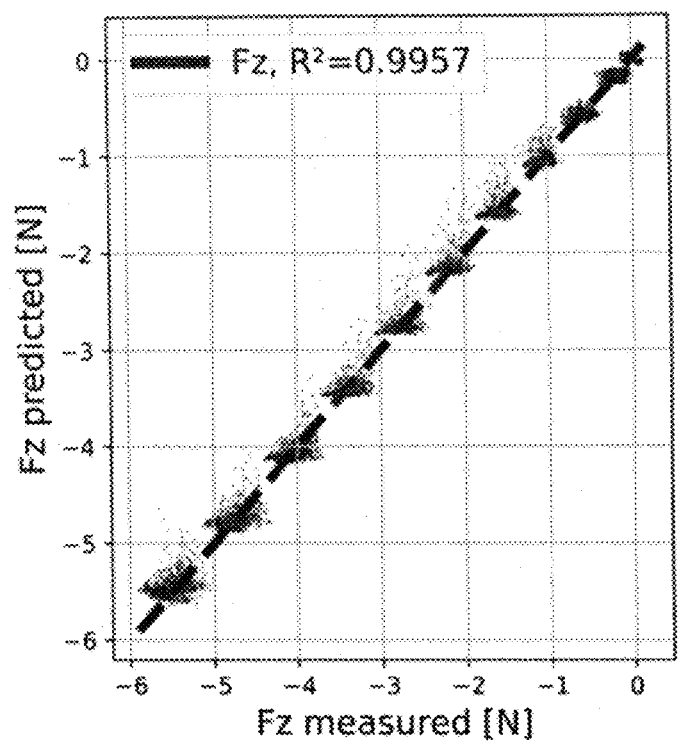
FIG. 27(a) and FIG. 27(b) show how well the forces measured by the calibration setup and forces predicted by the force sensor algorithm correspond.
Figure 27B:
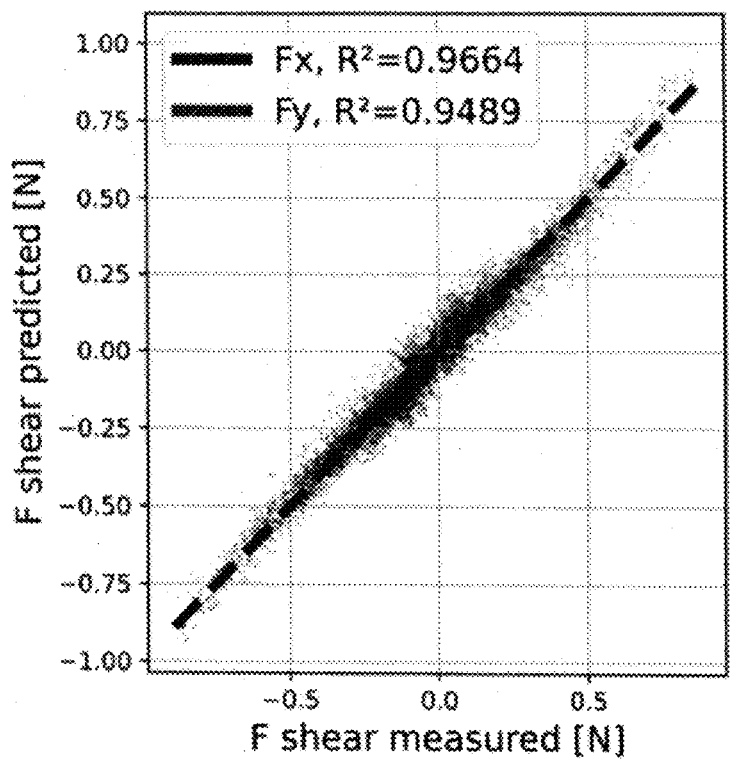

FIG. 27(a) and FIG. 27(b) show how well the forces measured by the calibration setup (see FIG. 24(c)) and forces predicted by the force sensor algorithm (see FIG. 22(a)) of a prototype implementation, work. FIG. 27(a) relates to "downward" directed forces, oriented in the negative Z-direction, perpendicular to the semiconductor substrate. FIG. 27(b) relates to shear forces. As can be seen, there is a very good linear fit between these values.

It should come as a surprise that it is indeed possible to measure a force applied in the Y-direction, despite the fact that no By-component is measured.

It is noted that these results are obtained using the sensor circuit of FIG. 7(b) having only four 2D magnetic pixels, which may not be oriented in the most optimal direction.

It is contemplated that a sensor circuit in which the 2D pixels are oriented in a different direction, and/or having more than four magnetic pixels, and/or having 3D magnetic pixels, and/or using an algorithm with a larger number of parameters, may provide a more accurate result. It is not easy to predict, however, how many sensors and/or how many parameters are required to achieve a certain accuracy, or to predict what is the most cost-effective solution to achieve a certain accuracy. Even so, the present invention discloses a large number of solutions that produce workable and even very good results, even though they are not perfect.

Figure 27C:
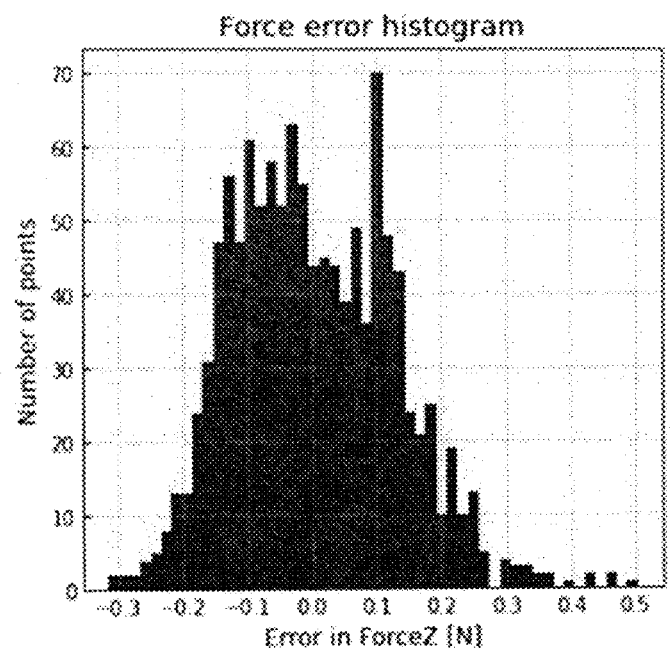
FIG. 27(c) and FIG. 27(d) shows a "force error histograms".

FIG. 27(c) shows a "force error histogram" when measuring (or determining) a force oriented in the negative Z-direction (denoted as Fz), using the sensor system of FIG. 22(a). As can be appreciated, the vast majority of measurements (>97%) are accurate within a maximum error of ±0.25 N (corresponding to an error in weight of about ±25 gram), which is more than good enough for many applications, including many robotic applications where a robotic arm with robotic fingers needs to gently grab an object without damaging it.

Figure 27D:
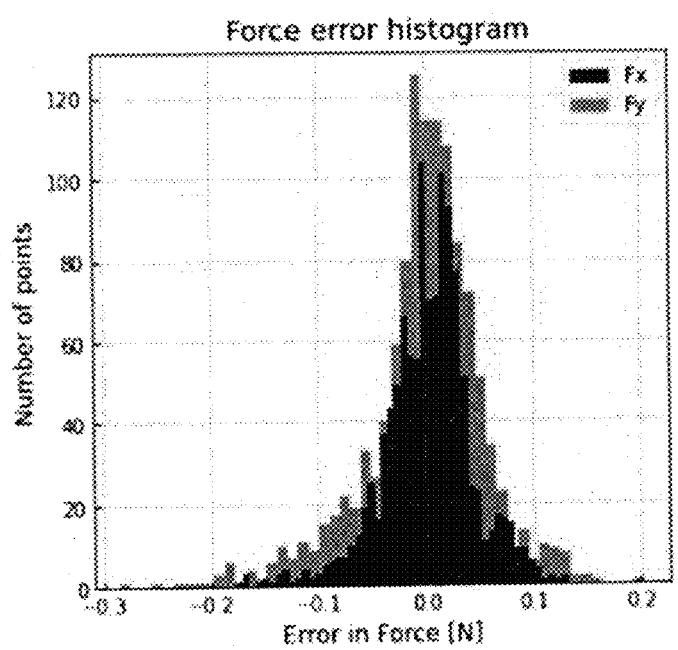

FIG. 27(d) shows a "force error histogram" when measuring shear forces (i.e. oriented parallel to the semiconductor substrate). As can be appreciated, the vast majority of measurements (>97%) are accurate within a maximum error of ±0.15 N, corresponding to an error in weight of about ±15 gram.

Figure 28:
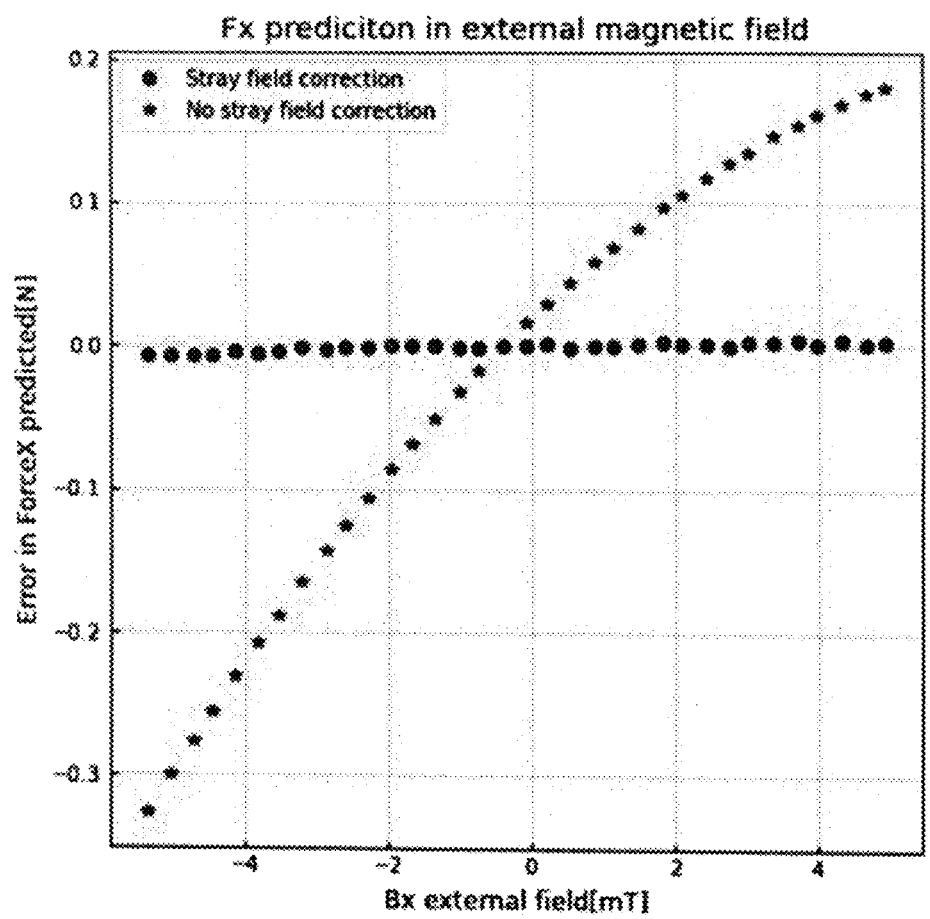
FIG. 28 is a graph illustrating an error in a measured shear force Fx as a function of an external disturbance field applied in the X-direction, with and without using a mean removal block.

FIG. 28 is a graph illustrating an error in Fx as a function of an external disturbance field applied in the X-direction, with and without using the mean removal block 2224 of FIG. 22(a). The graph clearly shows that the "mean removal" is a very effective way of removing the influence of a strayfield. Similar results are expected when using the gradient calculation block 2232 of FIG. 22(b).

Figure 29:
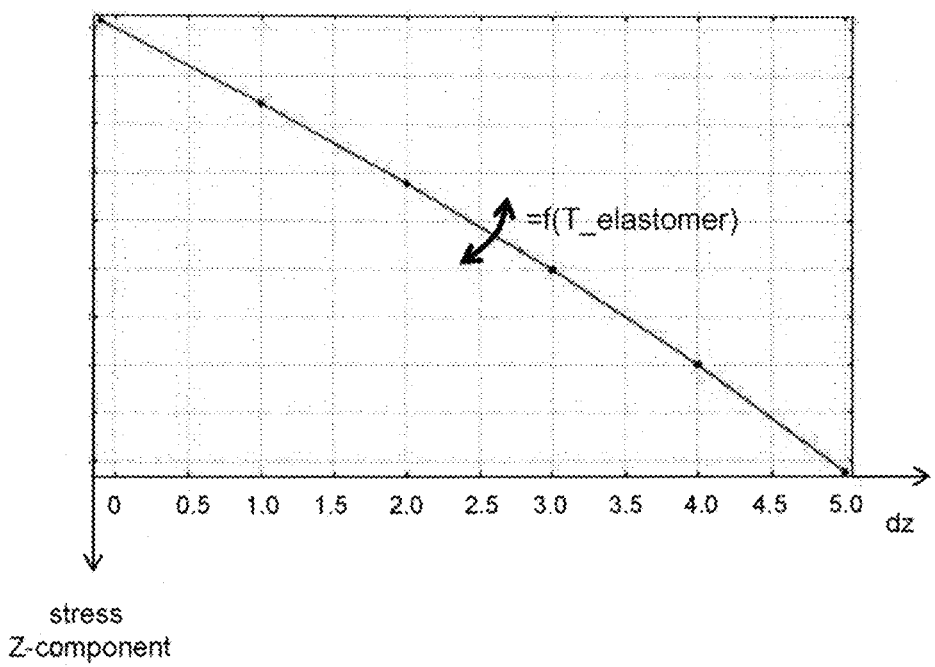
FIG. 29 shows a graph illustrating the magnitude of a force Fz oriented in a direction towards the semiconductor substrate versus displacement of the magnet.

FIG. 29 shows a graph illustrating the magnitude (in arbitrary units) of a "normal force" Fz oriented in a direction towards the semiconductor substrate versus displacement of the magnet (in arbitrary units). As can be seen, the behaviour is not perfectly linear, which is probably due to the fact that the stiffness of the elastomer typically increases as more pressure is exerted upon the elastomer.

While not explicitly shown in FIG. 29, the inventors also found that the stiffness of the elastomer also depends on temperature. Tests have shown that this effect can be taken into account by a post-processing step, in which the values of Fx, Fy, Fz are corrected as a function of temperature, for example in accordance with the formulas:

$$Fx\_corr = Fx(\text{using Eq. [1]}) * [1 + K(T\text{chip} - 35)] \qquad [4]$$

$$Fy\_corr = Fy(\text{using Eq. [2]}) * [1 + K(T\text{chip} - 35)] \qquad [5]$$

$$Fz\_corr = Fz(\text{using Eq. [3]}) * [1 + K(T\text{chip} - 35)] \qquad [6]$$

where Tchip is the temperature measured by an on-chip temperature sensor expressed in degrees Celsius, and K is a constant which can be determined during a calibration step.

This effect may also be taken into account in the optional "temperature correction" block 2225, e.g. in accordance with the following formula:

$$Scorr = Sraw \cdot [1 + \alpha(T\text{chip} - 35)] + \beta(T\text{chip} - 35) \qquad [7]$$

where Tchip is the temperature measured by an on-chip temperature sensor expressed in degrees Celsius, Sraw is a raw signal value obtained from the preceding block 2226 or 2232 (e.g. a mean-corrected value or a gradient value), Scorr is the temperature corrected signal value, α and β are two constants which may be determined by simulation, or in a calibration step.

Figure 30:
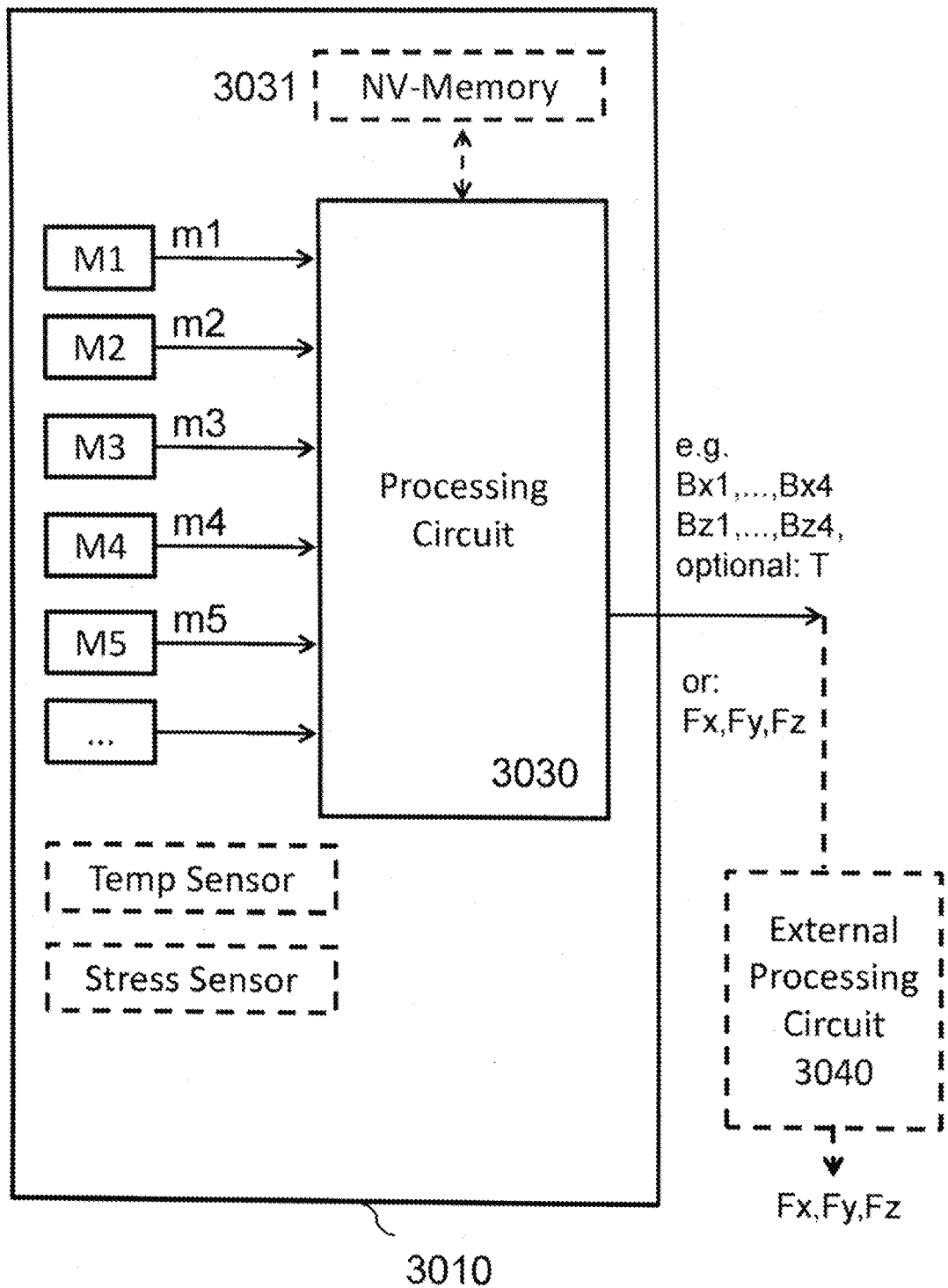
FIG. 30 is a schematic block diagram of a sensor device 3010 as can be used in embodiments of the present invention.

FIG. 30 is a schematic block diagram of a sensor device 3010 as can be used in embodiments of the present invention. This block diagram is only provided for completeness.

The sensor device 3010 comprises semiconductor substrate comprising a plurality of magnetic sensors, only five of which are shown as M1 to M5, e.g. any of the circuits shown in FIG. 4 to FIG. 21.

The sensor device further comprises a biasing and readout circuit, e.g. as part of the processing circuit 3030, configured for receiving the signals m1, m2, etc. from the magnetic sensors. The signals are typically amplified and offset corrected. Preferably the sensor device further comprises temperature sensor, and the magnetic sensitivity of the sensor elements is preferably corrected (in the analogue or digital domain) based on the based temperature. The processing circuit may further comprise at least one analogue to digital converter (ADC), for converting the analog signals into digital signals.

Depending on the implementation, the processing circuit 3030 may be further configured for performing one or more of the functions of the blocks 2224 (mean removal), 2232 (gradient calculation), 2226 (feature augmentation and polynomial augmentation), 2230 (weights and biases) described above, see FIG. 22(*a*) and FIG. 22(*b*). In this case, the sensor device 3010 may output the force component values Fx, Fy, Fz. In order to be able to measure the applied force at the reasonably high rate (e.g. at a frequency of at least 20 Hz, or at a frequency of at least 25 Hz, or at a frequency of at least 30 Hz, or at a frequency of at least 40 Hz), the number of augmented values may be limited, and the complexity of the functions used in the (polynomial) augmentation block 2226 may be limited to algebraic functions (e.g. including square function and products, but excluding divisions), and the number of terms to be added in the block 2230 may be limited to at most 50 terms, or at most 40 terms, or at most 36 terms. Such algorithm may be performed by a programmable signal processor (DSP), and the plurality of constants may be stored in a non-volatile memory 3031. While not explicitly shown, it is also possible to use analogue processing circuitry, e.g. an analog or digital accelerator, or an analog or digital coprocessor.

In other embodiments, however, the processing circuit will measure to magnetic field values (block 2210) and will implement the sensitivity correction (block 2222), and may optionally also implement the mean removal (2224) or the gradient calculation (2232), but will not implement the feature augmentation (block 2226), and will not calculate the weighted sums (block 2230). In this case, the sensor device 3010 may output the values of block 2222, or 2224 or 2232, preferably as digital values, and provide these values to an external processor. The external processor will then perform the feature and or polynomial augmentation (block 2226) and calculate the weighted sums (block 2230). It is an advantage of this implementation that the external processor 3040 may be much more powerful, e.g. have a clock frequency higher than 1.0 GHz, and/or may have multiple processor cores, and/or may have much more random access memory (RAM), e.g. at least 1 GBytes of RAM.

In order to allow the external processor to perform a post-processing correction to take into account a temperature dependence of the stiffness of the elastomer, the sensor device 3010 may also output the measured temperature T to the external processor.

Figure 31:
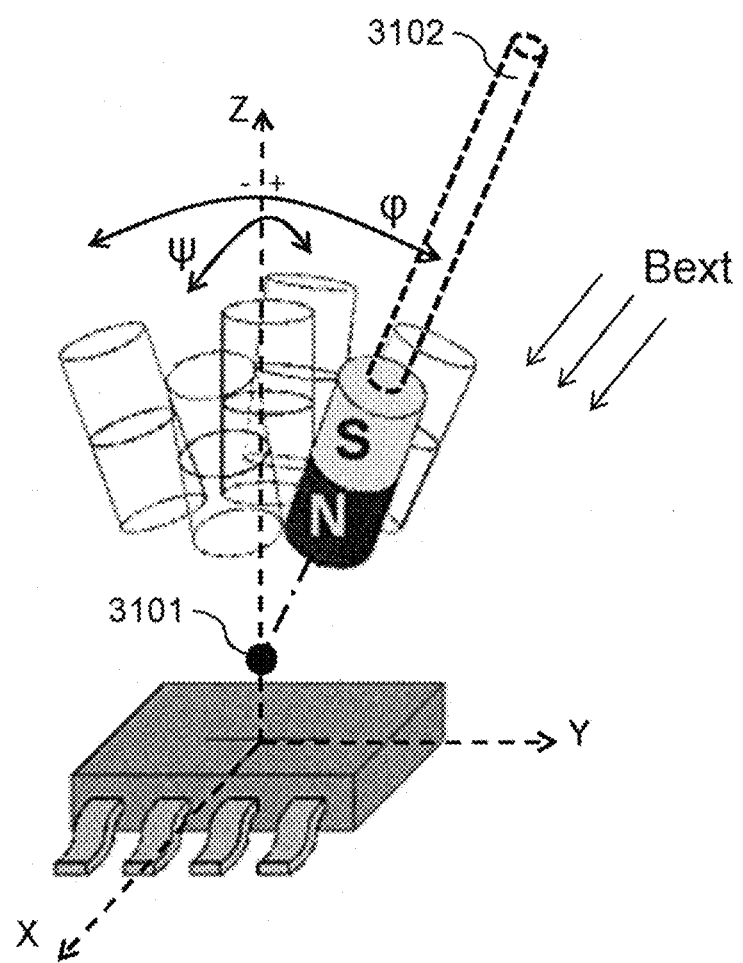
FIG. 31 is used to illustrate that the principles of the present invention may also be used to determine the tilting angles φ and ψ of joystick assembly.

FIG. 31 is provided for completeness, to illustrate that the principles of the present invention may also be used to determine the tilting angles γ and ψ of joystick assembly, wherein a magnet is rotatable about a pivot point 3101 by means of a handle or a lever 3102.

It is a major advantage of embodiments of the present invention that no explicit formulas requires to determine the tilting angles, and that the solution is highly insensitive to an external disturbance field. It is noted that in this case, no elastomer material is required, but instead the mechanical assembly would normally be used to hold and allow movements of the magnet. The skilled reader will understand that the sensor circuits shown in FIG. 3(*a*) to FIG. 21, and the algorithms described above in FIG. 22(*a*) and FIG. 22(*b*), can also be used to determine the tilting angles (physical quantities related to the position of the magnet) of the handle of the joystick assembly.

While not explicitly shown, the principles of the present invention can also be used to determine the position of a thumbstick. In this case, the magnet would be movable in a plane parallel to the semiconductor substrate, by moving a thumbstick in a plane parallel to the semiconductor substrate. Optionally there may be one or more springs involved. The skilled reader will understand that the sensor circuits shown in FIG. 3(*a*) to FIG. 21, and the algorithms described above in FIG. 22(*a*) and FIG. 22(*b*), can also be used to determine at least the lateral displacements, and optionally also a downwardly pressing displacement (i.e. physical quantities related to the position of the magnet) of the thumbstick of the thumbstick assembly.

Needless to say, that the requirements in terms of accuracy and robustness against disturbance signals of a thumbstick assembly, e.g. as part of a gaming console for consumer electronics applications, are completely different from the requirements for robotic applications. In other words, building an integrated sensor device which performs all of the signal processing steps shown in FIG. 22(*a*) and FIG. 22(*b*), albeit with a limited number of terms and constants, and with limited accuracy, is very well feasible.

Figure 32:
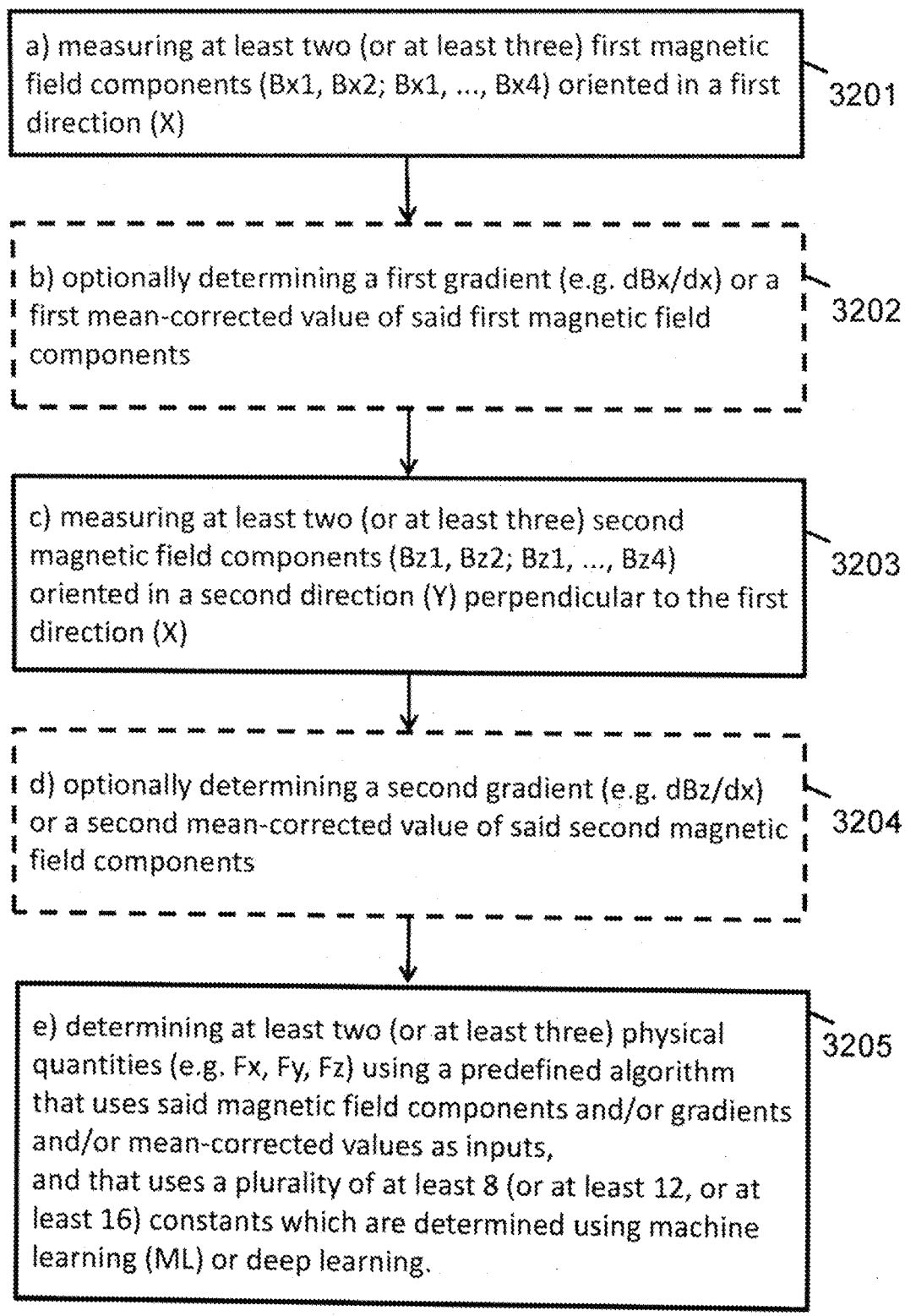
FIG. 32 show a flow-chart of a method 3200 of measuring at least two physical quantities related to a position of a permanent magnet, proposed by the present invention.

FIG. 32 show a flow-chart of a method 3200 of measuring at least two physical quantities (e.g. a 2D or 3D force vector, a 2D or 3D displacement vector, a 2D or 3D position of a joystick, a 2D or 3D position of a thumbstick) related to a position of a permanent magnet which is movable relative to an integrated circuit and which is configured for generating a magnetic field. The method 3200 comprises the following steps:

a) measuring 3201 at least two (or at least three, or at least four) first magnetic field components (Bx1, Bx2; Bx1, Bx2, Bx3; Bx1 to Bx4) oriented in a first direction (e.g. X). The first direction may be parallel to the semiconductor substrate ("in-plane").

b) optionally determining 3202 a first gradient (e.g. dBx/dx) or a first mean-corrected value of said first magnetic field components;

c) measuring 3203 at least two (or at least three, or at least four) second magnetic field components (Bz1, Bz2; Bz1, Bz2, Bz3; Bz1 to Bz4) oriented in a second direction (e.g. Y or Z) perpendicular to the first direction (X). The second direction may be parallel to the semiconductor substrate ("in-plane") or may be perpendicular to the semiconductor substrate ("out-of-plane").

d) optionally determining 3204 a second gradient (e.g. dBz/dx) or a second mean-corrected value of said second magnetic field components;

e) determining said at least two physical quantities (e.g. Fx, Fy, Fz) using a predefined algorithm that uses the measured magnetic field components and/or gradients and/or mean-corrected values as inputs, and that uses a plurality of at least eight (or at least twelve, or at least sixteen) constants (or coefficients or parameters) which are determined using machine learning (ML) or deep learning.

Of course, this method can be further refined in the same way as described above.

For example, in an embodiment, said at least two physical quantities may be determined using a predefined algorithm that uses at least three or at least four magnetic field differences derived from said at least two first and said at least two second magnetic field components, as inputs, and that uses said plurality of at least eight constants.

In another or a further embodiment, the method may further comprise measuring a temperature of the semiconductor substrate; and correcting the measured first and second magnetic field components based on the measured temperature or taking the measured temperature into account as an additional input of the predefined algorithm or processing the temperature in a post-processing step, etc.

For completeness it is noted that the block 2226 (mean removal) and 2232 (calculate gradients) may be omitted, and that a strayfield is still cancelled out, by the blocks 2226 and 2230, which may be a neural network.

According to another aspect, the present invention also provides a force sensor device comprising: an integrated circuit comprising a plurality of magnetic sensors, and a permanent magnet flexibly mounted to the integrated circuit by means of a flexible material (e.g. an elastomer), and a processing circuit. The processing circuit may be implemented on the same semiconductor substrate as the magnetic sensors, but that is not absolutely required, and the processing circuit may be implemented on a first semiconductor substrate (e.g. a CMOS substrate), and the magnetic sensors may be implemented on one or more sensor substrates (e.g. CMOS, or Ga—As or Ga—In or In—Sb) mounted next to, or on top of, or below the first semiconductor substrate, e.g. in a similar manner as described in US2022099709(A1), incorporated herein by reference in its entirety.

The plurality of magnetic sensors may be configured for measuring at least three or at least four magnetic field components oriented in a first direction or may be configured for measuring at least a first and a second magnetic field component oriented in a first direction and for measuring at least a third and a fourth magnetic field component oriented in a second direction. The second direction may be the same as the first direction, or may be different from the first direction, e.g. orthogonal thereto.

The permanent magnet is configured for generating a magnetic field.

The processing circuit is configured for determining at least one pairwise difference, or at least two pairwise differences, or at least three pairwise differences between pairs of said magnetic field components, and for determining and outputting at least one value, or at least two values, or at least three values related to a position of the magnet relative to the sensor device, or related to a force or a pressure exerted upon the flexible material, based on, e.g. as a function of said one or more pairwise differences.

The force sensor device may be configured for determining said at least one or said at least two physical quantities using one or more predefined function(s). This function or these functions may be stored in a non-volatile memory of the processing circuit, e.g. in the form of a mathematical formula, e.g. as a polynomial expression with a plurality of coefficients, e.g. with 3 to 30 coefficients, e.g. with at least 3 or at least 4 or at least 6 or at least 8 or at least 12 coefficients; or in the form of a sum having 3 to 15 terms, e.g. having at least 3 terms, or at least 4 terms, or at least 6 terms, or at least 8 terms, or at least 10 terms, or at least 12 terms; or in the form of a look-up table. Some terms may be squares of magnetic field differences or may be cross-products of two magnetic field differences obtained from sensor pairs spaced apart in the same direction or may be cross-products of two magnetic field differences obtained from sensor pairs spaced apart in different directions.

The coefficients or parameters may be determined using machine-learning. Alternatively, the coefficients or parameters are determined using classical techniques such as e.g. using curve fitting techniques, linear regression or non-linear regression techniques, or linear or non-linear models. It is noted that "machine learning" or "deep learning" is typically used for a "neural network" with "hidden layers", and typically requires much more computations than classical curve-fitting techniques.

A block-diagram similar to that of FIG. 22(*a*) and FIG. 22(*b*) may be applicable, wherein the blocks 2226 ("Feature augmentation and Polynomial augmentation") and 2230 ("Weights and biases") would be replaced by said predefined function, e.g. said polynomial, or said look-up table.

The force sensor device may have an appearance as shown in FIG. 23(*a*) to FIG. 23(*e*), but of course, the present invention is not limited thereto.

The force sensor device may have for example three 1D pixels, or four 1D pixels (e.g. as illustrated in FIG. 6), or three 2D pixels (e.g. as illustrated in FIG. 4), or four 2D pixels (e.g. as illustrated in FIG. 5 or FIG. 7(*a*) or FIG. 7(*b*) or FIG. 12 or FIG. 17(*a*) or FIG. 17(*b*) or FIG. 18), or five 2D pixels (e.g. as illustrated in FIG. 8), or nine 2D pixels (e.g. as illustrated in FIG. 9 or FIG. 10), or eight 2D pixels (e.g. as illustrated in FIG. 11(*a*)), or four 2D pixels and one 3D pixel (e.g. as illustrated in FIG. 13), or four 3D pixels (e.g. as illustrated in FIG. 14(*a*) or FIG. 14(*b*) or FIG. 19(*a*) or FIG. 19(*b*)), or five 3D pixels (e.g. as illustrated in FIG. 15(*a*) or FIG. 15(*b*)), or nine 3D pixels (e.g. as illustrated in FIG. 16).

In preferred embodiments, at least two pairwise differences are determined, or at least three pairwise differences are determined, or at least four pairwise differences, or at least six pairwise differences, or at least eight pairwise differences, and the output value(s) is/are determined based on these pairwise differences.

Many variants of this force sensor device are envisioned, similar to what was described above. For example, the force sensor device may further comprise a temperature sensor, and the temperature may be taken into account in the calculation, and/or may be used to correct temperature dependent material characteristics of the elastomer.

The invention claimed is:

1. A force sensor system comprising a magnetic sensor system, the magnetic sensor system comprising:
    an integrated circuit comprising a semiconductor substrate, the semiconductor substrate comprising a plurality of magnetic sensors configured for measuring at least two first magnetic field components oriented in a first direction, and for measuring at least two second magnetic field components oriented in a second direction;
    a magnet which is movable relative to the integrated circuit, and configured for generating a magnetic field; and
    a processing circuit configured for determining at least two physical quantities related to a position of the magnet using a predefined algorithm based on the measured first and second magnetic field components, or values derived therefrom, as inputs, and that uses a plurality of at least eight constants which are determined using machine learning;
wherein the magnet is flexibly mounted relative to the integrated circuit by means of a flexible material;
wherein the at least two physical quantities to be determined are two or three force components (Fx, Fy, Fz) of a mechanical force exerted upon a contact surface of said flexible material.

2. The force sensor system according to claim 1, wherein the predefined algorithm uses at least three or at least four magnetic field differences derived from said at least two first and said at least two second magnetic field components, as inputs, and that uses said plurality of at least eight constants.

3. The force sensor system according to claim 1,
wherein the semiconductor substrate further comprises a temperature sensor for measuring a temperature of the semiconductor substrate, and
wherein the semiconductor substrate is configured for correcting the measured first and second magnetic field components based on the measured temperature, or
wherein the predefined algorithm takes the measured temperature into account as an additional input, or
wherein the measured temperature is used in a post-processing step.

4. The force sensor system according to claim 1,
wherein each of the first direction and the second direction is parallel to the semiconductor substrate; or
wherein the first direction is parallel to the semiconductor substrate, and the second direction is perpendicular to the semiconductor substrate.

5. The force sensor system according to claim 1,
wherein the plurality of sensors comprises at least one sensor comprising an integrated magnetic concentrator disk, and three pairs of horizontal Hall elements arranged near a periphery of the disk, the Hall elements being angularly spaced by multiples of 120°; or
wherein the plurality of sensors comprises at least one sensor comprising an integrated magnetic concentrator disk, and four pairs of horizontal Hall elements arranged near a periphery of the disk, angularly spaced by multiples of 45°; or
wherein the semiconductor substrate comprises a plurality of magnetic sensors located at crossings of a 2×2 grid, or at crossings of a 3×3 grid, or at crossings of a 4×4 grid; or
wherein the semiconductor substrate comprises a plurality of magnetic sensors which are arranged in an irregular pattern, e.g. at pseudo-random locations; or
wherein at least three of the magnetic sensors are located on a virtual circle.

6. The force sensor system according to claim 1,
wherein the magnet is a two-pole magnet; and/or
wherein the magnet is an axially magnetised ring or disk magnet.

7. The force sensor system according to claim 1,
wherein the predefined algorithm is configured for deriving at least three first difference values from said at least two first magnetic field components, and for deriving at least three second difference values from said at least two second magnetic field components; and
for calculating said two or three force components based on said at least three first and said at least three second difference values.

8. The force sensor system according to claim 7,
wherein each of the at least three first difference values are determined as a pairwise difference between two first magnetic field components, and
wherein each of the at least three second difference values are determined as a pairwise difference between two second magnetic field components; or
wherein each of the at least three first difference values are determined as a difference between a first magnetic field component and a first common value, and
wherein each of the at least three second difference values are determined as a difference between a second magnetic field component and a second common value.

9. The force sensor system according to claim 7,
wherein the predefined algorithm is configured for calculating each of the two or three force components as a sum of at least twelve terms, and
wherein each of these at least twelve terms are a function of one or more of said at least three first and said at least three second difference values.

10. The force sensor system according to claim 9,
wherein each of the sums comprises a constant value, which is determined by machine learning.

11. The force sensor system according to claim 9,
wherein the predefined algorithm is configured for calculating each of the two or three force components as a sum of at least twelve terms,
wherein at least two terms contain a linear expression of only one of said at least three first and said at least three second difference values; and
wherein at least two terms contain a non-linear expression of one or more of said at least three first and said at least three second difference values.

12. The force sensor system according to claim 9,
wherein at least two terms or each sum are or contain a quadratic expression or a second order polynomial of only one of said at least three first and said at least three second difference values; and/or
wherein each sum contains at least one term being a product of two of said at least three first and said at least three second difference values; and/or
wherein each sum contains at least one term being a division of two of said at least three first and said at least three second difference values.

13. The force sensor system according to claim 1,
wherein the predefined algorithm is performed by a trained neural network,
using the at least two first magnetic field components and the at least two second magnetic field components as input signals; and
providing the two or three force components as output values.

14. The force sensor system according to claim 1, wherein the flexible material is an elastomer.

15. The force sensor system according to claim 1,
wherein the predefined algorithm further comprises a post-processing step wherein a temperature of the flexible material is measured or estimated, and
wherein the determined physical quantities are corrected to reduce temperature dependent material characteristics.

16. A magnetic sensor system comprising:
an integrated circuit comprising a semiconductor substrate, the semiconductor substrate comprising a plurality of magnetic sensors configured for measuring at least two first magnetic field components oriented in a first direction, and for measuring at least two second magnetic field components oriented in a second direction;

a magnet which is movable relative to the integrated circuit, and configured for generating a magnetic field;

a processing circuit configured for determining at least two physical quantities related to a position of the magnet using a predefined algorithm based on the measured first and second magnetic field components, or values derived therefrom, as inputs, and that uses a plurality of at least eight constants which are determined using machine learning;

wherein the predefined algorithm is configured for:
deriving at least three first difference values from said at least two first magnetic field components, and for deriving at least three second difference values from said at least two second magnetic field components; and for calculating said at least two physical quantities based on said at least three first and said at least three second difference values;

wherein each of the at least three first difference values are determined as a pairwise difference between two first magnetic field components, and wherein each of the at least three second difference values are determined as a pairwise difference between two second magnetic field components; or wherein each of the at least three first difference values are determined as a difference between a first magnetic field component and a first common value, and wherein each of the at least three second difference values are determined as a difference between a second magnetic field component and a second common value.

17. The magnetic sensor system according to claim 16, wherein the predefined algorithm uses said at least three first difference values derived from said at least two first magnetic field components and said at least three second difference values derived from said at least two second magnetic field components, as inputs, and uses said plurality of at least eight constants, for determining said at least two physical quantities.

18. The magnetic sensor system according to claim 16, wherein the semiconductor substrate further comprises a temperature sensor for measuring a temperature of the semiconductor substrate, and wherein the semiconductor substrate is configured for correcting the measured first and second magnetic field components based on the measured temperature, or wherein the predefined algorithm takes the measured temperature into account as an additional input, or wherein the measured temperature is used in a post-processing step.

19. The magnetic sensor system according to claim 16, wherein each of the first direction and the second direction is parallel to the semiconductor substrate; or wherein the first direction is parallel to the semiconductor substrate, and the second direction is perpendicular to the semiconductor substrate.

20. The magnetic sensor system according to claim 16, wherein the plurality of sensors comprises at least one sensor comprising an integrated magnetic concentrator disk, and three pairs of horizontal Hall elements arranged near a periphery of the disk, the Hall elements being angularly spaced by multiples of 120°; or wherein the plurality of sensors comprises at least one sensor comprising an integrated magnetic concentrator disk, and four pairs of horizontal Hall elements arranged near a periphery of the disk, angularly spaced by multiples of 45°; or wherein the semiconductor substrate comprises a plurality of magnetic sensors located at crossings of a 2×2 grid, or at crossings of a 3×3 grid, or at crossings of a 4×4 grid; or wherein the semiconductor substrate comprises a plurality of magnetic sensors which are arranged in an irregular pattern, e.g. at pseudo-random locations; or wherein at least three of the magnetic sensors are located on a virtual circle.

21. The magnetic sensor system according to claim 16, wherein the magnet is a two-pole magnet; and/or wherein the magnet is an axially magnetised ring or disk magnet.

22. A magnetic sensor system comprising:
an integrated circuit comprising a semiconductor substrate, the semiconductor substrate comprising a plurality of magnetic sensors configured for measuring at least two first magnetic field components oriented in a first direction, and for measuring at least two second magnetic field components oriented in a second direction;

a magnet which is movable relative to the integrated circuit, and configured for generating a magnetic field;

a processing circuit configured for determining at least two physical quantities related to a position of the magnet using a predefined algorithm based on the measured first and second magnetic field components, or values derived therefrom, as inputs, and that uses a plurality of at least eight constants which are determined using machine learning;

wherein the predefined algorithm is configured for:
deriving at least two first difference values from said at least two first magnetic field components, and for deriving at least two second difference values from said at least two second magnetic field components; and for calculating said at least two physical quantities based on said at least two first and said at least two second difference values;

wherein the predefined algorithm is configured for calculating each of the at least two physical quantities as a sum of at least twelve terms, and wherein each of these at least twelve terms are a function of one or more of said at least two first and said at least two second difference values.

23. The magnetic sensor system according to claim 22, wherein each of the sums comprises a constant value, which is determined by machine learning.

24. The magnetic sensor system according to claim 22, wherein the predefined algorithm uses said at least two first difference values derived from said at least two first magnetic field components and said at least two second difference values derived from said at least two second magnetic field components, as inputs, and uses said plurality of at least eight constants, for determining said at least two physical quantities.

25. The magnetic sensor system according to claim 22, wherein the semiconductor substrate further comprises a temperature sensor for measuring a temperature of the semiconductor substrate, and wherein the semiconductor substrate is configured for correcting the measured first and second magnetic field components based on the measured temperature, or wherein the predefined algorithm takes the measured temperature into account as an additional input, or wherein the measured temperature is used in a post-processing step.

26. The magnetic sensor system according to claim 22, wherein each of the first direction and the second direction is parallel to the semiconductor substrate; or
wherein the first direction is parallel to the semiconductor substrate, and the second direction is perpendicular to the semiconductor substrate.

27. The magnetic sensor system according to claim 22, wherein the plurality of sensors comprises at least one sensor comprising an integrated magnetic concentrator disk, and three pairs of horizontal Hall elements arranged near a periphery of the disk, the Hall elements being angularly spaced by multiples of 120°; or
wherein the plurality of sensors comprises at least one sensor comprising an integrated magnetic concentrator disk, and four pairs of horizontal Hall elements arranged near a periphery of the disk, angularly spaced by multiples of 45°; or
wherein the semiconductor substrate comprises a plurality of magnetic sensors located at crossings of a 2×2 grid, or at crossings of a 3×3 grid, or at crossings of a 4×4 grid; or
wherein the semiconductor substrate comprises a plurality of magnetic sensors which are arranged in an irregular pattern, e.g. at pseudo-random locations; or
wherein at least three of the magnetic sensors are located on a virtual circle.

28. The magnetic sensor system according to claim 22, wherein the magnet is a two-pole magnet; and/or
wherein the magnet is an axially magnetised ring or disk magnet.

\* \* \* \* \*